United States Patent
Psiaki et al.

(10) Patent No.: US 9,958,549 B2
(45) Date of Patent: May 1, 2018

(54) METHODS AND APPARATUS FOR DETECTING SPOOFING OF GLOBAL NAVIGATION SATELLITE SYSTEM SIGNALS USING CARRIER PHASE MEASUREMENTS AND KNOWN ANTENNA MOTIONS

(71) Applicants: CORNELL UNIVERSITY, Ithaca, NY (US); Mark L. Psiaki, Ithaca, NY (US); Steven P. Powell, Ithaca, NY (US); Brady W. O'Hanlon, Ithaca, NY (US)

(72) Inventors: Mark L. Psiaki, Brooktondale, NY (US); Steven P. Powell, Ithaca, NY (US); Brady W. O'Hanlon, Ithaca, NY (US)

(73) Assignee: Cornell University, Ithaca, NY (US)

( * ) Notice: Subject to any disclaimer, the term of this patent is extended or adjusted under 35 U.S.C. 154(b) by 506 days.

(21) Appl. No.: 14/429,197

(22) PCT Filed: Sep. 20, 2013

(86) PCT No.: PCT/US2013/060808
§ 371 (c)(1),
(2) Date: Mar. 18, 2015

(87) PCT Pub. No.: WO2014/047378
PCT Pub. Date: Mar. 27, 2014

(65) Prior Publication Data
US 2015/0234053 A1    Aug. 20, 2015

Related U.S. Application Data

(60) Provisional application No. 61/703,353, filed on Sep. 20, 2012.

(51) Int. Cl.
*G01S 19/13* (2010.01)
*G01S 19/21* (2010.01)
(Continued)

(52) U.S. Cl.
CPC .............. *G01S 19/215* (2013.01); *H04K 3/22* (2013.01); *H04K 3/65* (2013.01); *H04K 3/90* (2013.01);
(Continued)

(58) Field of Classification Search
CPC ........ G01S 19/215; G01S 19/21; G01S 19/13; G01S 19/43; H04K 3/22; H04K 3/65; H04K 3/90
(Continued)

(56) References Cited

U.S. PATENT DOCUMENTS 5,557,284 A * 9/1996 Hartman ............... G01S 19/215
                                              342/352
5,995,042 A * 11/1999 Durboraw, III ....... G01S 19/215
                                              342/357.58
(Continued)

OTHER PUBLICATIONS

International Search Report and Written Opinion in corresponding International application No. PCT/US2013/060808, dated Dec. 17, 2013.

*Primary Examiner* — Chuong P Nguyen
(74) *Attorney, Agent, or Firm* — Burns & Levinson LLP; Orlando Lopez

(57) ABSTRACT

Methods and systems that can detect GNSS spoofing attacks and that do not require explicit or implicit knowledge of exact position or attitude and that provide hypothesis test statistics, threshold values, and probabilities of false alarm and missed detection.

31 Claims, 13 Drawing Sheets

(51) Int. Cl.
 *H04K 3/00* (2006.01)
 *G01S 19/43* (2010.01)
(52) U.S. Cl.
 CPC .............. *G01S 19/13* (2013.01); *G01S 19/21* (2013.01); *G01S 19/43* (2013.01)
(58) Field of Classification Search
 USPC ........................ 342/357.59, 357.51, 357.26
 See application file for complete search history.

(56) References Cited

U.S. PATENT DOCUMENTS

| | | | | |
|---|---|---|---|---|
| 7,372,400 B2* | 5/2008 | Cohen | ..................... | G01S 19/05 342/357.29 |
| 7,450,060 B2* | 11/2008 | Strachan | ............... | G01S 19/215 342/357.29 |
| 7,564,401 B1 | 7/2009 | Strachan | | |
| 7,952,519 B1* | 5/2011 | Nielsen | ................. | G01S 19/215 342/357.59 |
| 7,956,803 B2 | 6/2011 | Thomson | | |
| 8,035,557 B2* | 10/2011 | Thomson | .............. | G01S 19/215 342/357.43 |
| 8,712,051 B2 | 4/2014 | Psiaki | | |
| 9,689,989 B2* | 6/2017 | Trautenberg | .......... | G01S 19/215 342/357.59 |
| 2007/0194984 A1* | 8/2007 | Waid | ..................... | G01S 19/215 342/357.59 |
| 2010/0134352 A1* | 6/2010 | Thomson | .............. | G01S 19/215 342/357.45 |
| 2012/0121087 A1* | 5/2012 | Psiaki | .................... | G01S 19/05 380/255 |
| 2015/0226857 A1* | 8/2015 | Davies | ................. | G01S 19/215 342/357.59 |
| 2015/0226858 A1* | 8/2015 | Leibner | ................ | G01S 19/215 342/357.59 |
| 2016/0154113 A1* | 6/2016 | Leibner | ................... | G01S 19/21 342/357.59 |
| 2017/0102464 A1* | 4/2017 | Davies | ................. | G01S 19/215 |

* cited by examiner

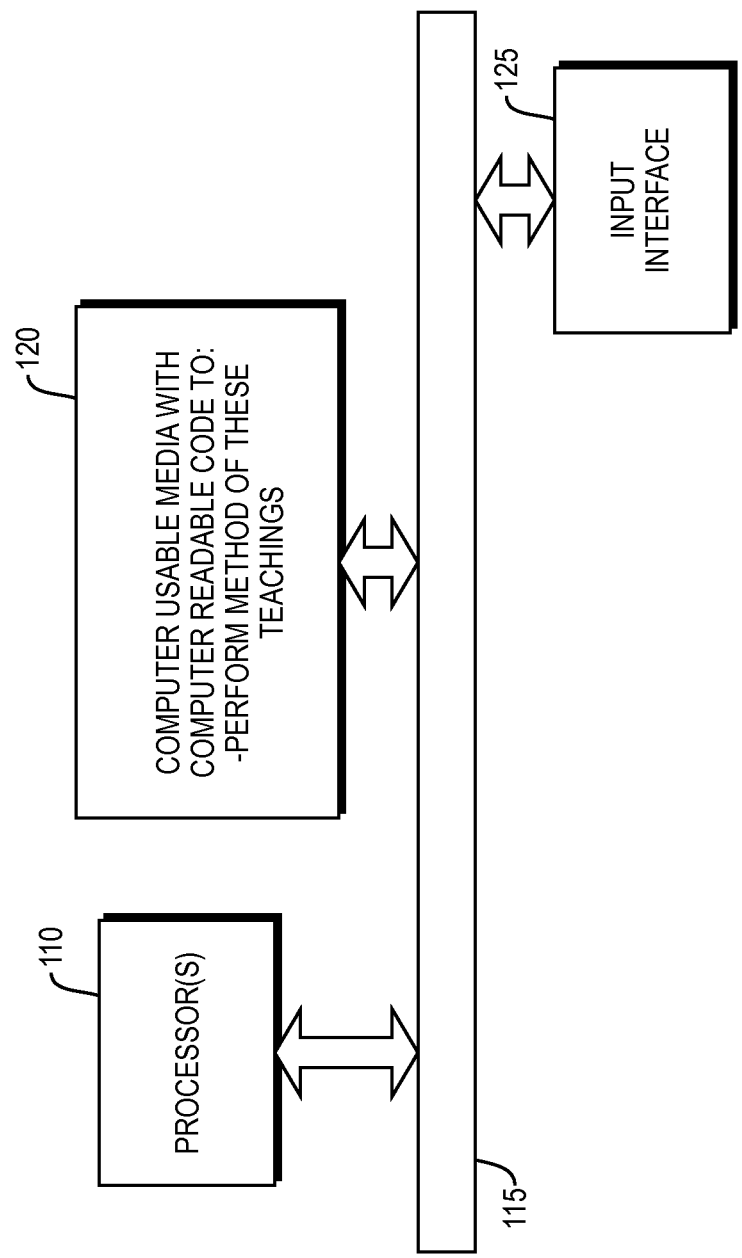

METHODS AND APPARATUS FOR DETECTING SPOOFING OF GLOBAL NAVIGATION SATELLITE SYSTEM SIGNALS USING CARRIER PHASE MEASUREMENTS AND KNOWN ANTENNA MOTIONS

CROSS-REFERENCE TO RELATED APPLICATIONS

This application is a U.S. national stage application under 35 U.S.C. 371 of co-pending International Application No. PCT/US13/60808 filed on Sep. 20, 2013 and entitled METHODS AND APPARATUS FOR DETECTING SPOOFING OF GLOBAL NAVIGATION SATELLITE SYSTEM SIGNALS USING CARRIER PHASE MEASUREMENTS AND KNOWN ANTENNA MOTIONS, which in turn claims priority to U.S. Provisional Patent Application No. 61/703,353 filed on Sep. 20, 2012, which is incorporated by reference herein in its entirety for all purposes.

STATEMENT REGARDING FEDERALLY-SPONSORED RESEARCH OR DEVELOPMENT

This invention was made in part with United States Government support under Grant Nos. NNX10AL16G awarded by NASA, and N00014-09-1-0295 awarded by the Office of Naval Research. The United States government has certain rights in the invention.

BACKGROUND

The U.S. government has been aware of the vulnerability of unencrypted civilian GNSS signals to spoofing at least since the Department of Transportation released its Volpe report in 2001. A spoofer intentionally broadcasts signals that look like true signals to User Equipment receivers (UE). These false signals can fool a receiver into an incorrect determination of its position, receiver clock time, or both.

Spoofing of civilian GNSS signals is straightforward because their full characteristics are publicly available. It is relatively easy to synthesize false signals with the same characteristics. Encrypted military signals, such as the GPS P(Y) and M codes, are much harder to spoof. One must break their encryptions or use a meaconing-type attack, an attack which involves reception and rebroadcast of actual encrypted signals.

Spoofing of OPS receivers has been in the news recently. In December 2011, Iran captured a highly classified stealth drone that belonged to the U.S. government. An Iranian engineer claimed that they spoofed the drone's GPS in a way which fooled it into thinking that it was landing at its home base in Afghanistan. In reality, it was descending into the hands of waiting Iranian military personnel. It remains unclear how much of the Iranian claims are true, but their claims are not outlandish and have to be taken seriously.

In June 2012, a group led by Todd Humphreys of UT Austin spoofed a small helicopter Uninhabited Air Vehicle (UAV) using live, on-air spoofing signals as part of a specially authorized test at White Sands Missile Range, N. Mex. The UT Austin team caused the UAV to execute unintended maneuvers by spoofing its GPS-derived position and velocity. One of the untended maneuvers involved a near landing when the UAV had been commanded to hover about 20 m above the ground.

Existing anti-spoofing technology known as Receiver Autonomous Integrity Monitoring (RAIM) will not suffice to detect sophisticated spoofing attacks. Therefore, a number of recent and on-going efforts have sought to develop advanced spoofing detection methods that can alert a user to a sophisticated attack. These methods include advanced RAIM algorithms that operate at the correlator/discriminator/tracking-loop level, algorithms that cross-correlate the unknown encrypted parts of a signal between a potential victim receiver and a secure receiver, Navigation Message Authentication (NMA) that relies on proposed insertions of encrypted authentication elements within the low-bandwidth navigation message, multiple-antenna techniques, and moving-antenna techniques Other references have described multiple-antenna techniques that do not perform spoofing detection. Rather, this class of techniques is used to mitigate spoofing by attenuating it without the need to formally detect it.

Each of the newer techniques has strengths and weaknesses. Advanced RAIM methods require only modest changes to receiver software and hardware, but they may only be able to detect spoofing at the onset of an attack. If an advanced RAIM algorithm misses the attack during this short window, then it may go undetected. The cross-correlation techniques can detect spoofing rapidly at any time during an attack, perhaps in as little as 0.2 seconds, but they rely on a high bandwidth communications link between the defended receiver and a secure receiver. NMA introduces encryption-level security into the civilian GNSS community, but it requires changes to GNSS message structures that are difficult to bring about. It may require additional signal processing in order ensure against estimation-and-replay by the spoofer of the NMA message components. NMA techniques may be slow, requiring 10 seconds or more in order to detect an attack. A UAV may already be in the hands of an enemy by the time such a method discovered the attack. Multiple-antenna methods can be made reliable and fast if implemented well, but they require a significant amount of additional hardware and signal processing. The multi-receiver cross-correlation technique and the NMA technique share an additional drawback: they offer no protection against a meaconing-type receive-and-replay attack. Even an encrypted military signal is vulnerable to a meaconing attack.

The moving antenna technique can be implemented using simple hardware and algorithms, but the method of conventional teachings requires long observation intervals, and it does not develop a clearly defined hypothesis test. Furthermore, its reliance on signal amplitude variations as an indication of spoofing may prove unreliable. A spoofer could easily create time-dependent amplitude variations between its false signals, and this particular moving-antenna detection method might interpret these variations as indicating a non-spoofed situation.

There is a need for methods and systems that do not require explicit or implicit knowledge of exact position or attitude. There is a need for methods and systems that can detect spoofing attacks in a stand-alone mode, without the need for aiding data from some external source or for the implementation of a new GPS navigation data message. There is a need for methods and systems to provide clear spoofing detection hypothesis test statistics, threshold values, and probabilities of false alarm and missed detection.

SUMMARY

Methods and systems that can detect GNSS spoofing attacks and that do not require explicit or implicit knowledge of exact position or attitude and that provide hypothesis test statistics, threshold values, and probabilities of false alarm and missed detection are presented herein below.

In one or more embodiments, the method of these teachings includes moving a receiving location in a predetermined articulation pattern while receiving GNSS signals, high pass filtering carrier phase measurements of received GNSS signals and the predetermined articulation pattern, the high pass filtering resulting in estimation of coefficients in an expression for residuals of the carrier phase measurements, determining a likelihood cost function for a non-spoofed configuration, the likelihood cost function being obtained from the ratio of probability density functions, results of the high pass filtering being used in determining said likelihood cost function, determining another likelihood cost function for a spoofed configuration; a spoofing detection hypothesis test statistic being a difference of said another likelihood cost function minimum and said likelihood cost function minimum, results of the high pass filtering being used in determining said another likelihood cost function, comparing the spoofing detection hypothesis test statistic to a predetermined threshold, the GNSS signals deemed to be spoofed if the spoofing detection hypothesis test statistic is less than the predetermined threshold.

In one or more embodiments, the system of these teachings includes a receiving location displacement component configured to move a receiving location with respect to a position at which the user equipment processes the GNSS signals, an articulation subsystem configured to provide driving signals to the receiving location displacement component and to determine receiving location articulation; the a articulation subsystem moving a receiving location in a predetermined articulation pattern while receiving GNSS signals, a number of midpoint sampler subsystems, each midpoint sampler subsystem receiving input from a components of one channel of a conventional GNSS receiver and providing a beat carrier phase measurement for that one channel and a spoofing detection hypothesis test component receiving the receiving location articulation, the beat carrier phase measurement for each one channel and a PLL phase error discriminator value for each one channel, the beat carrier phase measurement and the PLL phase error discriminator value for each one channel being used to obtain a wideband estimate of beat carrier phase for each one channel, a number of accumulation mid point times, each accumulation mid point time being an accumulation mid point time for one channel, and a number of unit direction vectors, each unit direction vector pointing from a GNSS signal source for one channel; said spoofing detection hypothesis test component configured to high pass filter carrier phase measurements of received GNSS signals and the articulation pattern, the high pass filtering resulting in estimation of coefficients in an expression for the carrier phase measurement residuals, determine a likelihood cost function for a non-spoofed configuration, the likelihood cost function being obtained from the ratio of probability density functions, results of the high pass filtering being used in determining said likelihood cost function, determine another likelihood cost function for a spoofed configuration; a spoofing detection hypothesis test statistic being a difference of said another likelihood cost function minimum and said likelihood cost function minimum, results of the high pass filtering being used in determining the another likelihood cost function, comparing the spoofing detection hypothesis test statistic to a predetermined threshold, the GNSS signals deemed to be spoofed if the spoofing detection hypothesis test statistic is less than the predetermined threshold.

The present teachings enable civilian Global Navigation Satellite System (GNSS) receivers, such as GPS receivers or receivers for the new European Galileo system and the new Chinese COMPASS system, to determine whether the received signals are genuine or whether they are deceptive signals that have been broadcast by a malicious spoofer. It detects a spoofing attack by using short segments of beat carrier-phase time histories that are collected while the receiver's antenna is undergoing a known, high-frequency motion profile. The spoofing detection calculations correlate high-pass-filtered versions of the known antenna motion with high-pass-filtered versions of the carrier phase variations. True signals produce a specific correlation pattern, and spoofed signals produce a recognizably different correlation pattern if the spoofer transmits its false signals from a single antenna. The most pronounced difference is that non-spoofed signals display variations between the beat carrier phase responses of multiple signals, but all signals' responses are identical or have an identical component in the spoofed case. These differing correlation characteristics are used to develop a hypothesis test in order to detect a spoofing attack or the lack thereof.

The methods of present teachings need not know about vehicle attitude a priori, and their spoofing detection tests can function properly even if the receiver's position solution has been badly spoofed. The methods of present teachings use comparisons between multiple carrier-phase signals to develop explicit spoofing detection tests that have clearly defined detection thresholds, probabilities of false alarm, and probabilities of missed detection. The embodiments discussed here do not require an Inertial Measurement Unit (IMU) to sense antenna motion, contrary to moving-antenna systems proposed by others. Instead, motion is implemented and sensed using a special-purpose mechanical receiving antenna location displacement component (in one instance, an antenna deflection system). This motion need not be known relative to inertial space. Rather, it can be measured relative to a platform of unknown attitude, position, velocity, and acceleration. The only requirement is that the articulation system be able to measure virtually all of the high-frequency content of the motion. On the other hand, the methods of present teachings could be aided by inertial sensing if it were available. A high-frequency dithering motion of the platform that carried the GNSS antenna, if coupled with inertial sensing, could constitute the principal motion/sensing system that is necessary to the present method's GNSS spoofing detection approach.

In one embodiment, the method of present teachings operates by correlating beat carrier phase time variations with known high-frequency components of the receiver antenna's position time history. In the non-spoofed case, the method of present teachings has the side benefit of yielding attitude information. The antenna motion, however, need not have an amplitude large enough or other properties typically deemed necessary to provide good attitude accuracy.

In one embodiment, the GNSS spoofing detection method of present teachings has some similarities to certain multi-antenna methods. The present method also relies on carrier phase measurements, and the present method also relies in geometrical differences between the line-of-sight (LOS) vectors to actual GNSS satellites for non-spoofed signals and the LOS vector to a spoofer. There are two important differences between the present method and carrier-phase-based multi-antenna methods. First, the use of a single antenna removes the need to resolve carrier-phase biases, and possibly integer ambiguities, between different antennas. This difference allows the present method to use simpler signal processing and to detect spoofing using shorter data intervals. Second, the present method does not always need to determine the full 3-axis attitude of the UE. Depending on the type of antenna motion that it uses, it may only determine 2-axes worth of attitude information. In some cases, however, it may estimate the full 3-axis attitude as a by-product of its spoofing detection calculations.

Note that the method of these teachings is effective against spoofing of both open-source civilian and encrypted military GNSS signals. Thus, it could detect a meaconing attack against a U.S. Military SAASM GPS receiver.

Contributions of the present teachings are described herein below. First, the present teachings describe a new spoofing detection system based on correlation of beat carrier phase time variations with known high-frequency antenna motions. Second, the present teachings develop precise spoofing detection hypothesis tests for this system, complete with analyses of false-alarm and missed-detection probabilities. A number of distinct spoofing detection tests are developed for various scenarios in which decreasing amounts of a priori information are available to the detector. Also described herein below is an evaluation of the an embodiment of the system of the present teachings. This evaluation involves tests using truth-model data and tests using actual live data. Live data for the non-spoofed null hypothesis is easy to collect by simply observing GPS L1 signals in typical outdoors environments. Live data for spoofed cases presents a challenge. One set of tests was conducted in an anechoic chamber using a re-radiated GPS signal from an outside antenna. The single re-radiating antenna inside the chamber provided exactly the same signal-in-space geometrical characteristics as are provided by a sophisticated spoofer. The other set of live spoofed-case tests was conducted in conjunction with a recent spoofing attack test at White Sands Missile Range in New Mexico. This test was conducted under the auspices the U.S. Air Force 746 Test Squadron as a service to the Department of Homeland Security and with the approval of the FCC.

For a better understanding of the present teachings, together with other and further objects thereof, reference is made to the accompanying drawings and detailed description and its scope will be pointed out in the appended claims.

BRIEF DESCRIPTION OF THE DRAWINGS

FIG. 4a shows an embodiment of components of the system of these teachings;

DETAILED DESCRIPTION

The following detailed description is of the best currently contemplated modes of carrying out these teachings. The description is not to be taken in a limiting sense, but is made merely for the purpose of illustrating the general principles of these teachings, since the scope of these teachings is best defined by the appended claims. Although the teachings have been described with respect to various embodiments, it should be realized these teachings are also capable of a wide variety of further and other embodiments within the spirit and scope of the appended claims.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about."

"Attitude," as used herein, is the orientation of a user equipment frame with respect to a reference frame. Attitude is defined in terms of the angles for roll, pitch and yaw.

"Carrier phase" and "beat carrier phase" are used herein in the manner that the terms are used in regards to GNSS or GPS (see, for example, Lecture 4: GPS part 2, Jeff Freymueller, University of Alaska, or GPS Glossary from GIS Technical Memorandum 3: Global Positioning Systems Technology and its Applications in Environmental Programs (EPA/600/R-92/036, February 1992), both of which are incorporated by reference herein in their entirety and for all purposes).

A "GNSS software receiver," as used herein, is a GNSS receiver including an ADC (analog to digital converter), a processor and computer usable media with code for the functions to be performed or a field programmable gate array programmed for the functions to be performed.

Figure 12:
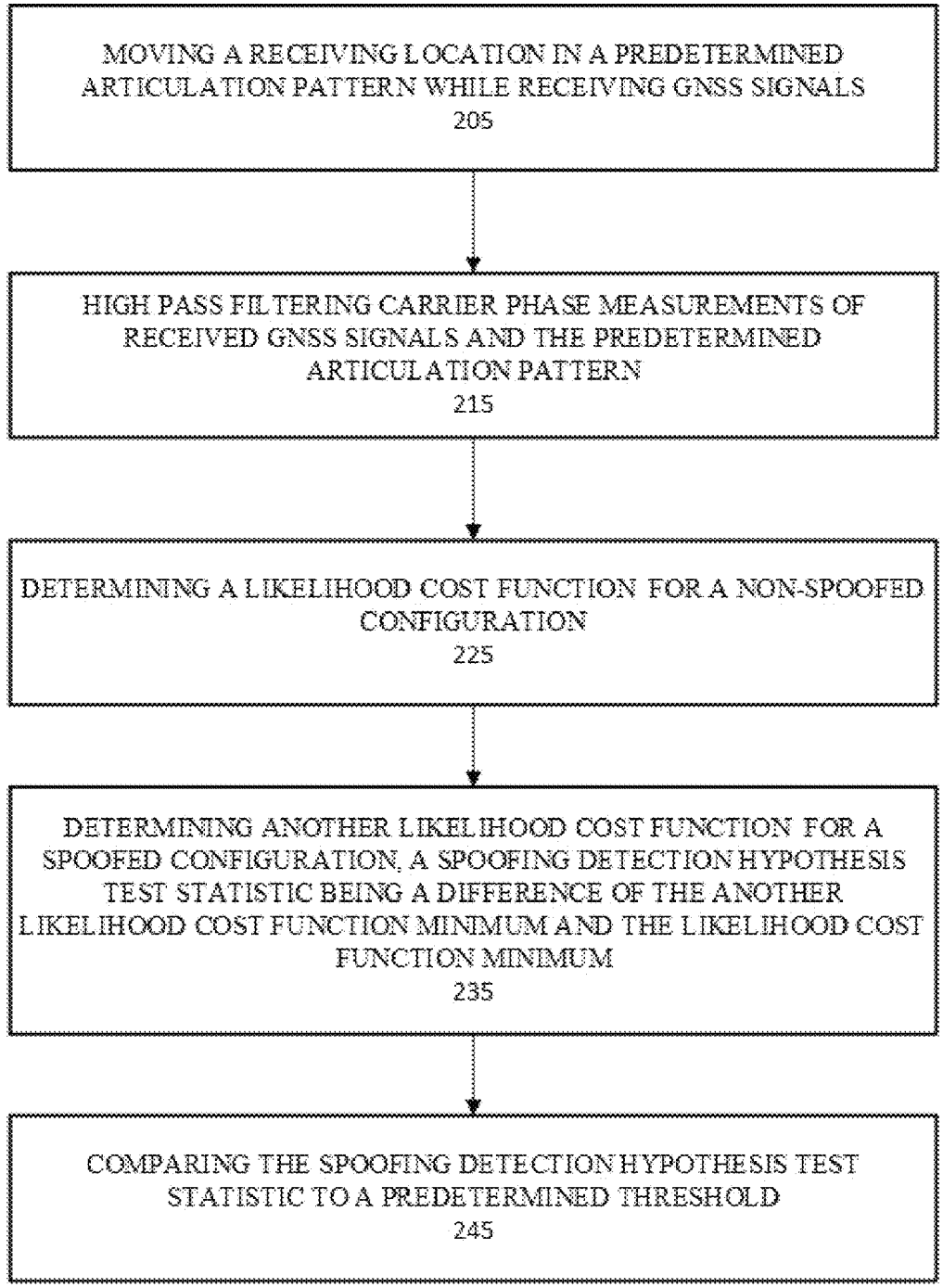
FIG. 12 shows a flowchart representation of an embodiment of the method of these teachings.

In one or more embodiments, the method of these teachings includes moving a receiving location in a predetermined articulation pattern while receiving GNSS signals (step 205, FIG. 12), high pass filtering carrier phase measurements of received GNSS signals and the predetermined articulation pattern (step 215, FIG. 12), the high pass filtering resulting in estimation of coefficients in an expression for residuals of the carrier phase measurements, determining a likelihood cost function for a non-spoofed configuration (step 225, FIG. 12), the likelihood cost function being obtained from the ratio of probability density functions, results of the high pass filtering being used in determining said likelihood cost function, determining another likelihood cost function for a spoofed configuration; a spoofing detection hypothesis test statistic being a difference of said another likelihood cost function minimum and said likelihood cost function minimum (step 235, FIG. 12), results of the high pass filtering being used in determining said another likelihood cost function, comparing the spoofing detection hypothesis test statistic to a predetermined threshold (step 245, FIG. 12), the GNSS signals deemed to be spoofed if the spoofing detection hypothesis test statistic is less than the predetermined threshold.

In one or more embodiments, the system of these teachings includes a receiving location displacement component configured to move a receiving location with respect to a position at which the user equipment processes the GNSS signals, an articulation subsystem configured to provide driving signals to the receiving location displacement component and to determine receiving location articulation; the a articulation subsystem moving a receiving location in a predetermined articulation pattern while receiving GNSS signals, a number of midpoint sampler subsystems, each midpoint sampler subsystem receiving input from a components of one channel of a conventional GNSS receiver and providing a beat carrier phase measurement for that one channel and a spoofing detection hypothesis test component receiving the receiving location articulation, the beat carrier phase measurement for each one channel and a PLL phase error discriminator value for each one channel, the beat carrier phase measurement and the PLL phase error discriminator value for each one channel being used to obtain a wideband estimate of beat carrier phase for each one channel, a number of accumulation mid point times, each accumulation mid point time being an accumulation mid point time for one channel, and a number of unit direction vectors, each unit direction vector pointing from a GNSS signal source for one channel; said spoofing detection hypothesis test component configured to high pass filter carrier phase measurements of received GNSS signals and the articulation pattern, the high pass filtering resulting in estimation of coefficients in an expression for the carrier phase measurement residuals, determine a likelihood cost function for a non-spoofed configuration, the likelihood cost function being obtained from the ratio of probability density functions, results of the high pass filtering being used in determining said likelihood cost function, determine another likelihood cost function for a spoofed configuration; a spoofing detection hypothesis test statistic being a difference of said another likelihood cost function minimum and said likelihood cost function minimum, results of the high pass filtering being used in determining the another likelihood cost function, comparing the spoofing detection hypothesis test statistic to a predetermined threshold, the GNSS signals deemed to be spoofed if the spoofing detection hypothesis test statistic is less than the predetermined threshold.

Section II describes an embodiment of the moving-antenna spoofing detection system hardware architecture and its data flows. Section III develops the carrier-phase signal models that are used to derive spoofing detection hypothesis tests. Sections IV-VI develop three different versions of the spoofing detection hypothesis tests that apply for the case of uni-axial antenna articulation motion. Section IV presents a technique for the case of a known attitude of the articulations relative to the GNSS reference frame. Section V presents a technique for the case of unknown attitude. Section VI presents a technique for the case of unknown attitude and an unknown amplitude scaling factor. These sections also develop the calculations needed to derive detection thresholds as functions of false-alarm probabilities and to determine the resultant probabilities of missed detection. Section VII addresses the issue of possible uncertainty in the time phasing of the articulations. Section VIII discusses enhancements that are needed for general 3D antenna motion. Section IX presents tests of the new method, both on truth-model data and on live-signal data. Section X discusses some characteristics of the new spoofing detection method, and it makes further comparisons to IMU-based detection methods. Section XI provides a summary of the present teachings and presents conclusions.

II. System Architecture

A. Antenna Hardware and Geometry

Figure 1:
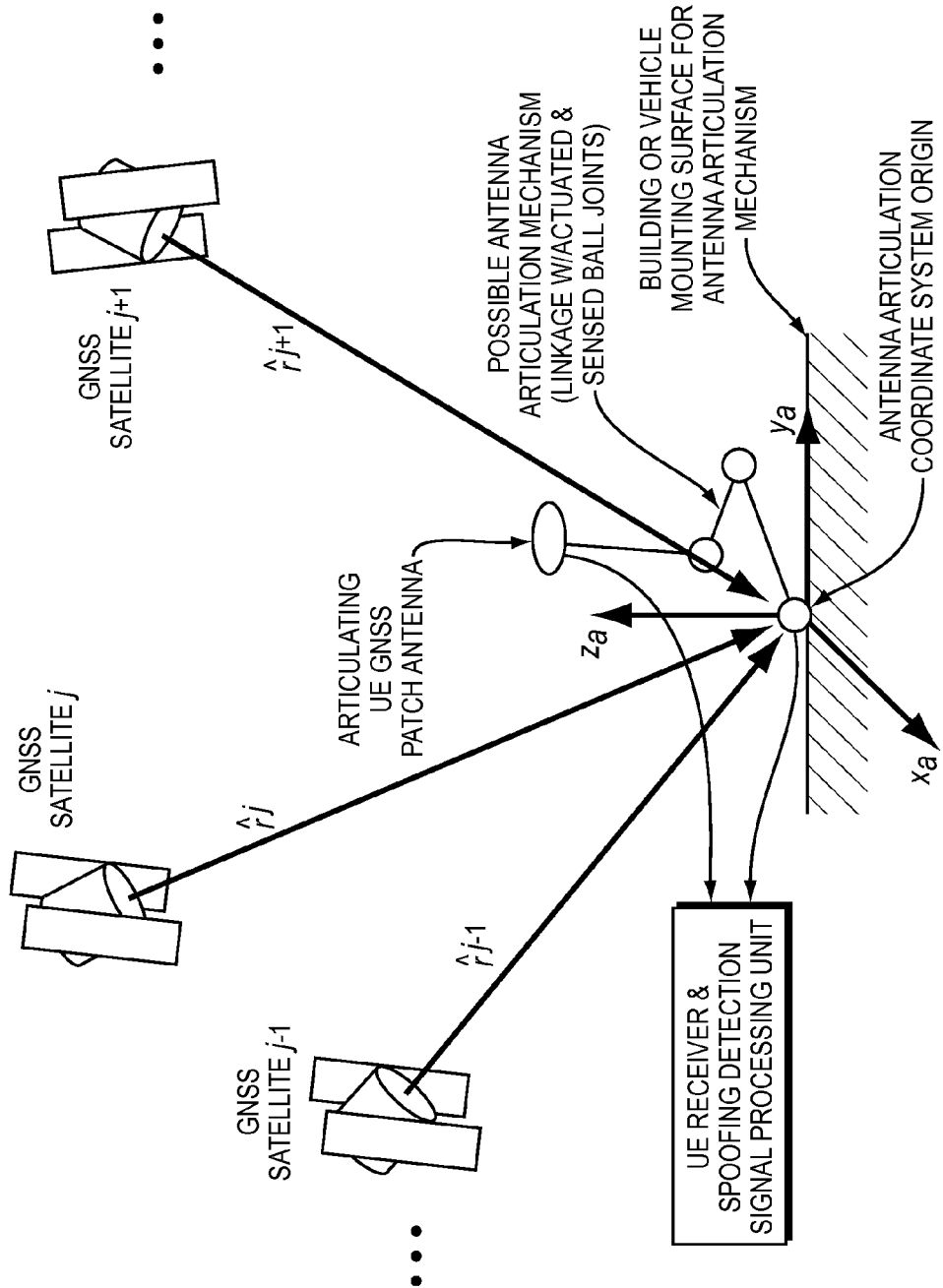
FIG. 1 shows the Antenna articulation system geometry relative to base mount and GNSS satellites for spoofing detection system in the non-spoofed case.
Figure 2:
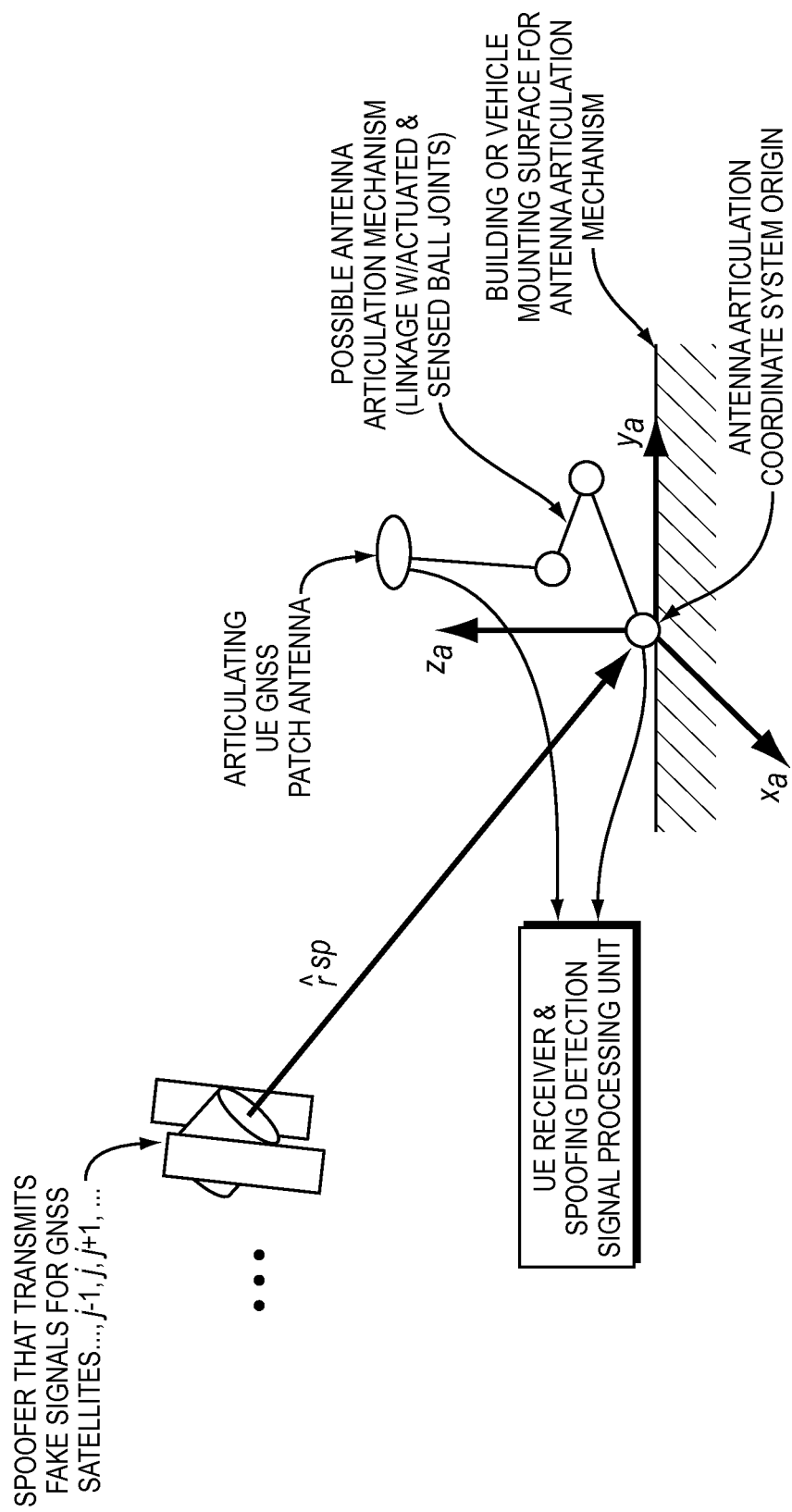
FIG. 2 shows the Antenna articulation system geometry relative to base mount and GNSS spoofer for spoofing detection system, spoofed case.

The hardware and geometry for this spoofing detection method are shown in FIGS. 1 and 2 for one possible version of this system. FIG. 1 shows the system in a non-spoofed scenario with 3 of the GNSS satellites whose signals are being tracked, satellites j−1, j, and j+1. FIG. 2 shows the same system in which a spoofer is sending false versions of the signals from these same satellites. The spoofer has a single transmission antenna. Satellite j−1, j, and j+1 may be visible to the receiver antenna, but the spoofer has "hijacked" the receiver's tracking loops for these signals so that only the false spoofed versions of these signals are known to the receiver.

The receiver antenna of the potential spoofing victim is mounted in a way that allows its phase center to move with respect to its mounting base. In FIGS. 1 and 2, this motion system is depicted as an open kinematic chain consisting of three links with ball joints that allow 6-degree-of-freedom motion. This is just one example of how a system can be configured in order to allow antenna motion relative to its mounting base. It is normally not necessary to allow for full 6-degree-of-freedom motion. The system can work well with just one translational degree of motion, such as a piston-like up-and-down motion that could be provided by a solenoid which operated along the $z_a$ antenna articulation axis.

Figure 3:
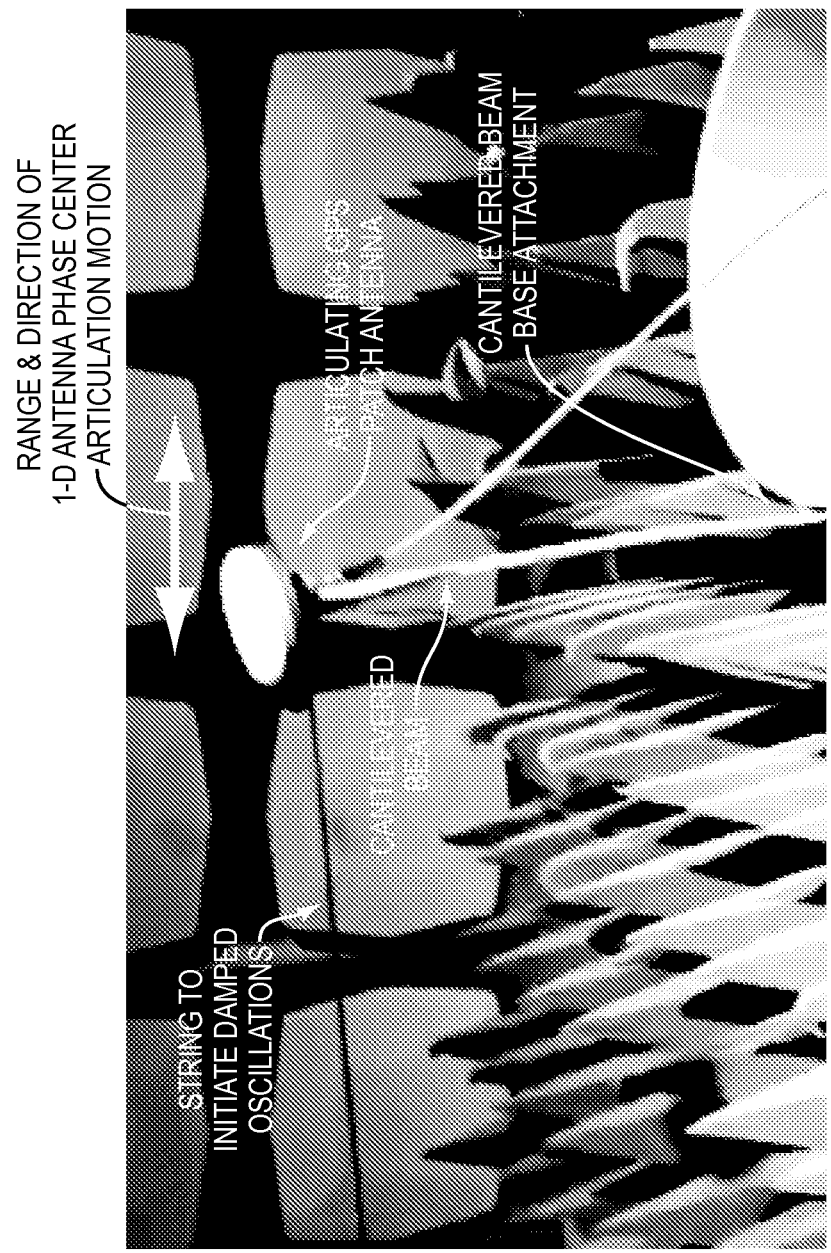
FIG. 3 shows the Antenna articulation system for a prototype spoofing detector tests: a cantilevered beam that allows single-degree-of-freedom antenna phase center vibration along a horizontal axis.

Yet another possible configuration is to mount the antenna on a cantilevered beam that points along the $z_a$ axis and that allows for single-degree-of-freedom vibratory motion along the $x_a$ or $y_a$ axis, as shown in a photograph of the first prototype system, FIG. 3. A string connects to the left-hand side of the small metal ground plane below the patch antenna. It is used to excite the articulation motions. The thin beam extending below the antenna is cantilevered off of the barrel in the lower right of the figure. The antenna articulation motion is a 1-dimensional damped oscillation from left to right across FIG. 3's field of view, as indicated by the double-ended arrow. Although not present in the first prototype system, it is desirable to include a sensing system that measures the antenna motion. It would measure articulations relative to the mounting base.

Let the articulation time history vector relative to the $(x_a,y_a,z_a)$ UE-fixed coordinate system be defined as $$b_a(t) = \begin{bmatrix} x_a(t) \\ y_a(t) \\ z_a(t) \end{bmatrix} \quad (1)$$

If the articulation system is designed to give single-degree-of-freedom motion along the known fixed unit direction vector $\hat{b}_a$, then the full articulation vector can be written as $$b_a(t) = \rho_a(t)\hat{b}_a \quad (2)$$

where $\rho_a(t)$ is the antenna phase center deflection time history measured along the $\hat{b}_a$ axis.

Note that the base of the antenna articulation system is mounted directly to the UE. If the UE is statically mounted on a building, as for a power grid monitor, a cell phone tower, or a financial institution, then the $(x_a,y_a,z_a)$ UE-fixed coordinate system will also be Earth-fixed. It would be possible to calibrate/survey this coordinate system so that $b_a(t)$ could be known in Earth-fixed coordinates.

If the UE is mounted to a moving vehicle, such as an airplane, a ship, or a wheeled vehicle, then $(x_a,y_a,z_a)$ coordinate system will translate and rotate in the general case. It is assumed that the rotations and translations of this coordinate system occur in a lower-frequency domain as compared to the higher-frequency $b_a(t)$ antenna articulations. It should be possible to articulate $b_a(t)$ at a frequency of 8-16 Hz or possibly even a bit higher. Therefore, the maximum allowable frequency for significant UE rotational and translational motions is probably about 1-5 Hz, which is a reasonable upper limit for many applications.

FIG. 1 includes the unit direction vectors from the GNSS spacecraft to the UE. They are $\hat{r}^{j-1}$, $\hat{r}^j$, and $\hat{r}^{j+1}$ for, respectively, the GNSS satellites j−1, j, and j+1. These vectors point from the phase centers of the respective GNSS spacecraft antennas to the origin of the $(x_a,y_a,z_a)$ UE-fixed coordinate system. It is assumed that these unit direction vectors are known to the spoofing detection algorithm. In the non-spoofed case, these vectors are typically computed as part of the standard pseudorange-based navigation solution. In the case of spoofing, the spoofed pseudoranges can be used to compute a spoofed navigation solution and the corresponding spoofed values of the unit direction vectors $\hat{r}^{j-1}$, $\hat{r}^j$, and $\hat{r}^{j+1}$. Even though these vectors are typically incorrect during a spoofing attack, perhaps wildly incorrect, they will be used in the spoofing detection calculations as though they were correct. Any believable spoofed scenario will be precluded from using a false set of $\hat{r}^{j-1}$, $\hat{r}^j$, and $\hat{r}^{j+1}$ vectors that can deceive the spoofing detector's hypothesis test, as will be demonstrated in Subsection X.B. Note: the corresponding dimensional satellite-to-receiver vectors are $r^{j-1}$, $r^j$, and $r^{j+1}$ in both the non-spoofed and spoofed cases.

The spoofed case in FIG. 2 replaces the presumed known unit direction vectors $\hat{r}^{j-1}$, $\hat{r}^j$, and $\hat{r}^{j+1}$ with the unknown unit direction vector $\hat{r}^{sp}$. This vector points from the spoofer's transmission antenna to the UE. In the spoofed case, the spoofing detector will, in effect, estimate one or more components of $\hat{r}^{sp}$ as measured in its $(x_a,y_a,z_a)$ antenna articulation coordinate system.

The method of these teachings relies on the assumption that the spoofing signals come from a single spoofer transmission antenna. A spoofer that used more than one transmission antenna with significantly different $\hat{r}^{sp}$ vectors would likely not be detectable using the present methods. Enhanced versions of its methods would be needed. Fortunately, successful implementation of a multi-transmitter spoofing attack would be very difficult technically, and the needed hardware would be much more costly than the spoofer hardware used in present investigations (see, for example, Humphreys, T. E., Ledvina, B. M., Psiaki, M. L., O'Hanlon, B., and Kintner, P. M., Jr., "Assessing the Spoofing Threat: Development of a Portable GPS Civilian Spoofer," *Proc. ION GNSS* 2008, Sept. 16-19, 2008, Savannah, Ga. and in Humphreys, T. E., Kintner, P. M., Jr., Psiaki, M. L., Ledvina, B. M., and O'Hanlon, B. W., "Assessing the Spoofing Threat," *GPS World*, Vol. 20, No. 1, January 2009, pp. 28-38). Much of the difficulty in mounting a multi-transmitter spoofing attack lies in the need to precisely phase-align the false RF signals from the different transmitters.

It is important that the spoofer not know the antenna articulation time history $b_a(t)$, at least not in a timely enough manner to spoof the effects of this motion on the received beat carrier-phase signals. One way to keep this knowledge from the spoofer is to cover the entire antenna articulation system with a radome. It must be opaque to visible light but transparent to GNSS RF signals. The radome need not be large because antenna articulation motions on the order of 4-6 cm peak-to-peak are typically sufficient for reliable spoofing detection, and they can occur along a single axis. Another possible method to avoid spoofing of the $b_a(t)$ carrier-phase effects is to make the $b_a(t)$ motions be of too high a frequency for the spoofer to sense and respond in a timely manner. On a UAV, concealment of $b_a(t)$ can be achieved by masking the location of the GNSS antenna. This approach will be especially effective if the antenna is mounted far away from the UAV center of mass and if the $b_a(t)$ motions are caused by high-frequency dithering commands to the UAV attitude.

B. Signal Processing Hardware and Connectivity

Figure 4:
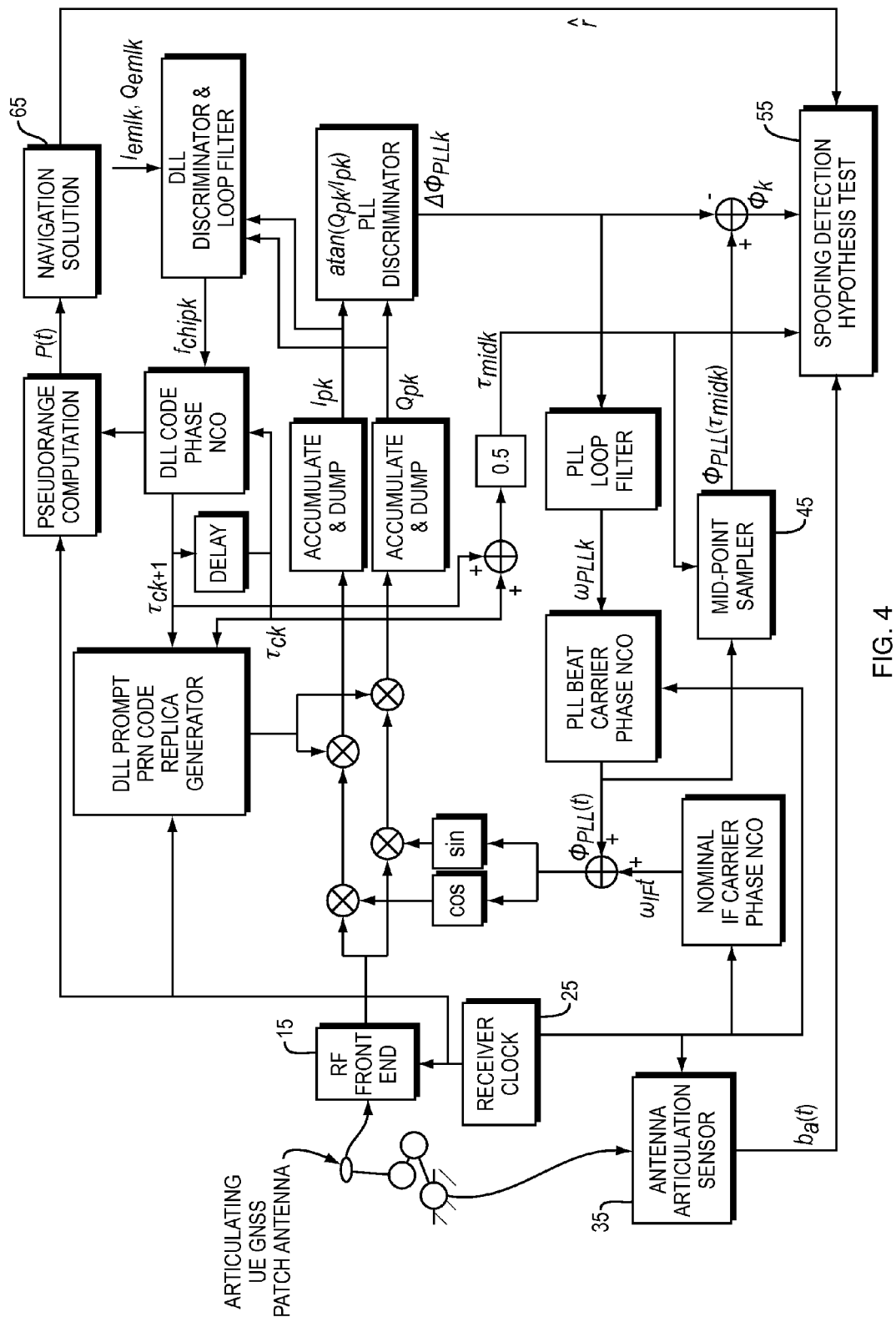
FIG. 4 shows an embodiment of a signal processing block diagram of a single-satellite receiver channel that provides inputs to the spoofing detector.

Much of the spoofing detection signal processing is carried out using standard GNSS receiver functions, as per Misra, P., and Enge, P. *Global Positioning System, Signals, Measurements, and Performance*, 2$^{nd}$ Ed, Ganga-Jamuna Press, (Lincoln, Mass., 2006), pp. 467-498. FIG. 4 shows the signal processing block diagram for an example receiver channel and its relationship to the other elements of the spoofing detection system. All except 6 blocks, the three left-most blocks ("RF front-end 15", "Receiver clock 25", and "Antenna articulation sensor 35"), the two right-most blocks in the bottom row ("Mid-point sampler 45" and "Spoofing detection hypothesis test 55"), and the top-right block ("Navigation solution 65") are standard processing blocks in a single tracking channel of a digital GNSS receiver. A new function of each tracking channel is to synthesize a special beat carrier-phase measurement for input to the spoofing detection test. This is done using the "Mid-point sampler 45" block just to the right of center at the bottom of the figure and using the summation junction to the right of this block. A receiver uses L such channels to track L signals. It provides L carrier-phase time histories to the "Spoofing detection hypothesis test 55" block in the bottom right-hand corner of the figure.

The 3 blocks labeled "RF front-end 15", "Receiver clock 25", and "Navigation solution 65" are also standard blocks. They are common to all receiver channels. They provide inputs to or accept outputs from each channel.

The 2 blocks "Antenna articulation sensor 35" and "Spoofing detection hypothesis test 55" are new blocks needed for spoofing detection. They are also common to all channels.

The RF signal from the patch antenna on the left-hand side of the figure first passes through an RF front-end. This RF front-end mixes the signal so that the nominal carrier frequency is down-translated to the intermediate frequency (IF) $\omega_{IF}$. The RF front-end uses an ADC to digitally sample this IF signal, and sends the result into the receiver's high-sample-rate digital signal processing hardware. The signal first gets mixed to baseband, both in-phase and quadrature, as it moves from left to right across the center of the figure. Next, the signal is mixed with the prompt replica of the pseudo random number (PRN) code that is particular to the satellite being tracked. The base-band mixing signal is provided by the Phase-Lock Loop (PLL) feedback in the lower central portion of the figure. Its estimate of the carrier Doppler shift for the k$^{th}$ accumulation interval is $\omega_{PLLk}$. The prompt PRN code replica is provided by the Delay-Lock Loop (DLL) feedback in the upper central portion of the figure. Its estimate of the PRN code's Doppler-shifted chipping rate is $f_{chipk}$. These two tracking loops rely on the prompt in-phase and quadrature accumulations, $I_{pk}$ and $Q_{pk}$ for the k$^{th}$ accumulation interval, which are computed by the accumulate-and-dump registers just to the right of the figure's center. The DLL discriminator also uses in-phase and prompt early-minus-late accumulations $I_{emik}$ and $Q_{emik}$ or related accumulations, but the signal processing paths for computing these standard accumulations is omitted from the figure.

The following quantities are the important outputs of the standard signal tracking hardware part of FIG. 4: The PLL (negative) beat carrier phase time history $\phi_{PLL}(t)$, the mid-point time of the k$^{th}$ accumulation interval $\tau_{midk}=0.5(\tau_{ck}+\tau_{ck+1})$, and the PLL phase error discriminator value for this interval $\Delta\phi_{PLLk}$. The beat carrier phase is termed "negative" because it has the opposite sign of the usual beat carrier phase definition in the GPS literature. It equals the time integral of the received carrier Doppler shift, and it increase as the range from the GNSS satellite to the receiver decreases. Note that the start and stop times for the $k^{th}$ accumulation interval are $\tau_{ck}$ and $\tau_{ck+1}$, as dictated by the DLL.

The summation junction in the lower right-hand corner of FIG. 4 synthesizes the following wideband estimate of the (negative) beat carrier phase at the accumulation interval's mid-point:

$$\phi_k = \phi_{PLL}(\tau_{midk}) - \Delta\phi_{PLLk} \qquad (3)$$

This modified carrier-phase observable differs in two significant respects from the standard beat carrier phase measurement produced by most receivers, that is, from $\phi_{PLL}(\tau_{midk})$. First, the measurement noise samples for different accumulation periods are white rather than colored. Second, $\phi_k$ does not attenuate the effects of high-frequency components of $b_a(t)$ that lie outside the PLL bandwidth; $\phi_{PLL}(\tau_{midk})$ includes only attenuated versions of these components. These distinctives of the $\phi_k$ observable are important to the proper functioning of the spoofing detection tests. Note, however, that the noise power in $\phi_k$ is larger than in $\phi_{PLL}(\tau_{midk})$. This drawback is insignificant in comparison to the advantage of having a wide-band beat carrier phase measurement corrupted by white noise rather than colored noise.

Note that some receivers may use slightly different signal processing strategies that could impact the needed summation in Eq. (3). In particular, the $-\Delta\phi_{PLLk}$ term on the right-hand side of Eq. (3) must be replaced by $+\Delta\phi_{PLLk}$ in some cases in order to properly form the wideband (negative) beat carrier phase. This will be the case if the RF front-end uses high-side mixing while the receiver uses the absolute value of the resulting intermediate frequency as its $\omega_{IF}$. Alternatively, a negation of the quadrature baseband mixing signal used to form $Q_{pk}$ would create the need for this same sign change in the $\phi_k$ formula.

The spoofing detection block in the bottom right-hand corner of FIG. 4 takes four types of inputs: the antenna articulation time history $b_a(t)$, the accumulation mid-point time $\tau_{midk}$ for each tracking channel, the wideband (negative) beat carrier phase $\phi_k$ for each tracking channel, and the unit direction vector that points from each tracked GNSS satellite $\hat{r}$. Suppose that there are L tracked GNSS satellites labeled j=1, . . . , L. Suppose, also, that for satellite j the spoofing detection test uses data from $N_j$ accumulations. Then the spoofing detection receiver must implement L parallel DLL/PLL/wideband-beat-carrier-phase signal processing channels as per FIG. 4. The resulting outputs of these L channels that will be used in the spoofing detection block will be $\tau_{midk}^j$ and $\phi_k^j$ for k=1, . . . , $N_j$ and j=1, . . . , L. Also used will be $b_a(\tau_{midk}^j)$ for k=1, . . . , $N_j$ and j=1, . . . , L along with $\hat{r}^j$ for j=1, . . . , L. This set of inputs implies that the spoofing detection interval is short enough to approximate each unit direction vector $\hat{r}^j$ as being constant.

In the results presented herein below, the GNSS receiver is a "software" receiver. In embodiments of the system of these teachings, components can be implemented as dedicated hardware, dedicated circuits, or software being executed by a processor. A component being configured for, as used herein, refers to either dedicated hardware design to perform specified functions or to computer usable media having computer readable code embodied therein, which when executed by a processor, cause of the processor to perform the specified functions. FIG. 4a shows the latter configuration. Referring to FIG. 4a, computer usable media 120 has computer readable code embodied therein that, when executed in one or more processors 110, causes the processor to perform functions in the method of these teachings. The computer usable media 120 is operatively connected to the one or more processors 110 through a computer interconnection component 115 (such as a computer bus). An input interface 125 is also operatively connected to the one or more processors 110 and to the computer usable media 120 in order to allow for input necessary for performing the desired functions.

The calculations implemented in the spoofing detection block are the subject of Sections III-VIII.

III. Carrier Phase Model for Spoofing Detection

Two models of the negative beat carrier phase observable $\phi_k^j$ are needed in order to do spoofing detection. The first model covers the non-spoofed case, and the second model covers the spoofed case.

A. Non-Spoofed Carrier Phase Model and Cycle-Slip Repair

The non-spoofed carrier phase model starts with a standard model from the GPS literature $$\phi_k^j = -\frac{2\pi}{\lambda}\sqrt{[r_k^j + A_k^T b_a(\tau_{midk}^j)]^T [r_k^j + A_k^T b_a(\tau_{midk}^j)]} - \qquad (4)$$

$$\omega_c(\delta t_{Rk} - \delta t_k^j - \tau_{ionok}^j + \tau_{tropok}^j) + \beta^j + n_{\phi k}^j$$

where $\lambda$ is the carrier wavelength, $\omega_c$ is the nominal carrier frequency in rad/sec ($=2\pi c/\lambda$, with c being the speed of light), $A_k$ is the 3-by-3 direction cosines matrix for the transformation from the reference coordinate system in which the $r_k^j$ vector is known to the $(x_a, y_a, z_a)$ UE-fixed coordinate system in which $b_a(t)$ is known, $\delta t_{Rk}$ is the receiver clock error, $\delta t_k^j$ is the transmitter clock error for satellite j, $\tau_{ionok}^j$ is the ionospheric phase advance term, $\tau_{tropok}^j$ is the neutral atmosphere delay term, $\beta^j$ is the carrier phase bias, and $n_{\phi k}^j$ is the random component of the carrier phase noise. The leading negative sign on the right-hand side of Eq. (4) is what makes $\phi_k^j$ negative beat carrier phase rather than a standard beat carrier phase. The k subscripts on $r_k^j$, $A_k$, $\delta t_{Rk}$, $\delta t_k^j$, $\tau_{ionok}^j$, $\tau_{tropok}^j$, and $n_{\phi k}^j$ indicate that they all vary with the time of applicability $\tau_{midk}^j$. Note that $\omega_c$ equals $2\pi 1575.42 \times 10^6$ rad/sec for the GPS L1 signal.

The carrier phase bias term $\beta^j$ contains both the integer-ambiguity component and the lesser-known fractional cycle component. It does not have a k subscript because it will be constant in a well-designed receiver. In the current application, however, an insufficient PLL bandwidth coupled with a higher bandwidth antenna motion $b_a(t)$ can give rise to half- or full-cycle slips that violate this constancy assumption.

Therefore, it may be necessary to do some extra processing to a given $\phi_k^j$ vs. $\tau_{midk}^j$ beat carrier phase time history for k=1, . . . , $N_j$ in order to remove cycle slips and thereby ensure the required constancy of the bias. This amounts to a phase unwrapping operation. The needed operation starts with a detrending of $\phi_k^j$ vs. $\tau_{midk}^j$, perhaps by subtracting a linear or quadratic fit of this curve from $\phi_k^j$. Suppose that this detrended phase time history is $\delta\phi_{dtk}^j$ vs. $\tau_{midk}^j$.

The following pseudocode performs the necessary phase unwrapping in the case of half-cycle ambiguities:
1. Initialize the first sample of the unwrapping increment time history: $\delta\phi_{uwk}^j = 0$ for k=1.
2. Initialize k=2.
3.

$$\text{Set } \delta\phi_{uwk}^j = \pi \text{ round}\left[\frac{1}{\pi}(\delta\phi_{dtk-1}^j + \delta\phi_{uwk-1}^j - \delta\phi_{dtk}^j)\right].$$

4. Replace $\phi_k^j$ by $\phi_k^j + \delta\phi_{uwk}^j$.
5. Replace k by k+1.
6. If $k \leq N_j$, go to Step 2; otherwise, stop.

The round( ) function is the standard function that rounds its argument to the nearest integer.

If the tracked channel is a dataless pilot channel, such as the CL code on the GPS L2 signal, then any carrier-phase slips will be full cycles rather than half cycles. In this case, the 2-quadrant $\text{atan}(Q_{pk}/I_{pk})$ phase discriminator in FIG. 4 should be replaced with the 4-quadrant $\text{atan2}(Q_{pk}, I_{pk})$ discriminator, and the two $\pi$ terms in Step 3 of the above pseudocode should be replaced by $2\pi$ terms.

The magnitude of $b_a(t)$ is typically much smaller than the magnitude $r_k^j$ in Eq. (4), centimeters vs. 20,000 km. Therefore, the following approximation of Eq. (4) to first-order in $b_a$ is sufficiently accurate:

$$\phi_k^j \cong -\frac{2\pi}{\lambda}\left[\sqrt{(r_k^j)^T r_k^j} + (\hat{r}_k^j)^T A_k^T b_o(\tau_{midk}^j)\right] - \omega_c(\delta t_{Rk} - \delta t_k^j - \tau_{ionok}^j + \tau_{tropok}^j) + \beta^j + n_{\phi k}^j \tag{5}$$

An additional approximation is reasonable, that of a constant $\hat{r}^j$. The actual variations of elements of the $\hat{r}_k^j$ unit direction vector from their mean values over a typical spoofing detection interval of 0.5 sec or less are on the order of $6\times10^{-5}$ even for a supersonic aircraft traveling at Mach 3 in the opposite direction of GNSS Satellite j's ground track. The components of $b_a(t)$ typically are on the order of 10 cm or less. Therefore, $\hat{r}_k^j$ can be approximated by the constant $\hat{r}^j$ value that equals the $\hat{r}_k^j$ vector which applies at the mid-point of a given spoofing detection interval. Thus, the new approximate (negative) beat carrier phase equation becomes:

$$\phi_k^j \cong -\frac{2\pi}{\lambda}\left[\sqrt{(r_k^j)^T r_k^j} + (\hat{r}^j)^T A_k^T b_o(\tau_{midk}^j)\right] - \omega_c(\delta t_{Rk} - \delta t_k^j - \tau_{ionok}^j + \tau_{tropok}^j) + \beta^j + n_{\phi k}^j \tag{6}$$

Another simplification uses a quadratic polynomial in time in order to approximate all of the terms other than the $(\hat{r}^j)^T A_k^T b_a(\tau_{midk}^j)$ spoofing detection term and the $n_{\phi k}^j$ noise term. This involves the following approximation for the low-frequency behavior of the (negative) beat carrier phase:

$$\phi_{lf}^j(\tau_{midk}^j) = -\frac{2\pi}{\lambda}\sqrt{(r_k^j)^T r_k^j} - \omega_c(\delta t_{Rk} - \delta t_k^j - \tau_{ionok}^j + \tau_{tropok}^j) + \beta^j \cong \tag{7}$$
$$\beta_0^j + \beta_1^j(\tau_{midk}^j - \tau_{mid1}^j) + \frac{1}{2}\beta_2^j(\tau_{midk}^j - \tau_{mid1}^j)^2$$

where $\beta_0^j$, $\beta_1^j$, and $\beta_2^j$ are constant polynomial coefficients.

This approximation leads to the following non-spoofed carrier phase model $$\phi_k^j \cong -\frac{2\pi}{\lambda}(\hat{r}^j)^T A_k^T b_a(\tau_{midk}^j) + \beta_0^j + \tag{8}$$
$$\beta_1^j(\tau_{midk}^j - \tau_{mid1}^j) + \frac{1}{2}\beta_2^j(\tau_{midk}^j - \tau_{mid1}^j)^2 + n_{\phi k}^j$$

Yet another simplification approximates the coordinate transformation matrix $A_k$ as being constant over the spoofing detection interval. This leads to a dropping of its k subscript so that the carrier phase model becomes:

$$\phi_k^j \cong -\frac{2\pi}{\lambda}(\hat{r}^j)^T A^T b_a(\tau_{midk}^j) + \beta_0^j + \tag{9}$$
$$\beta_1^j(\tau_{midk}^j - \tau_{mid1}^j) + \frac{1}{2}\beta_2^j(\tau_{midk}^j - \tau_{mid1}^j)^2 + n_{\phi k}^j$$

One last simplification of the carrier-phase model can be made in the special case of uni-axial motion in $b_a(t)$, as defined in Eq. (2). This takes place along the known unit vector direction $\hat{b}_a$ in antenna articulation coordinates and along the typically unknown vector direction $\hat{r}_a = A^T \hat{b}_a$ in reference coordinates. The beat carrier-phase model in this case becomes:

$$\phi_k^j \cong -\frac{2\pi}{\lambda}(\hat{r}^j)^T \hat{r}_a \rho_a(\tau_{midk}^j) + \beta_0^j + \tag{10}$$
$$\beta_1^j(\tau_{midk}^j - \tau_{mid1}^j) + \frac{1}{2}\beta_2^j(\tau_{midk}^j - \tau_{mid1}^j)^2 + n_{\phi k}^j$$

with the antenna deflection amplitude time history $\rho_a(t)$ known.

Carrier Phase Noise Model. The carrier phase noise term $n_{\phi k}^j$ is modeled as being Gaussian white noise. Its statistics are $$E\{n_{\phi k}^j\} = 0 \text{ and} \tag{11}$$
$$E\{n_{\phi k}^j n_{\phi l}^j\} = \begin{cases} (\sigma^j)^2 & \text{if } k = l \\ 0 & \text{if } k \neq l \end{cases} \text{ with}$$
$$(\sigma^j)^2 = \frac{1}{2(C/N_0)^j \Delta\tau_{cavg}^j}$$

where $(C/N_0)^j$ is the carrier-to-noise ratio of the received signal for GNSS Satellite j in absolute Hz units and where $\Delta\tau_{cavg}^j = \text{mean}(\tau_{ck+1} - \tau_{ck})$ is the average accumulation interval in the Satellite j tracking system, as depicted in FIG. 4, given in seconds. The units of $\sigma^j$ in Eq. (11) are radians. Note that the phase noise terms for different GNSS satellites are assumed to be uncorrelated.

B. Spoofed Carrier Phase Model

The spoofed carrier phase model starts with a modified version of Eq. (4) that includes both the effects of the spoofer's signal design and the relative geometry between the spoofer and the intended victim. The spoofer is assumed to know the relative geometry between it and the origin of the $(x_a, y_a, z_a)$ UE-fixed coordinate system. It is assumed not to know the $b_a(t)$ antenna articulation motions. As per the attack mode described, for example, in Humphreys. T. E., Ledvina, B. M., Psiaki, M. L., O'Hanlon, B., and Kintner, P. M., Jr., "Assessing the Spoofing Threat: Development of a Portable GPS Civilian Spoofer," *Proc. ION GNSS* 2008, Sept. 16-19, 2008, Savannah, Ga. and in Humphreys, T. E., Kintner, P. M., Jr., Psiaki, M. L., Ledvina, B. M., and O'Hanlon, B. W., "Assessing the Spoofing Threat," *GPS World*, Vol. 20, No. 1, January 2009, pp. 28-38, the spoofer is presumed to have compensated for the known part of the relative geometry so that the signal looks to the victim like a real GNSS signal.

The spoofed beat carrier phase model that corresponds to this type of attack is $$\phi_k^j = -\frac{2\pi}{\lambda}\{\sqrt{(r_k^j)^T r_k^j} - \sqrt{(r_k^{sp})^T r_k^{sp}} + \qquad (12)$$

$$\sqrt{[r_k^{sp} + A_k^T b_a(\tau_{midk}^j)]^T [r_k^{sp} + A_k^T b_a(\tau_{midk}^j)]}\} -$$

$$\omega_c(\delta t_{Rk} + \delta t_{Rspk} - \delta t_k^j - \tau_{ionok}^j + \tau_{tropok}^j) + \beta^j + n_{\phi k}^j$$

The first two terms in the braced expression on the right-hand side of Eq. (12) are generated by the spoofer as part of its false signal. The third term in that expression is the term due to the geometry of the spoofer/victim relative antenna location. The spoofer synthesizes the second of its terms with the goal of canceling the effects of the third term. Were it not for the $b_a(t)$ antenna articulations, this cancellation would be perfect.

The spoofer also synthesizes the terms $\delta t_{Rspk}$, $\delta t_k^j$, $\tau_{ionok}^j$, and $\tau_{tropok}^j$ in Eq. (12). These terms represent, respectively, the spoofed increment to the victim receiver clock error, the spoofed GNSS satellite clock error, the spoofed ionospheric carrier phase advance, and the spoofed ionospheric delay.

After a set of approximations similar to those used to go from Eq. (4) to Eqs. (6), (8), and (9) for the non-spoofed case, a reasonable approximation of the spoofed carrier-phase model in Eq. (12) takes the form:

$$\phi_k^j \cong -\frac{2\pi}{\lambda}(\hat{r}^{sp})^T A^T b_a(\tau_{midk}^j) + \beta_0^j + \qquad (13)$$

$$\beta_1^j(\tau_{midk}^j - \tau_{mid1}^j) + \frac{1}{2}\beta_2^j(\tau_{midk}^j - \tau_{mid1}^j)^2 + n_{\phi k}^j$$

This chain of approximations includes a linearization in terms of $b_a(t)$ of the nonlinear $3^{rd}$ term on the right-hand side of Eq. (12). This linearization is reasonable because the magnitude of $b_a(t)$ is normally much smaller than the magnitude of $r_k^{sp}$, less than 10 cm vs. 10 s of meters or more. The approximation also involves replacing the time-varying unit-direction vector $\hat{r}_k^{sp}$ with the constant mid-point direction $\hat{r}^{sp}$. This approximation is reasonable because a spoofer typically maintains a relative geometry to the victim that does not vary very rapidly with time; otherwise, it might have trouble spoofing the victim. If either of these approximations were to break down, either because the spoofer was very close to the victim or because it changed geometry very rapidly, then Eq. (13) should and could be modified appropriately.

The approximation in Eq. (13) involves a modified low-frequency polynomial approximation for the non-articulation terms in the beat carrier phase model of Eq. (12). This approximation takes the form $$\phi_{if}^j(\tau_{midk}^j) - \frac{2\pi}{\lambda}\sqrt{(r_k^j)^T r_k^j} - \omega_c(\delta t_{Rk} + \delta t_{Rspk} - \delta t_k^j - \tau_{ionok}^j + \tau_{tropok}^j) + \qquad (14)$$

$$\beta^j \cong \beta_0^j + \beta_1^j(\tau_{midk}^j - \tau_{mid1}^j) + \frac{1}{2}\beta_2^j(\tau_{midk}^j - \tau_{mid1}^j)^2$$

with $\beta_0^j$, $\beta_1^j$, and $\beta_2^j$ again being constant polynomial coefficients. The only differences between this low-frequency approximation and that of Eq. (7) are the presence of the spoofed receiver clock error increment $\delta t_{Rspk}$ and the fact that most of the terms in this model are spoofed quantities rather than true quantities.

The salient feature of the spoofed carrier phase model in Eq. (13) is the first term on its right-hand side. In comparing this model to the non-spoofed model in Eq. (9), a single difference stands out: The non-spoofed satellite-to-receiver direction vector $\hat{r}^j$ in Eq. (9) is replaced by the spoofer-to-receiver direction vector $\hat{r}^{sp}$. The most important aspect of this replacement is that this direction is the same for all satellites j=1, ..., L for the spoofed case, but different for the non-spoofed case. This fact implies that all signals' beat carrier phase time histories, $\phi_k^j$ vs. $\tau_{midk}^j$ for k=1, ..., $N_j$ and j=1, ..., L will display identical $b_a(t)$ effects in the spoofed case but different $b_a(I)$ effects in the non-spoofed case. This is a principal upon which the present teachings' spoofing detection tests are based.

Similar to the non-spoofed case, a modified form of Eq. (13) can be developed for the special case of rectilinear antenna articulation motion, as defined in Eq. (2). It takes the form $$\phi_k^j \cong -\frac{2\pi}{\lambda}(\hat{r}^{sp})^T \hat{r}_a \rho_a(\tau_{midk}^j) + \beta_0^j + \qquad (15)$$

$$\beta_0^j(\tau_{midk}^j - \tau_{mid1}^j) + \frac{1}{2}\beta_2^j(\tau_{midk}^j - \tau_{mid1}^j)^2 + n_{\phi k}^j$$

Recall that $\hat{r}_a = A^T \hat{b}_a$ is the articulation unit direction vector in reference coordinates and that $\rho_a(t)$ is the articulation magnitude. The former quantity is often unknown, but the latter is usually known exactly.

IV. Spoofing Detection Hypothesis Tests With Uni-Axial Antenna Articulations and known Attitude A. Restriction to Uni-axial Antenna Articulations The spoofing detection test and analyses of the present section and of Sections V and VI deal with the special case of uni-axial antenna articulation motion as defined in the antenna coordinate system, i.e., as in Eq. (2). Therefore, Eq. (10) models the beat carrier phase in the non-spoofed case, and Eq. (15) is the spoofed-case model. This restriction to uni-axial motion is not necessary to the method. It is adopted here for two reasons: First, it simplifies the resulting spoofing detection statistic calculations and the analyses of their false-alarm and missed-detection probabilities. Second, it simplifies the design of the articulation hardware. Section VIII outlines methods to modify the detection statistic calculations and the corresponding probability analyses for a general 3-dimensional $b_a(t)$ antenna articulation time history.

B. High-Pass Filtering via Linear Least-Squares Estimation

High-pass filtering of the carrier-phase measurements can be used to remove the low-frequency effects of unknown UE motion and unknown UE receiver clock drift. This high-pass filtering amounts to least-squares estimation of the unknown polynomial coefficients $\beta_0^j$, $\beta_1^j$, and $\beta_2^j$ in Eq. (10) or Eq.

(15). The same calculations can be used to isolate the uni-axial antenna motion effects into a single equation per GNSS signal.

The needed filtering calculations for the $j^{th}$ GNSS signal start with the following over-determined system of linear equations $$\begin{bmatrix} \phi_1^j \\ \phi_2^j \\ \phi_3^j \\ \vdots \\ \phi_{N_j}^j \end{bmatrix} = \begin{bmatrix} 1 & 0 & 0 & -\frac{2\pi}{\lambda}\rho_a(\tau_{mid1}^j) \\ 1 & (\tau_{mid2}^j - \tau_{mid1}^j) & \frac{1}{2}(\tau_{mid2}^j - \tau_{mid1}^j)^2 & -\frac{2\pi}{\lambda}\rho_a(\tau_{mid2}^j) \\ 1 & (\tau_{mid3}^j - \tau_{mid1}^j) & \frac{1}{2}(\tau_{mid3}^j - \tau_{mid1}^j)^2 & -\frac{2\pi}{\lambda}\rho_a(\tau_{mid3}^j) \\ \vdots & \vdots & \vdots & \vdots \\ 1 & (\tau_{midN_j}^j - \tau_{mid1}^j) & \frac{1}{2}(\tau_{midN_j}^j - \tau_{mid1}^j)^2 & -\frac{2\pi}{\lambda}\rho_a(\tau_{midN_j}^j) \end{bmatrix} \begin{bmatrix} \beta_0^j \\ \beta_1^j \\ \beta_2^j \\ (\hat{r}^x)^T \hat{r}_a \end{bmatrix} + \begin{bmatrix} n_{\phi1}^j \\ n_{\phi2}^j \\ n_{\phi3}^j \\ \vdots \\ n_{\phi N_j}^j \end{bmatrix} \quad (16)$$

This same set of equations is repeated once for each satellite $j = 1, \ldots, L$. In the non-spoofed case, the unit direction vector $\hat{r}^x$ in Eq. (16) is $\hat{r}^j$, but it equals $\hat{r}^{sp}$ in the spoofed case.

The high-pass filter works by computing the orthogonal/upper-triangular (QR) factorization of a normalized version of the $N_j$-by-4 coefficient matrix on the right-hand side of Eq. (16). This factorization takes the form:

$$Q^j \begin{bmatrix} R_{11}^j & R_{12}^j & R_{13}^j & R_{14}^j \\ 0 & R_{22}^j & R_{23}^j & R_{24}^j \\ 0 & 0 & R_{33}^j & R_{34}^j \\ 0 & 0 & 0 & R_{44}^0 \\ 0 & 0 & 0 & 0 \\ \vdots & \vdots & \vdots & \vdots \end{bmatrix} = \frac{1}{\sigma^j} \begin{bmatrix} 1 & 0 & 0 & -\frac{2\pi}{\lambda}\rho_a(\tau_{mid1}^j) \\ 1 & (\tau_{mid2}^j - \tau_{mid1}^j) & \frac{1}{2}(\tau_{mid2}^j - \tau_{mid1}^j)^2 & -\frac{2\pi}{\lambda}\rho_a(\tau_{mid2}^j) \\ 1 & (\tau_{mid3}^j - \tau_{mid1}^j) & \frac{1}{2}(\tau_{mid3}^j - \tau_{mid1}^j)^2 & -\frac{2\pi}{\lambda}\rho_a(\tau_{mid3}^j) \\ \vdots & \vdots & \vdots & \vdots \\ 1 & (\tau_{midN_j}^j - \tau_{mid1}^j) & \frac{1}{2}(\tau_{midN_j}^j - \tau_{mid1}^j)^2 & -\frac{2\pi}{\lambda}\rho_a(\tau_{midN_j}^j) \end{bmatrix} \quad (17)$$

The $N_j$-by-$N_j$ orthonormal matrix $Q^j$ and the $R_{11}^j$, $R_{12}^j$, $R_{13}^j$, ..., $R_{44}^j$ elements of the corresponding upper-triangular matrix are computed as the QR factorization algorithm's outputs, and the matrix on the right-hand side of Eq. (17) is the input The high-pass filter operations also compute the transformed, normalized beat carrier phase time history, and they are used to define the corresponding noise time history:

$$\begin{bmatrix} z_1^j \\ z_2^j \\ z_3^j \\ z_4^j \\ \vdots \\ z_{N_j}^j \end{bmatrix} = \frac{1}{\sigma^j}(Q^j)^T \begin{bmatrix} \phi_1^j \\ \phi_2^j \\ \phi_3^j \\ \phi_4^j \\ \vdots \\ \phi_{N_j}^j \end{bmatrix} \text{ and} \quad (18)$$

$$\begin{bmatrix} n_1^j \\ n_2^j \\ n_3^j \\ n_4^j \\ \vdots \\ n_{N_j}^j \end{bmatrix} = \frac{1}{\sigma^j}(Q^j)^T \begin{bmatrix} n_{\phi1}^j \\ n_{\phi2}^j \\ n_{\phi3}^j \\ \vdots \\ n_{\phi N_j}^j \end{bmatrix}$$

The orthogonal nature of $Q^j$ and the $1/\sigma^j$ normalization factor cause the transformed, normalized Gaussian noise vector $[n_1^j; \ldots; n_{N_j}^j]$ to have an identity covariance matrix. Note that this vector has a mean of zero.

The important output of these high-pass filtering operations is a single equation for each GNSS signal that contains all the information about whether or not it has been spoofed. This equation is the $4^{th}$ scalar equation in the transformed, normalized version of Eq. (16). It takes the form:

$$z_4^j = R_{44}^j[(\hat{r}^x)^T \hat{r}_a] + n_4^j \quad (19)$$

where $n_4^j$ is a zero-mean, unit-variance Gaussian random scalar. The $1^{st}$ through $3^{rd}$ equations in the transformed system do not affect any of the spoofing detection tests because their effects can be integrated out of any standard Neyman-Pearson test under the diffuse prior assumption about the polynomial coefficients $\beta_0^j$, $\beta_1^j$, and $\beta_2^j$. The resulting integrals are identical under the non-spoofed and spoofed hypotheses. Equations 5 through $N_j$ are identical under the non-spoofed and spoofed hypothesis. Therefore, neither do they contribute to the optimal Neyman-Pearson detection statistic. They serve only to isolate the residual error terms $z_5^j, \ldots, z_{N_j}^j$. The data in Eq. (19) for $j = 1, \ldots, L$ will form the basis for the spoofing detection tests of this section and of Sections V and VI.

C. Spoofing Detection Hypothesis Test for Fixed-Base UE with Known Attitude

The optimal Neyman-Pearson test statistic is based on the ratio of the probability densities of the carrier-phase data given the two hypotheses, the $H_0$ hypothesis of no spoofing and the $H_1$ hypothesis of spoofing. Stated in terms of the high-pass-filtered result in Eq. (19), the two relevant probability densities are:

$$p(z_4^1, \ldots, z_4^L | H_0) = w\exp\left(-\frac{1}{2}\sum_{j=1}^{L}\{R_{44}^j[(\hat{r}^j)^T \hat{r}_a] - z_4^j\}^2\right) \quad (20a)$$

$$p(z_4^1, \ldots, z_4^L | \hat{r}^{sp}, H_1) = w\exp\left(-\frac{1}{2}\sum_{j=1}^{L}\{R_{44}^j[(\hat{r}^{sp})^T \hat{r}_a] - z_4^j\}^2\right) \quad (20b)$$

In the fixed-location case with a known attitude, $\hat{r}_a$ is known as are $\hat{r}^1$ through $\hat{r}^L$. The dot product quantity $(\hat{r}^{sp})^T\hat{r}_a$ is the only unknown quantity. In an optimal detection test, this unknown quantity would be integrated out of the probability density expression in Eq. (20b). A simpler suboptimal approach, however, is to use the value of $(\hat{r}^{sp})^T \hat{r}_a$ that maximizes the probability density in Eq. (20b), i.e., to use the maximum-likelihood estimate of $(\hat{r}^{sp})^T \hat{r}_a$ under the spoofed assumption. This maximum-likelihood estimate also minimizes the negative natural logarithm of the spoofed likelihood function. If this unknown dot product is defined to be $\eta = (\hat{r}^{sp})^T \hat{r}_a$, then the negative-log-likelihood cost function for estimating it is:

$$J_{sp}(\eta) = -\ln[p(z_4^1, \ldots, z_4^L | \hat{r}^{sp}, H_1)] + \ln[w] + \frac{1}{2}\sum_{j=1}^{L}(R_{44}^j \eta - z_4^j)^2 \quad (21)$$

Note that this cost definition cancels the constant negative natural logarithm of the normalizing probability density constant w without affecting any subsequent results.

The optimal value of this dot product under the spoofing assumption can be computed by first solving for its unconstrained minimizing value. Standard linear least-squares techniques yield:

$$\eta_{uopt} = \frac{\sum_{j=1}^{L} R_{44}^j z_4^j}{\sum_{j=1}^{L} (R_{44}^j)^2} \quad (22)$$

Afterwards, the constraints $-1 \leq \eta \leq 1$ are enforced to produce the final solution:

$$\eta_{opt} = \begin{cases} -1 & \text{if } \eta_{uopt} < -1 \\ \eta_{uopt} & \text{if } -1 \leq \eta_{uopt} \leq 1 \\ 1 & \text{if } 1 < \eta_{uopt} \end{cases} \quad (23)$$

This constraint arises from the fact that the $\eta$ dot product is defined between two unit direction vectors.

Given the dot product estimate in Eq. (23), the associated spoofing detection statistic can be defined in terms of the difference between the negative logarithms of the spoofed and non-spoofed probability density functions in, respectively, Eqs. (20b) and (20a). The former quantity is $J_{sp}(\eta_{opt})$. The latter quantity is $$J_{nonsp} = -\ln[p(z_4^1, \ldots, z_4^L | H_0)] + \ln[w] = \frac{1}{2}\sum_{j=1}^{L}\{R_{44}^j[(\hat{r}^j)^T \hat{r}_a] - z_4^j\}^2 \quad (24)$$

This latter quantity is defined using the cost-function-like notation "J" even though it contains no unknown quantities that need to be determined via maximum-likelihood optimization. This notation has been adopted because spoofing detection tests for later cases will involve unknown quantities for the non-spoofed $H_0$ hypothesis in addition to the unknown dot product $\eta$ for the spoofed $H_1$ hypothesis.

Given these values, the spoofing detection hypothesis test statistic is $$\gamma = J_{sp}(\eta_{opt}) - J_{nonsp} \quad (25)$$

The corresponding spoofing detection test takes the form: Accept the non-spoofed hypothesis $H_0$ if $\gamma \geq \gamma_{th}$; otherwise, accept the spoofed hypothesis $H_1$. The quantity $\gamma_{th}$ is the detection threshold. Its value is determined based on a desired false-alarm probability, as described in the next subsection. Under the reasonable assumption that the use of $\eta_{opt}$ in $p(z_4^1, \ldots, z_4^L | \hat{r}^{sp}, H_1)$ yields nearly the same detection performance as would integration of the $\eta$ uncertainty out of $p(z_4^1, \ldots, z_4^L | \hat{r}^{sp}, H_1)$, this detection test is nearly optimal. This is true because there is a monotonic relationship between $\gamma$ and the optimal hypothesis test ratio $p(z_4^1, \ldots, z_4^L | H_0)/p(z_4^1, \ldots, z_4^L | \hat{r}^{sp}, H_1)$.

Before conducting a rigorous analysis, it is worthwhile to note that this detection test makes sense intuitively. If the signals from GNSS satellites $j = 1, \ldots, L$ are not being spoofed, then the non-spoofed carrier-phase model in Eq. (10) should fit the data well. The corresponding weighted sum of squared residual errors, $J_{nonsp}$ in Eq. (24), should be small. The spoofed carrier-phase model in Eq. (15), however, should not fit the data well, and the associated optimized weighted sum of squared residuals, $J_{sp}(\eta_{opt})$, should be large. Therefore, Eq. (25) should produce a large, positive value of the spoofing detection statistic $\gamma$. This value will exceed any reasonable choice of $\gamma_{th}$, and the lack of spoofing will be correctly identified. In the case of spoofing, however, it is $J_{nonsp}$ that should be large due to the poor fit of the non-spoofed model in Eq. (10), and $J_{sp}(\eta_{opt})$ should be small due to the good fit of the spoofed model in Eq. (15). The resulting $\gamma$ from Eq. (25) will likely be negative and lie below any reasonable $\gamma_{th}$ threshold value. The threshold test will successfully detect a spoofing attack in this case.

D. Approximation of Non-Spoofed and Spoofed Probability Density Functions of Spoofing Detection Statistic Design of the spoofing detection threshold and analysis of the detection power starts with derivation of two probability density functions. One is the probability density function for the detection statistic $\gamma$ under the non-spoofed hypothesis, $p(\gamma|H_0)$. The other is the $\gamma$ probability density function under the spoofed hypothesis, $p(\gamma|\eta H_1)$. The random variability of $\gamma$ which gives rise to its probability density function in each of these cases derives from the detection statistic's dependence on the zero-mean, identity-covariance L-by-1 Gaussian random vector $v = [n_4^1; n_4^2; n_4^3; \ldots; n_4^L]$ Analysis of the non-spoofed density function $p(\gamma|H_0)$ yields the result that $\gamma$ can be expressed as the sum of two uncorrelated random terms:

$$\gamma = -\frac{1}{2}\chi_1^2 + y_{nonsp} \quad (26)$$

where $\chi_1^2$ is a sample from a chi-squared distribution of degree 1 and where $y_{nonsp}$ is a Gaussian random variable with mean and variance:

$$\bar{y}_{nonsp} = \frac{1}{2}\sum_{j=1}^{L}\{R_{44}^j[(\hat{r}^j)^T \hat{r}_a]\}^2 - \frac{1}{2}\frac{\left\{\sum_{j=1}^{L}(R_{44}^j)^2[(\hat{r}^j)^T \hat{r}_a]\right\}^2}{\sum_{j=1}^{L}(R_{44}^j)^2} \quad (27a)$$

$$\sigma_{y_{nonsp}}^2 = \sum_{j=1}^{L}\{R_{44}^j[(\hat{r}^j)^T \hat{r}_a]\}^2 - \frac{1}{2}\frac{\left\{\sum_{j=1}^{L}(R_{44}^j)^2[(\hat{r}^j)^T \hat{r}_a]\right\}^2}{\sum_{j=1}^{L}(R_{44}^j)^2} \quad (27b)$$

The derivation that leads to Eqs. (26)-(27a) is based on an analysis of the ways in which $J_{sp}$ and $J_{nonsp}$ depend on $v$ and on $(\hat{r}^1)^T\hat{r}_a, \ldots, (\hat{r}^L)^T\hat{r}_a$, in the non-spoofed case. It assumes that the optimal estimate $\eta_{opt}$ from Eq. (23) is based on the middle condition. This is the typical situation, and the expected errors from this assumption are small when the first or third conditions of Eq. (23) apply. Therefore, this is a reasonable simplifying assumption. This simplifying assumption is used in the analysis of every test statistic that is developed in the present teachings.

An additional feature of the analysis leading to Eqs. (26)-(27a) involves a special transformation of the Gaussian random vector $v$. It is transformed orthogonally into a new vector whose first component is parallel to the unit-norm L-by-1 vector $q_{R44}=[R_{44}^1; \ldots; R_{44}^L]/\sqrt{(R_{44}^1)^2+\ldots+(R_{44}^L)^2}$. The remaining (L−1) components are orthogonal to this vector. The first component of this transformed random vector gives rise to the $\chi_1^2$ term in Eq. (26), and the last (L−1) components give rise to the randomness in the Gaussian term $\gamma_{nonsp}$.

One final approximation leads to a model of $p(\gamma|H_0)$. This approximation assumes that the randomness in $y_{nonsp}$ dominates the randomness in $\chi_1^2$ in determining the variability of $\gamma$ for the non-spoofed case. This is reasonable because the variance $\sigma_{\gamma nonsp}^2$ is typically much larger than the variance of the term $$-\frac{1}{2}\chi_1^2,$$

which equals 0.5. This approximation leads to $$p(\gamma|H_0) \cong N\left[\gamma; \left(-\frac{1}{2}+\bar{y}_{nonsp}\right), \left(\frac{1}{2}+\sigma_{\gamma nonsp}^2\right)^{0.5}\right] = \quad (28)$$

$$N[\gamma; \bar{\gamma}_{nonsp}, \sigma_{\gamma nonsp}]$$

where $N(x;\bar{x},\sigma_x)$ denotes the usual scalar Gaussian distribution:

$$N(x; \bar{x}, \sigma_x) = \frac{1}{\sqrt{2\pi}\,\sigma_x} e^{-(x-\bar{x})^2/(2\sigma_x^2)} \quad (29)$$

and where the mean and standard deviation of the non-spoofed detection statistic are $$\bar{\gamma}_{nonsp} = -\frac{1}{2}+\bar{y}_{nonsp} \quad (30a)$$

$$\sigma_{\gamma nonsp} = \sqrt{\frac{1}{2}+\sigma_{\gamma nonsp}^2} \quad (30b)$$

An analysis of the spoofed density function $p(\gamma|\eta,H_1)$ yields the following expression for $\gamma$:

$$\gamma = -\frac{1}{2}\chi_{nc1}^2 + y_{sp} \quad (31)$$

where $\chi_{nc1}^2$ is a sample from a non-central chi-squared distribution of degree 1 and where $y_{sp}$ is a Gaussian random variable. These two random quantities are uncorrelated. The non-centrality parameter of $\chi_{nc1}^2$ is $$\lambda_{nc} = \frac{\left\{\sum_{j=1}^{L}(R_{44}^j)^2[\eta-(\hat{r}^j)^T\hat{r}_a]\right\}^2}{\sum_{j=1}^{L}(R_{44}^j)^2} \quad (32)$$

so that $\chi_{nc1}^2$ is the square of the sum of a zero-mean, unit-variance Gaussian random variable and the constant $\sqrt{\lambda_{nc}}$. The mean and variance of $y_{sp}$ are $$\bar{y}_{sp} = -\frac{1}{2}\sum_{j=1}^{L}\{R_{44}^j[\eta-(\hat{r}^j)^T\hat{r}_a]\}^2 + \frac{1}{2}\frac{\left\{\sum_{j=1}^{L}(R_{44}^j)^2[\eta-(\hat{r}^j)^T\hat{r}_a]\right\}^2}{\sum_{j=1}^{L}(R_{44}^j)^2} \quad (33a)$$

$$\sigma_{ysp}^2 = \sum_{j=1}^{L}\{R_{44}^j[\eta-(\hat{r}^j)^T\hat{r}_a]\}^2 - \frac{\left\{\sum_{j=1}^{L}(R_{44}^j)^2[\eta-(\hat{r}^j)^T\hat{r}_a]\right\}^2}{\sum_{j=1}^{L}(R_{44}^j)^2} \quad (33b)$$

The analysis that yields Eqs. (31)-(33b) involves the same orthonormal transformation as was used in the non-spoofed case, the one that transforms the Gaussian random vector $v$ into a first component parallel to the unit direction vector $q_{R44}$ and the remaining (L−1) components perpendicular to it.

The final form of $p(\gamma|\eta,H_1)$ approximates the randomness in the spoofed version of $\gamma$ as being dominated by the Gaussian term $y_{sp}$, similar to the approximation used in the non-spoofed case. Again, This is reasonable because the variance $\sigma_{ysp}^2$ is typically much larger than the variance of $$-\frac{1}{2}\chi_{nc1}^2,$$

which equals $0.5+\lambda_{nc}$. The resulting $p(\gamma|\eta,H_1)$ approximation is the Gaussian:

$$p(\gamma|\eta, H_1) \cong N\left[\gamma; \left(-\frac{1}{2}-\frac{1}{2}\lambda_{nc}+\bar{y}_{sp}\right), \left(\frac{1}{2}+\lambda_{nc}+\sigma_{ysp}^2\right)^{0.5}\right] = \quad (34)$$

$$N[\gamma; \bar{\gamma}_{sp}(\eta), \sigma_{\gamma sp}(\eta)]$$

and where the mean and standard deviation of the non-spoofed detection statistic are $$\bar{\gamma}_{sp}(\eta) = -\frac{1}{2}-\frac{1}{2}\lambda_{nc}+\bar{y}_{sp} = -\frac{1}{2}-\frac{1}{2}\sum_{j=1}^{L}\{R_{44}^j[\eta-(\hat{r}^j)^T\hat{r}_a]\}^2 \quad (35a)$$

-continued $$\sigma_{\gamma sp}(\eta) = \sqrt{\frac{1}{2} + \lambda_{nc} + \sigma_{\gamma sp}^2} = \sqrt{\frac{1}{2} + \sum_{j=1}^{L}\{R_{44}^j[\eta - (\hat{r}^j)^T \hat{r}_a]\}^2} \quad (35b)$$

E. Design of Spoofing Detection Threshold and Analysis of Detection Probability

Given the approximation of $p(\gamma|H_0)$, the spoofing detection threshold $\gamma_{th}$ can be computed as a function of the desired false-alarm probability $\alpha$. It is determined by solving the following implicit equation for $\gamma_{th}$:

$$\alpha = \int_{-\infty}^{\gamma_{th}} p(\gamma | H_0) d\gamma = \frac{1}{\sqrt{2\pi}\,\sigma_{\gamma nonsp}} \int_{-\infty}^{\gamma_{th}} e^{-(\gamma - \overline{\gamma}_{nonsp})^2/(2\sigma_{\gamma nonsp}^2)} d\gamma \quad (36)$$

Standard software functions exist that can solve this equation for $\gamma_{th}$, e.g., MATLAB's "norminv" function.

Given the spoofing detection threshold $\gamma_{th}$ and the spoofed probability density function approximation $p(\gamma|\eta,H_1)$, the probability of a missed spoofing detection can be calculated as follows:

$$P_{MD} = \int_{\gamma_{th}}^{\infty} p(\gamma | \eta, H_1) d\gamma = \frac{1}{\sqrt{2\pi}\,\sigma_{\gamma sp}} \int_{\gamma_{th}}^{\infty} e^{-[\gamma - \overline{\gamma}_{sp}(\eta)]^2/[2\sigma_{\gamma sp}^2(\eta)]} d\gamma \quad (37)$$

Again, standard software functions, such as MATLAB's "normcdf" function, can be used to compute this probability.

Note how the spoofed mean and standard deviation, $\overline{\gamma}_{sp}(\eta)$ of Eq. (35a) and $\sigma_{\gamma p}(\eta)$ of Eq. (35b), both depend on the actual spoofed value of the vector dot product $\eta = (\hat{r}^{sp})^T \hat{r}_a$. This value is never actually known. One could use its estimate from Eq. (23) in order to carry out the calculations in Eqs. (35a), (35b), and (37). Alternatively, one could postulate an a priori distribution for $\eta$ and integrate out the dependence of $P_{MD}$ on this unknown quantity. A preferred approach, however, is to use its worst-case value to compute a worst-case $P_{MD}$. This value, designated as $\eta_{wc}$, is the value that maximizes $P_{MD}$ as computed using Eqs. (35a), (35b), and (37). In typical situations, $\eta_{wc}$ is the $\eta$ value that maximizes $\overline{\gamma}_{sp}(\eta)$ in Eq. (35a). This value is $$\eta_{wc} = \frac{\sum_{j=1}^{L} (R_{44}^j)^2 [(\hat{r}^j)^T \hat{r}_a]}{\sum_{j=1}^{L} (R_{44}^j)^2} \quad (38)$$

This is the value which minimizes the sum on the extreme right-hand side of Eq. (35a). This maximization of $\overline{\gamma}_{sp}(\eta)$ tends to push more of the area under the $p(\gamma|\eta,H_1)$ vs. $\gamma$ curve above the detection threshold $\gamma_{th}$, thereby increasing $P_{MD}$. Given this worst-case value, it can be used to define the worst-case mean and standard deviation of $\gamma$ under the spoofed assumption along with the worst-case probability of missed detection:

$$\overline{\gamma}_{spwc} = -\frac{1}{2} - \frac{1}{2}\sum_{j=1}^{L}\{R_{44}^j[\eta_{wc} - (\hat{r}^j)^T \hat{r}_a]\}^2 \quad (39a)$$

$$\sigma_{\gamma spwc} = \sqrt{\frac{1}{2} + \sum_{j=1}^{L}\{R_{44}^j[\eta_{wc} - (\hat{r}^j)^T \hat{r}_a]\}^2} \quad (39b)$$

$$P_{MDwc} = \frac{1}{\sqrt{2\pi}\,\sigma_{\gamma spwc}} \int_{\gamma_{th}}^{\infty} e^{-(\gamma - \overline{\gamma}_{spwc})^2/(2\sigma_{\gamma spwc}^2)} d\gamma \quad (39c)$$

V. Spoofing Detection Hypothesis Test for Moving-Base UE with Unknown Attitude

The spoofing detection test of the previous section can be adapted to the situation of an unknown receiver attitude by explicitly considering the possible orientations of the unknown articulation direction vector $\hat{r}_a$. In the spoofed case, the lack of a priori knowledge of $\hat{r}_a$ adds no further complication because the lack of knowledge of the direction to the spoofer, $\hat{r}^{sp}$, renders the dot product $\eta = (\hat{r}^{sp})^T \hat{r}_a$ unknown regardless of whether $\hat{r}_a$ is known or not. In the unspoofed case, however, lack of knowledge of $\hat{r}_a$ has a significant impact.

A. Spoofing Detection Hypothesis Test, Unknown Attitude

The optimal Neyman-Pearson spoofing detection test would multiply $p(z_4^1, \ldots, z_4^L|\hat{r}_a, H_0)$ from Eq. (20a) by an a priori probability distribution for $\hat{r}_a$ and compute the integral over all possible unit-normalized $\hat{r}_a$ values. A more practical approach, however, is to compute the maximum-likelihood estimate of $\hat{r}_a$ and to use it in $p(z_4^1, \ldots, z_4^L|\hat{r}_a, H_0)$. The maximum-likelihood estimate is the solution to the following minimization problem:

find: $\hat{r}_a$ (40a)

to minimize:

$$J_{nonsp}(\hat{r}_a) = \frac{1}{2}\sum_{j=1}^{L}\{R_{44}^j[(\hat{r}^j)^T \hat{r}_a] - z_4^j\}^2 \quad (40b)$$

subject to: $(\hat{r}_a)^T \hat{r}_a = 1$ (40c)

This takes the form of a quadratically-constrained quadratic program. Its minimization of $J_{nonsp}(\hat{r}_a)$ is the equivalent of maximizing $p(z_4^1, \ldots, z_4^L|\hat{r}_a, H_0)$ because the former function equals a constant plus the negative natural logarithm of the latter.

The constrained optimal estimation problem in Eqs. (40a)-(40c) can be solved using a singular value decomposition coupled with a Lagrange-multiplier/constraint calculation. The computation begins with the singular value decomposition $$U = \begin{bmatrix} \sigma_a & 0 & 0 \\ 0 & \sigma_b & 0 \\ 0 & 0 & \sigma_c \\ 0 & 0 & 0 \\ \vdots & \vdots & \vdots \\ 0 & 0 & 0 \end{bmatrix} V^T = B = \begin{bmatrix} R_{44}^1(\hat{r}^1)^T \\ R_{44}^2(\hat{r}^2)^T \\ R_{44}^3(\hat{r}^3)^T \\ \vdots \\ R_{44}^L(\hat{r}^L)^T \end{bmatrix} \quad (41)$$

where U is an L-by-L orthonormal matrix, V is a 3-by-3 orthonormal matrix, and $\sigma_a \geq \sigma_b \geq \sigma_c \geq 0$ are the three non-negative singular values, in decreasing order, of the L-by-3 matrix B that is defined by the expression on the extreme right-hand side of Eq. (41). The B matrix is the input to the singular-value matrix factorization calculations, and U, V, $\sigma_a$, $\sigma_b$, and $\sigma_c$ are its outputs. Note that the singular values $\sigma_a$, $\sigma_b$, and $\sigma_c$ do not represent standard deviations.

Next, the U matrix is used to transform the non-homogeneous terms from the squared-error cost function in Eq. (40b):

$$\begin{bmatrix} z_a \\ z_b \\ z_c \\ z_r \end{bmatrix} = U^T \begin{bmatrix} z_4^1 \\ z_4^2 \\ z_4^3 \\ \vdots \\ z_4^L \end{bmatrix} \quad (42)$$

where $z_a$, $z_b$, and $z_c$ are scalars and $z_r$ is a vector of residuals.

Next, one defines the transformed unit direction vector of the antenna articulations:

$$\begin{bmatrix} \breve{r}_a \\ \breve{r}_b \\ \breve{r}_c \end{bmatrix} = \breve{r} = V^T \hat{r}_a \quad (43)$$

The singular-value decomposition and the vector transformations in Eqs. (42) and (43) can be used to pose an equivalent optimal estimation problem in terms of the unknown components of $\breve{r}$:

find: $\breve{r} = [\breve{r}_a; \breve{r}_b; \breve{r}_c]$ \quad (44a)

to minimize:

$$J'_{nonsp}(\breve{r}) = \frac{1}{2}(\sigma_a \breve{r}_a - z_a)^2 + \frac{1}{2}(\sigma_b \breve{r}_b - z_b)^2 + \frac{1}{2}(\sigma_c \breve{r}_c - z_c)^2 + \frac{1}{2} z_r^T z_r \quad (44b)$$

subject to: $\breve{r}_a^2 + \breve{r}_b^2 + \breve{r}_c^2 = 1$ \quad (44c)

This optimization problem can be solved by first adjoining the unit-norm constraint in Eq. (44c) to the cost function in Eq. (44b) using the undetermined Lagrange multiplier $\mu/2$. Next, one takes the first derivatives of the resulting Lagrangian with respect to the elements of $\breve{r}$ and one solves the resulting equations to yield:

$$\breve{r}_a = \frac{\sigma_a z_a}{\mu + \sigma_a^2}, \; \breve{r}_b = \frac{\sigma_b z_b}{\mu + \sigma_b^2}, \text{ and } \breve{r}_c = \frac{\sigma_c z_c}{\mu + \sigma_c^2} \quad (45)$$

These results are then substituted into the equality constraint in Eq. (44c) to yield a single equation in the single unknown $\mu$:

$$\frac{\sigma_a^2 z_a^2}{(\mu + \sigma_a^2)^2} + \frac{\sigma_b^2 z_b^2}{(\mu + \sigma_b^2)^2} + \frac{\sigma_c^2 z_c^2}{(\mu + \sigma_c^2)^2} = 1 \quad (46)$$

This equation can be transformed into a $6^{th}$-order polynomial in $\mu$ via multiplication by the product of all the denominator factors in Eq. (46):

$$0 = (\mu+\sigma_a^2)^2(\mu+\sigma_b^2)^2(\mu+\sigma_c^2)^2 - \sigma_a^2 z_a^2(\mu+\sigma_b^2)^2(\mu+\sigma_c^2)^2 - \sigma_b^2 z_b^2(\mu+\sigma_a^2)^2(\mu+\sigma_c^2)^2 - \sigma_c^2 z_c^2(\mu+\sigma_a^2)^2(\mu+\sigma_b^2)^2 \quad (47)$$

The polynomial in Eq. (47) is solved using standard numerical techniques. The solution procedure will normally yield 6 possible values of $\mu$. The correct value must be real. Typically, it is the minimum real value that is no smaller than $-\sigma_c^2$, which guarantees that the minimum is global. Special cases might arise in which a smaller value of $\mu$ yields the optimum if $\sigma_c^2 z_c^2 = 0$.

Given the globally-optimizing value of $\mu$, it can be substituted into Eq. (45) to determine the elements of $\breve{r}_{opt}$, and Eq. (43) can be inverted to determine $\hat{r}_{aopt} = V\breve{r}_{opt}$. This value of $\hat{r}_{aopt}$ is guaranteed to satisfy the unit normalization constraint in Eq. (40c) by virtue of the unit normalization constraint on $\breve{r}_{opt}$ in Eq. (44c) and by virtue of the orthogonality of the V matrix.

Given this non-spoofed $\breve{r}_{aopt}$, estimate and a spoofed-case $\eta_{opt}$ estimate computed as per Eqs. (22) and (23), the spoofing detection hypothesis test statistic for this scenario is $$\gamma = J_{sp}(\eta_{opt}) - J_{nonsp}(\hat{r}_{aopt}) \quad (48)$$

As in Section IV.C, the spoofing detection test takes the form: Accept the non-spoofed hypothesis $H_0$ if $\gamma \geq \gamma_{th}$; otherwise, accept the spoofed hypothesis $H_1$. This makes sense because one would expect $J_{nonsp}(\hat{r}_{aopt})$ to be small, $J_{sp}(\eta_{opt})$ to be large, and $\gamma$ to be a positive number if there were no spoofing. Conversely, one would expect $J_{nonsp}(\hat{r}_{aopt})$ to be large, $J_{sp}(\eta_{opt})$ to be small, and $\gamma$ to be a negative number if a spoofing attack were in progress. This is not an optimal Neyman-Pearson test because of the use of optimal estimates for the unknown values of $\eta$ and $\hat{r}_a$ rather than integration over their possible ranges, but experience shows that this type of test is likely to have good detection power.

B. Approximation of Non-Spoofed and Spoofed Probability Density Functions of Spoofing Detection Statistic, Unknown Attitude The spoofing detection threshold design begins with a derivation of the probability distribution of the detection statistic under the assumption of no spoofing, $p(\gamma|\hat{r}_a, H_0)$. This analysis must account for the effects of the zero-mean, identity-covariance Gaussian random vector $v$ as it propagates through the two optimizations involved in computing $\gamma$, the $\eta_{opt}$ calculation and the $\hat{r}_{aopt}$ calculation. The important new aspect of this analysis for the moving-base/unknown-attitude test is the effect of the optimal estimation of $\hat{r}_{aopt}$ on this propagation.

Analysis of the non-spoofed case yields the following approximation for the spoofing detection statistic:

$$\gamma \cong \frac{1}{2} g_{nonsp}^T(\hat{r}_a) g_{nonsp}(\hat{r}_a) + g_{nonsp}^T(\hat{r}_a) v + \frac{1}{2} v^T [H_{nonsp}(\hat{r}_a) - q_{R44} q_{R44}^T] v \quad (49)$$

where the L-by-1 vector $g_{nonsp}(\hat{r}_a)$ and the L-by-L symmetric matrix $H_{nonsp}(\hat{r}_a)$ are $$g_{nonsp}(\hat{r}_a) = (I - q_{R44} q_{R44}^T) B \hat{r}_a \quad (50a)$$

$$H_{nonsp}(\hat{r}_a) = [B\ 0] \begin{bmatrix} B^T B & \hat{r}_a \\ \hat{r}_a^T & 0 \end{bmatrix}^{-1} \begin{bmatrix} B^T \\ 0 \end{bmatrix} \quad (50b)$$

The formula for γ in Eq. (49) is exact to second order in the noise vector v. It can be derived by approximating the first-order optimality necessary conditions for the solution to the problem in Eqs. (40a)-(40c). This particular approximation is carried out to first order in v starting with recognition that the non-homogeneous vector $[z_4^1; \ldots; z_4^L]$ is equal to $B\hat{r}_a + v$ in the non-spoofed case. The resulting derivation is straightforward, but somewhat lengthy.

Note that the $H_{nonsp}(\hat{r}_a)$ matrix in Eq. (50b) is a projection matrix. Two of its eigenvalues equal 1, and the rest equal 0; it projects onto a 2-dimensional subspace.

The dominant random term in Eq. (49) is $g_{nonsp}^T(\hat{r}_a) v$. Its variance is typically much larger than that of the quadratic term $$\frac{1}{2} v^T [H_{nonsp}(\hat{r}_a) - q_{R44} q_{R44}^T] v.$$

It is also typically much larger than the variance of the neglected higher-order terms in v.

The dominance of the randomness in $g_{nonsp}^T(\hat{r}_a) v$ implies that a Gaussian approximation of γ is reasonable for this non-spoofed case. Thus $$p(\gamma | \hat{r}_a, H_0) \cong N[\gamma; \bar{\gamma}_{nonsp}(\hat{r}_a), \sigma_{nonsp}(\hat{r}_a)] \quad (51)$$

where the mean and standard deviation of this approximation are:

$$\bar{\gamma}_{nonsp}(\hat{r}_a) = \frac{1}{2} g_{nonsp}^T(\hat{r}_a) g_{nonsp}(\hat{r}_a) + \frac{1}{2} \text{trace}[H_{nonsp}(\hat{r}_a) - q_{R44} q_{R44}^T] \quad (52a)$$

$$\sigma_{\gamma nonsp}(\hat{r}_a) = \quad (52b)$$
$$\sqrt{g_{nonsp}^T(\hat{r}_a) g_{nonsp}(\hat{r}_a) + \frac{1}{2} \text{trace} \left\{ \begin{matrix} [H_{nonsp}(\hat{r}_a) - q_{R44} q_{R44}^T] \cdot \\ [H_{nonsp}(\hat{r}_a) - q_{R44} q_{R44}^T] \end{matrix} \right\}}$$

The trace( ) function is the usual sum of the diagonal elements of its square matrix argument.

Analysis of the spoofed case yields a detection statistic approximation that is somewhat similar to that from the non-spoofed case:

$$\gamma \cong -\frac{1}{2} g_{sp}^T(\eta) g_{sp}(\eta) + g_{sp}^T(\eta) v + \frac{1}{2} v^T [H_{sp}(\eta) - q_{R44} q_{R44}^T] v \quad (53)$$

where the L-by-1 residuals vector $g_{sp}(\eta)$ and the L-by-L symmetric matrix $H_{sp}(\eta)$ are $$g_{sp}(\eta) = B \tilde{r}_a(\eta) - \begin{bmatrix} R_{44}^1 \eta \\ R_{44}^2 \eta \\ R_{44}^3 \eta \\ \vdots \\ R_{44}^L \eta \end{bmatrix} \quad (54a)$$

$$H_{sp}(\eta) = [B\ 0] \begin{bmatrix} \{B^T B + \tilde{\mu}(\eta) I\} & \tilde{r}_a(\eta) \\ \tilde{r}_a^T(\eta) & 0 \end{bmatrix}^{-1} \begin{bmatrix} B^T \\ 0 \end{bmatrix} \quad (54b)$$

The 3-by-1 unit direction vector $\tilde{r}_a(\eta)$ in these formulas is the solution to an auxiliary articulation direction estimation problem that takes the form of Eqs. (40a)-(40c), except with $z_4^j$ replaced by $R_{44}^j \eta$ for all GNSS satellites $j=1, \ldots, L$. The scalar Lagrange multiplier $\tilde{\mu}(\eta)$ is the value that solves Eq. (47) in the process of solving for $\tilde{r}_a(\eta)$.

The approximation in Eq. (53) is valid to second order in the noise vector v. It can be derived by approximating the first-order optimality necessary conditions for the solution to the problem in Eqs. (40a)-(40c). This latter approximation is carried out to first order in v by recognizing that the non-homogeneous vector $[z_4^1, \ldots, z_4^L]^T$ is equal to $[R_{44}^1 \eta, \ldots, R_{44}^L \eta]^T + v$ in the spoofed case. The resulting derivation is lengthy and somewhat tricky.

One difficult part of the derivation relies on the equation:

$$g_{sp}^T(\eta) B \Delta \hat{r}_a = \frac{1}{2} \tilde{\mu}(\eta) \Delta \hat{r}_a^T \Delta \hat{r}_a \quad (55)$$

in order to recognize that a seemingly first-order term in the unit-vector perturbation $\Delta \hat{r}_a = \hat{r}_a - \tilde{r}_a(\eta)$ is actually second-order in this small quantity. This substitution is crucial to the proof that a first-order approximation of how $\Delta \hat{r}_a$ depends on v can be used to achieve a second-order approximation of how the optimized $J_{nonsp}(\hat{r}_a)$ depends on v. Equation (55) can be derived by considering the first-order necessary conditions that are obeyed by $\tilde{r}_a(\eta)$ and $\tilde{\mu}(\eta)$ and by recognizing that the unit normalization constraint on the perturbed solution $\tilde{r}_a(\eta) + \Delta \hat{r}_a$ can be manipulated into the form $$0 = \tilde{r}_a^T(\eta) \Delta \hat{r}_a + \frac{1}{2} \Delta \hat{r}_a^T \Delta \hat{r}_a.$$

Similar to the non-spoofed case, the term $g_{sp}^T(\eta) v$ on the right-hand side of Eq. (53) is usually the dominant source of random variations. That is, its variance is much larger than those of the quadratic term $$\frac{1}{2} v^T [H_{sp}(\eta) - q_{R44} q_{R44}^T] v$$

and the neglected higher-order v terms. Therefore, a Gaussian approximation of the spoofing detection statistic is reasonable in this spoofed case:

$$p(\gamma | \eta H_1) \cong N[\gamma; \bar{\gamma}_{sp}(\eta), \sigma_{\gamma sp}(\eta)] \quad (56)$$

with the mean and standard deviation:

$$\bar{\gamma}_{sp}(\eta) = -\frac{1}{2}g_{sp}^T(\eta)g_{sp}(\eta) + \frac{1}{2}\text{trace}[H_{sp}(\eta) - q_{R44}q_{R44}^T] \quad (57a)$$

$$\sigma_{\gamma sp}(\eta) = \sqrt{g_{sp}^T(\eta)g_{sp}(\eta) + \frac{1}{2}\text{trace}\left\{\begin{array}{l}[H_{sp}(\eta) - q_{R44}q_{R44}^T]\cdot\\ [H_{sp}(\eta) - q_{R44}q_{R44}^T]\end{array}\right\}} \quad (57b)$$

C. Design of Worst-Case Spoofing Detection Threshold and Analysis of Worst-Case Detection Probability, Unknown Attitude One might be tempted to compute the spoofing detection threshold $\gamma_{th}$ using $p(\gamma|\hat{r},H_0)$ in Eq. (51) along with the desired false-alarm rate $\alpha$, similar to what is done in Eq. (36) for the known-attitude case. This is impractical, however, because the mean and standard deviation that define $p(\gamma|\hat{r}_a, H_0)$ are functions of the unknown true antenna articulation direction $\hat{r}_a$. One might try using the estimated value of this vector, $\hat{r}_{aopt}$, but a safer approach is to use a worst-case direction.

The worst-case value of the articulation direction $\hat{r}_a$ can be defined as follows: It is the direction which gives the highest possible false-alarm probability for the designed spoofing detection threshold value $\gamma_{th}$. Suppose that the worst-case direction is denoted as $\hat{r}_{awc}$. This direction and the corresponding spoofing detection threshold $\gamma_{th}$ can be computed simultaneously for a given worst-case false-alarm probability $\alpha_{wc}$.

The first step is to compute the transformed detection threshold that would produce the false-alarm probability $\alpha_{wc}$ if $p(\gamma|H_0)$ were a Gaussian with zero mean and unit variance. Call this value $\kappa_{wc}$. It is the solution of $$\alpha_{wc} = \frac{1}{\sqrt{2\pi}}\int_{-\infty}^{\kappa_{wc}} e^{-\gamma_{nd}^2/2}d\gamma_{nd} \quad (58)$$

This value is a measure of the offset of the spoofing detection threshold from the mean of $p(\gamma|\hat{r}_a,H_0)$ measured in units of standard deviations of $p(\gamma|\hat{r}_a,H_0)$. This $\kappa_{wc}$ is normally a negative number because $\alpha_{wc}$ is normally much less than 0.5.

The transformed detection threshold is used to define an optimization problem that can be solved in order to determine the worst-case antenna articulation direction vector and the corresponding worst-case spoofing detection threshold. The optimization problem is:

find: $\hat{r}_a$ \quad (59a)

to minimize: $J_{\gamma th}(\hat{r}_a) = \bar{\gamma}_{nonsp}(\hat{r}_a) + \kappa_{wc}\sigma_{\gamma nonsp}(\hat{r}_a)$ \quad (59b)

subject to: $\hat{r}_a^T\hat{r}_a = 1$ \quad (59c)

The antenna articulation direction that minimizes the cost function in Eq. (59b) is $\hat{r}_{awc}$, the one that produces the highest probability of false alarm for the given spoofing detection test. The corresponding worst-case spoofing detection threshold is equal to the value of the minimum cost: $\gamma_{th} = J_{\gamma th}(\hat{r}_{awc})$. Given that $J_{\gamma th}(\hat{r}_a) \geq J_{\gamma th}(\hat{r}_{awc})$ for any other articulation direction $\hat{r}_a$ the corresponding false alarm probability for the direction $\hat{r}_a$ is $$\alpha(\hat{r}_a) = \frac{1}{\sqrt{2\pi}}\int_{-\infty}^{\kappa(\hat{r}_a)} e^{-\gamma_{nd}^2/2}d\gamma_{nd} \leq \alpha_{wc} \quad (60)$$

where $\kappa(\hat{r}_a) = [\gamma_{th} - \bar{\gamma}_{nonsp}(\hat{r}_a)]/\sigma_{\gamma nonsp}(\hat{r}_a)$. The inequality $\gamma_{th} = J_{\gamma th}(\hat{r}_{awc}) \leq J_{\gamma th}(\hat{r}_a)$ can be manipulated algebraically and then combined with the definition of $\kappa(\hat{r}_a)$ to prove that $\kappa(\hat{r}_a) \leq \kappa_{wc}$. This latter inequality leads directly to the inequality in Eq. (60). Thus, $\alpha_{wc}$ truly is the worst-case false-alarm probability.

Solution of the constrained nonlinear optimization problem in Eqs. (59a)-(59c) can be carried out using a suitable numerical method. In the tests of Section IX, Newton's method has been used with enhancements to ensure global convergence and to enforce the normalization constraint. The method starts with a guess of $\hat{r}_{awc}$ that satisfies the constraint, and it computes increments that continue to satisfy this constraint while decreasing the cost. The increments are computed by developing a second-order expansion of the cost function variations that applies in the 2-dimensional local null space of the normalization constraint. Global convergence is enforced by using a quadratic trust-region step size restriction when solving for the increment in the null-space of the constraint.

It is important to start the numerical solution of the optimization problem in Eqs. (59a)-(59c) in with a reasonable first guess of $\hat{r}_{awc}$. Otherwise, the iterative numerical solution procedure can take too much computation time or it can even fail to converge to the global minimum. The first guess algorithm recognizes that the $g_{nonsp}^T(\hat{r}_a)$ terms are the dominant terms in the formulas for $\bar{\gamma}_{nonsp}(\hat{r}_a)$ and $\sigma_{\gamma nonsp}(\hat{r}_a)$ in Eqs. (52a) and (52b). Therefore, it finds the values of $\hat{r}_a$ that maximize or minimize $g_{nonsp}^T(\hat{r}_a)g_{nonsp}(\hat{r}_a)$. Consistent with the formula for $g_{nonsp}(\hat{r}_a)$ in Eq. (50a), these values of $\hat{r}_a$ and the associated extrema of $g_{nonsp}^T(\hat{r}_a)g_{nonsp}(\hat{r}_a)$ can be found by computing the singular value decomposition of the L-by-3 matrix $(I-q_{R44}q_{R44})B$. The minimum and maximum values of $g_{nonsp}^T(\hat{r}_a)g_{nonsp}(\hat{r}_a)$ are then used in truncated versions of Eqs. (52a) and (52b) to compute the approximations $\bar{\gamma}_{nonsp}(\hat{r}_a) \approx 0.5 g_{nonsp}^T(\hat{r}_a)g_{nonsp}(\hat{r}_a)$ and $\sigma_{\gamma nonsp}(\hat{r}_a) \approx [g_{nonsp}^T(\hat{r}_a)g_{nonsp}(\hat{r}_a)]^{0.5}$. These approximations, in turn, are used to compute corresponding approximations of $J_{\gamma th}(\hat{r}_a)$ from Eq. (59b). For the approximation of $J_{\gamma th}(\hat{r}_a)$ that is the smallest, the corresponding value of $\hat{r}_a$ from the singular decomposition of $(I-q_{R44}q_{R44}^T)B$ is used as the first guess of $\hat{r}_{awc}$.

Given the spoofing detection threshold $\gamma_{th}$ from the worst-case analysis, the final analysis problem is to compute the probability of a missed detection. This calculation involves $p(\gamma|\eta,H_1)$. Unfortunately, this probability density function depends on the unknown true value of the spoofed-case dot product $\eta$. As in the case of a known articulation direction vector, the case of Section IV, a worst-case value of $\eta$ is computed and used in order to remove the $\eta$ dependence. The worst-case value of $\eta$ is the one that produces the largest possible value of $P_{MD}$.

The worst-case value of $\eta$ is the solution to the following optimization problem:

find: $\eta$ \quad (61a)

to minimize:

$$J_{PMD}(\eta) = \frac{\gamma_{th} - \bar{\gamma}_{sp}(\eta)}{\sigma_{\gamma sp}(\eta)} \quad (61b)$$

subject to: $-1 \leq \eta \leq 1$ (61c)

This is a relatively simple constrained 1-dimensional nonlinear optimization problem. It is solved using Newton's method with enhancements to enforce the inequality constraints, if one or the other of them is active, and to ensure global convergence.

It is helpful to start the numerical solution of the problem in Eqs. (61a)-(61c) with a good first guess of the solution $\eta_{wc}$. A good first guess comes from recognizing that, in a well-designed spoofing detection test, the $g_{sp}^T(\eta)g_{sp}(\eta)$ terms are the dominant terms in the formulas for $\bar{\gamma}_{sp}(\eta)$ and $\sigma_{\gamma sp}(\eta)$ in Eqs. (57a) and (57b). Also, the term $-\bar{\gamma}_{sp}(\eta)/\sigma_{\gamma sp}(\eta)$ in Eq. (61b) contains the dominant $\eta$ dependence of $J_{PMD}(\eta)$. Under these two assumptions, a reasonable first guess of $\eta_{wc}$ is $$\eta_{wc} = \frac{q_{R44}^T B \hat{r}_{amineig}}{\sqrt{\sum_{j=1}^{L}(R_{44}^j)^2}} \quad (62)$$

where $\hat{r}_{amineig}$ is a unit-normalized eigenvector of the 3-by-3 symmetric matrix $$B^T(I - q_{R44}q_{R44}^T)B \quad (63)$$

It is the eigenvector associated with the minimum eigenvalue. It is straightforward to prove that this combination of $\eta$ minimizes $g_{sp}^T(\eta)g_{sp}(\eta)$ with $g_{sp}(\eta)$ defined in Eq. (54a). The proof involves the recognition that the unit-vector $\tilde{r}_a(\eta) = \hat{r}_{amineig}$ where the function $\tilde{r}(\eta)$ is defined in connection with Eq. (54a). One can show that this first guess of $\eta_{wc}$ is guaranteed to respect the inequality constraints in Eq. (61c) because it amounts to a weighted average of the unit-vector dot products $(\hat{r}^j)^T\hat{r}_{amineig}$ for $j=1, \ldots, L$, each of which obeys the constraints.

Given the value $\eta_{wc}$ that solves the optimization problem in Eqs. (61a)-(61c), the worst-case probability of missed detection is $$P_{MDwc} = \frac{1}{\sqrt{2\pi}\sigma_{\gamma sp}(\eta_{wc})} \int_{\gamma_{th}}^{\infty} e^{-[\gamma - \bar{\gamma}_{sp}(\eta_{wc})]^2/[2\sigma_{\gamma sp}^2(\eta_{wc})]} d\gamma \quad (64)$$

$$= \frac{1}{\sqrt{2\pi}} \int_{J_{PMD}(\eta_{wc})}^{\infty} e^{-\gamma_{nd}^2/2} d\gamma_{nd}$$

The transformation from the first integral to the second integral is carried out by the change of dummy integration variable from $\gamma$ to $\gamma_{nd} = [\gamma - \bar{\gamma}_{sp}(\eta_{wc})]/\sigma_{\gamma sp}(\eta_{wc})$. For any other actual $\eta$ value, the probability of missed detection is $$P_{MD}(\eta) = \frac{1}{\sqrt{2\pi}} \int_{J_{PMD}(\eta)}^{\infty} e^{-\gamma_{nd}^2/2} d\gamma_{nd} \leq P_{MDwc} \quad (65)$$

The inequality at the end of Eq. (65) is true because the lower limit in this integral will be no smaller than the lower limit in the corresponding integral of Eq. (64) by virtue of $\eta_{wc}$ being the value that minimizes $J_{PMD}(\eta)$.

These false-alarm and missed-detection probability calculations need to be re-evaluated from time to time. They must be re-computed each time there is a change in the set of available GNSS signals and each time there are significant changes in any of the following quantities: the duration of the spoofing detection batch interval, the interval's antenna articulation time history $\rho_a(t)$, the direction vectors to the GNSS spacecraft, $\hat{r}^j$ for $j=1, \ldots, L$, or the carrier-to-noise ratios of the GNSS signals. Although their derivations are long and complex, these calculations involve only matrix-matrix, matrix-vector, and nonlinear optimization calculations for low-dimensional problems. Therefore, they can be executed very rapidly on typical processors, and they can be implemented in a practical real-time system.

VI. Spoofing Detection Hypothesis Test for Moving-Base UE with Unknown Attitude and Unknown Articulation Amplitude A third version of the spoofing detection test with uni-axial antenna articulation allows for the possibility that the amplitude of the motion is also unknown. This could happen if a system such as that shown in FIG. 3 were excited by an initial impulse of uncertain amplitude. It also could happen with an antenna mounted on a UAV where the antenna articulations were caused by rapid controller-induced attitude motions and where the gain of the transfer function from the control inputs to the antenna motions was uncertain. In this case, it is necessary to estimate both the direction of antenna articulation and an articulation amplitude scaling factor. It is assumed that there is a known minimum antenna articulation amplitude. Otherwise, the spoofing detection test could be very weak due to having an articulation amplitude that was too small.

A. Spoofing Detection Hypothesis Test, Unknown Attitude and Unknown Amplitude Scaling As with the previous two tests, a test statistic based on optimal estimates of unknown parameters is used in place of a truly optimal Neyman-Pearson test. This approach is used because it is easier to implement and because it typically involves only a small degradation of detection power for a given false-alarm probability.

For the non-spoofed case, the spoofing detection calculation must estimate the product of the unknown articulation direction $\hat{r}_a$ and an articulation amplitude scaling factor a. This scaling factor is defined so that the nominal articulation amplitude time history in the $\hat{r}_a$ direction is $\rho_a(t)$ while the true time history is $a\rho_a(t)$. Supposed that one defines the un-normalized vector $r_a = a\hat{r}_a$. Suppose also, without loss of generality, that $\rho_a(t)$ and a are defined to set the known lower bound for a equal to 1. Then the following optimization problem is solved to estimate the direction/amplitude product vector $r_a$:

find: $r_a$ (66a)

to minimize:

$$J_{nonsp}(r_a) = \frac{1}{2}\sum_{j=1}^{L}\left\{R_{44}^j[(\hat{r}^j)^T r_a] - z_4^j\right\}^2 \quad (66b)$$

subject to: $r_a^T r_a \geq 1$ (66c)

where $R_{44}^j$ and $z_4^j$ for $j=1, \ldots, L$ are computed as defined in Eqs. (17) and (18). The cost function in Eq. (66b) is identical to the non-spoofed cost function in the previous spoofing detection calculation, the one in Eq. (40b).

The optimization problem in Eqs. (66a)-(66c) can be solved in almost an identical manner to the solution of the equality-constrained problem for $\hat{r}_a$ in Eqs. (40a)-(40c). The only difference is that the initial trial solution assumes that the inequality constraint in Eq. (66c) is inactive. The constraint can be ignored in this case, and $\mu$ can be set equal to 0 in Eq. (45) to determine the components of $\check{r}_{opt}$ that are used to compute the initial trial solution $\check{r}_{aopt} = V\check{r}_{opt}$. If this trial value of $r_{aopt}$ satisfies the inequality in Eq. (66c), then the solution procedure is done. If this candidate $r_{aopt}$ violates Eq. (66c), however, then Eq. (47) is used to determine the Kuhn-Tucker multiplier $\mu$. A negative value of $\mu$ that satisfies Eq. (47) must be used for the final solution in order to satisfy the Kuhn-Tucker first-order optimality conditions.

For the spoofed case, the original unknown dot product between unit vectors $\eta = (\hat{r}^{sp})^T \hat{r}_a$ is redefined to become the product of the unknown amplitude scaling factor and the unknown dot product: $\eta = a(\hat{r}^{sp})^T \hat{r}_a = (\hat{r}^{sp})^T r_a$. The practical effect of this re-definition of $\eta$ is that it is no longer constrained to lie in the range $-1 \leq \eta \leq 1$ because of the possibility that $a>1$. Therefore, the spoofed-case estimation problem becomes that of finding $\eta$ to minimize the cost function in Eq. (21) subject to no constraints on $\eta$. The minimizing value is just the unconstrained minimum $\eta_{uopt}$ from Eq. (22).

Given the $r_{aopt}$ solution to the problem in Eqs. (66a)-(66c) and the $\eta_{uopt}$ estimate from Eq. (22), this case uses the spoofing detection hypothesis test statistic $$\gamma = J_{sp}(\eta_{uopt}) - J_{nonsp}(r_{aopt}) \tag{67}$$

The spoofing detection test has the same form is in the previous two cases: Accept the non-spoofed hypothesis $H_0$ if $\gamma \geq \gamma_{th}$; otherwise, accept the spoofed hypothesis $H_1$. Again, this is sensible because $J_{nonsp}(r_{aopt})$ should be small, $J_{sp}(\eta_{uopt})$ should be large, and $\gamma$ should be a positive number without spoofing. The quantity $J_{nonsp}(r_{aopt})$ should be large, $J_{sp}(\eta_{uopt})$ should be small, and $\gamma$ should be a negative number during a spoofing attack.

B. Approximation of Non-Spoofed and Spoofed Probability Density Functions of Spoofing Detection Statistic, Unknown Attitude and Unknown Amplitude Scaling As in the analyses of the previous spoofing detection statistics, design of the detection threshold and analysis of the probability of missed detection begin with the determination of $p(\gamma|r_a, H_0)$, the non-spoofed probability density of the detection statistic. This analysis quantifies the impact of the random vector $v$ on $\gamma$ as propagated through the $\eta_{uopt}$ and $r_{aopt}$ calculations. That quantification is similar to Eq. (49) for the known-amplitude case. It is approximated to $2^{nd}$ order in $v$ as follows:

$$\gamma \cong \frac{1}{2} g_{nonsp}^T(r_a) g_{nonsp}(r_a) + \tag{68}$$

$$g_{nonsp}^T(r_a) v + \frac{1}{2} v^T (H'_{nonsp} - q_{R44} q_{R44}^T) v - \frac{1}{2} \hat{\tilde{v}}^2(r_a)$$

where the function $g_{nonsp}(r_a)$ is the same as in Eq. (50a) and where the L-by-L symmetric matrix $H'_{nonsp} = B(B^T B)^{-1} B^T$ is a projection matrix. The scalar random variable $\hat{\tilde{v}}(r_a)$ accounts for the fact that the noise vector $v$ may cause the $r_a$ calculation to produce a negative Kuhn-Tucker multiplier $\mu$ even though $\mu = 0$ would suffice in the absence of noise because the true $r_a$ respects the inequality in Eq. (66c). This scalar random variable is correlated with the random vector $v$, as is a related zero-mean, unit-variance scalar Gaussian random variable $\hat{v}(r_a)$. These two distributions and their relationships to each other and to $v$ are characterized by the following formulas:

$$\hat{\tilde{v}}(r_a) = \begin{cases} \hat{v}(r_a) - \hat{v}_{max}(r_a) & \text{if } \hat{v}(r_a) < \hat{v}_{max}(r_a) \\ 0 & \text{if } \hat{v}_{max}(r_a) \leq \hat{v}(r_a) \end{cases} \tag{69}$$

where $$\hat{v}(r_a) = \hat{q}^T(r_a) v \tag{70a}$$

$$\hat{v}_{max}(r_a) = \frac{1 - r_a^T r_a}{2\sqrt{r_a^T (B^T B)^{-1} r_a}} \tag{70b}$$

with $\hat{q}(r_a)$ being the following unit-normalized L-by-1 vector:

$$\hat{q}(r_a) = \frac{B(B^T B)^{-1} r_a}{\sqrt{r_a^T (B^T B)^{-1} r_a}} \tag{71}$$

If $r_a^T r_a \gg 1$, then $\hat{v}_{max}(r_a) \ll 0$, and the contribution of $\hat{\tilde{v}}(r_a)$ to the randomness in $\gamma$ becomes negligible, as one would expect.

The derivation of the approximation in Eq. (68) is similar to the derivation of the approximation in Eq. (49) for the known-amplitude case. The terms $$\frac{1}{2} v^T H'_{nonsp} v - \frac{1}{2} \hat{\tilde{v}}^2(r_a)$$

in Eq. (68) constitute the modified form of the term $$\frac{1}{2} v^T H_{nonsp}(\hat{r}_a) v$$

in Eq. (49) when the equality constraint in Eq. (40c) is replaced by the inequality constraint in Eq. (66c). This replacement leads to a negativity constraint on the Kuhn-Tucker multiplier $\mu$ associated with the Eqs. (66a)-(66c) optimal solution, and this constraint is what modifies the original $$\frac{1}{2} v^T H_{nonsp}(\hat{r}_a) v$$

term. There was no sign constraint on the corresponding Lagrange multiplier for the Eqs. (40a)-(40c) optimum.

Similar to the known-amplitude case, the dominant random term in Eq. (68) is $g_{nonsp}^T(r_a) v$. Normally its variance is significantly larger than the variance of the quadratic terms $$\frac{1}{2} v^T [H'_{nonsp} - q_{R44} q_{R44}^T] v \text{ and } -\frac{1}{2} \hat{\tilde{v}}^2(r_a).$$

This variance is also normally a lot larger than the variance of the neglected higher order $v$ terms. Therefore, it is reasonable to approximate the probability density function of $\gamma$ in the non-spoofed case by a Gaussian:

$$p(\gamma|r_a, H_0) \cong N[\gamma; \bar{\gamma}'_{nonsp}(r_a), \sigma'_{\gamma nonsp}(r_a)] \quad (72)$$

where the mean and standard deviation of this approximation are:

$$\bar{\gamma}'_{nonsp}(r_a) = \quad (73a)$$
$$\frac{1}{2} g^T_{nonsp}(r_a) g_{nonsp}(r_a) + \frac{1}{2} \text{trace}[H'_{nonsp} - q_{R44} q^T_{R44}] - \frac{1}{2} \xi_{ns}(r_a)$$

$$\sigma'_{\gamma nonsp}(r_a) = \quad (73b)$$
$$\sqrt{g^T_{nonsp}(r_a) g_{nonsp}(r_a) + \frac{1}{2} \text{trace}\left\{ \begin{array}{l} [H'_{nonsp} - q_{R44} q^T_{R44}] \cdot \\ [H'_{nonsp} - q_{R44} q^T_{R44}] \end{array} \right\} + \psi_{ns}(r_a)}$$

where $$\xi_{ns}(r_a) = E\{\hat{v}^2(r_a)\} \quad (74a)$$
$$= \frac{1}{\sqrt{2\pi}} \int_{-\infty}^{\hat{v}_{max}(r_a)} [\hat{v} - \hat{v}_{max}(r_a)]^2 d^{-\hat{v}^2/2} d\hat{v}$$
$$= \frac{\hat{v}_{max}(r_a) e^{-\hat{v}^2_{max}(r_a)/2}}{\sqrt{2\pi}} +$$
$$[1 + \hat{v}^2_{max}(r_a)] \frac{1}{\sqrt{2\pi}} \int_{-\infty}^{\hat{v}_{max}(r_a)} e^{-\hat{v}^2/2} d\hat{v}$$

$$\psi_{ns}(r_a) = -E\{[g^T_{nonsp}(r_a) v][\hat{v}^2(r_a) - \xi_{ns}(r_a)]\} - \quad (74b)$$
$$\frac{1}{2} E\{[H'_{nonsp} - q_{R44} q^T_{R44}) v - \text{trace}(H'_{nonsp} - q_{R44} q^T_{R44})$$
$$[\hat{v}^2(r_a) - \xi_{ns}(r_a)]\} + \frac{1}{4} E\{\hat{v}^4(r_a)\} - \frac{1}{4} \xi^2_{ns}(r_a)$$

$$E\{[g^T_{nonsp}(r_a) v][\hat{v}^2(r_a) - \xi_{ns}(r_a)]\} = \quad (75a)$$
$$g^T_{nonsp}(r_a) \hat{q}(r_a) E\{\hat{v}(r_a)[\hat{v}^2(r_a) - \xi_{ns}(r_a)]\} =$$
$$g^T_{nonsp}(r_a) \hat{q}(r_a) \frac{1}{\sqrt{2\pi}} \int_{-\infty}^{\hat{v}_{max}(r_a)} \hat{v}[\hat{v} - \hat{v}_{max}(r_a)]^2 e^{-\hat{v}^2/2} d\hat{v} =$$
$$g^T_{nonsp}(r_a) \hat{q}(r_a) \left( \frac{-2 e^{-\hat{v}^2_{max}(r_a)/2}}{\sqrt{2\pi}} - 2\hat{v}_{max}(r_a) \int_{-\infty}^{\hat{v}_{max}(r_a)} e^{-\hat{v}^2/2} d\hat{v} \right)$$

$$E\{[v^T (H'_{nonsp} - q_{R44} q^T_{R44}) v - \text{trace}(H'_{nonsp} - q_{R44} q^T_{R44})] \quad (75b)$$
$$[\hat{v}^2(r_a) - \xi_{ns}(r_a)]\} =$$
$$\hat{q}^T(r_a)(H'_{nonsp} - q_{R44} q^T_{R44}) \hat{q}(r_a) E\{\hat{v}^2(r_a)[\hat{v}^2(r_a) - \xi_{ns}(r_a)]\} =$$
$$\hat{q}^T(r_a)(H'_{nonsp} - q_{R44} q^T_{R44}) \hat{q}(r_a)$$
$$\left\{ \frac{1}{\sqrt{2\pi}} \int_{-\infty}^{\hat{v}_{max}(r_a)} \hat{v}^2 [\hat{v} - \hat{v}_{max}(r_a)]^2 e^{-\hat{v}^2/2} d\hat{v} - \xi_{ns}(r_a) \right\} =$$
$$\hat{q}^T(r_a)(H'_{nonsp} - q_{R44} q^T_{R44}) \hat{q}(r_a) \left( 2 \frac{1}{\sqrt{2\pi}} \int_{-\infty}^{\hat{v}_{max}(r_a)} e^{-\hat{v}^2/2} d\hat{v} \right)$$

$$E\{\hat{v}^4(r_a)\} = \frac{1}{\sqrt{2\pi}} \int_{-\infty}^{\hat{v}_{max}(r_a)} [\hat{v} - \hat{v}_{max}(r_a)]^4 e^{-\hat{v}^2/2} d\hat{v} = \quad (75c)$$
$$\frac{[\hat{v}^3_{max}(r_a) + 5\hat{v}_{max}(r_a)] e^{-\hat{v}^2_{max}(r_a)/2}}{\sqrt{2\pi}} +$$
$$[\hat{v}^4_{max}(r_a) + 6\hat{v}^2_{max}(r_a) + 3] \frac{1}{\sqrt{2\pi}} \int_{-\infty}^{\hat{v}_{max}(r_a)} e^{-\hat{v}^2/2} d\hat{v}$$

Note that the same probability integral appears in the final versions of the right-hand sides of Eqs. (74a) and (75a)-(75c). It is the cumulative probability for a scalar zero-mean, unit-variance Gaussian distribution between negative infinity and $\hat{v}_{max}(r_a)$. Any good statistical functions software package should contain a standard function that computes this integral.

For the spoofed case, the approximate model of the dependence of $\gamma$ on $v$ is derived in a manner similar to the analysis that produced the corresponding known-amplitude model in Eq. (53). It involves consideration of the optimized non-spoofed and spoofed cost functions, as per Eqs. (66a)-(66c) and as per Eq. (22) when the actual data obeys the spoofed model. The approximate model for the detection statistic, valid to second order in $v$, is $$\gamma \cong \quad (76)$$
$$-\frac{1}{2} \breve{g}^T_{sp}(\eta) \breve{g}_{sp}(\eta) + \hat{g}^T_{sp}(\eta) v + \frac{1}{2} v^T [H'_{sp}(\eta) - q_{R44} q^T_{R44}] v - \frac{1}{2} \breve{v}^2(\eta) \zeta(\eta)$$

where the L-by-1 residuals vector $\breve{g}_{sp}(\eta)$ and the L-by-L symmetric matrix $H'_{sp}(\eta)$ are $$\breve{g}_{sp}(\eta) = B\breve{r}_a(\eta) - \begin{bmatrix} R^1_{44} \eta \\ R^2_{44} \eta \\ R^3_{44} \eta \\ \vdots \\ R^L_{44} \eta \end{bmatrix} \quad (77a)$$

$$H'_{sp}(\eta) = B[B^T B + \breve{\mu}(\eta) I]^{-1} B^T \quad (77b)$$

The 3-by-1 vector $\breve{r}_a(\eta)$ in these formulas is the solution to an auxiliary articulation-direction/articulation-scaling-factor estimation problem that takes the form of Eqs. (66a)-(66c), except with $z_4^j$ replaced by $R_{44}^j \eta$ for all GNSS satellites $j=1, \ldots, L$. The scalar Kuhn-Tucker multiplier $\breve{\mu}(\eta)$ is the associated value that is determined when solving for $\breve{r}_a(\eta)$. It is determined using Eq. (47) if the inequality constraint in Eq. (66c) is active, and it is non-positive in this case, but $\breve{\mu}(\eta) = 0$ if the inequality constraint is inactive, i.e., if $\breve{r}_a^T(\eta) \breve{r}_a(\eta) > 1$.

The scalar random variable $\breve{v}(\eta)$ accounts for the effects of the inequality constraint and its variations of activity or inactivity, depending on the specific values of $v$ and $\eta$. It is defined as follows:

$$\breve{v}(\eta) = \begin{cases} \breve{v}(\eta) & \text{if } \breve{\mu}(\eta) < 0 \text{ and } \breve{v}(\eta) < \breve{v}_{maxc}(\eta) \\ \breve{v}_{maxc}(\eta) & \text{if } \breve{\mu}(\eta) < 0 \text{ and } \breve{v}_{maxc}(\eta) \leq \breve{v}(\eta) \\ \breve{v}(\eta) - \breve{v}_{maxu}(\eta) & \text{if } \breve{\mu}(\eta) = 0 \text{ and } \breve{v}(\eta) < \breve{v}_{maxu}(\eta) \\ 0 & \text{if } \breve{\mu}(\eta) = 0 \text{ and } \breve{v}_{maxu}(\eta) \leq \breve{v}(\eta) \end{cases} \quad (78)$$

where $$\breve{v}(\eta) = \breve{q}^T(\eta) v \quad (79a)$$

$$\breve{v}_{maxc}(\eta) = \quad (79b)$$
$$- \left( \frac{\breve{r}_a^T(\eta)[B^T B + \breve{\mu}(\eta) I]^{-1} \breve{r}_a(\eta)}{\sqrt{\breve{r}_a^T(\eta)[B^T B + \breve{\mu}(\eta) I]^{-1} B^T B [B^T B + \breve{\mu}(\eta) I]^{-1} \breve{r}_a(\eta)}} \right) \breve{\mu}(\eta)$$

$$\breve{v}_{maxu}(\eta) = \frac{1 - \breve{r}_a^T(\eta)\breve{r}_a(\eta)}{2\sqrt{\breve{r}_a^T(\eta)(B^T B)^{-1}\breve{r}_a(\eta)}} \quad (79c)$$

with the unit-normalized L-by-1 vector $\breve{q}(\eta)$ being defined as:

$$\breve{q}(\eta) = \frac{B[B^T B + \breve{\mu}(\eta)I]^{-1}\breve{r}_a(\eta)}{\sqrt{\breve{r}_a^T(\eta)[B^T B + \breve{\mu}(\eta)I]^{-1}B^T B[B^T B + \breve{\mu}(\eta)I]^{-1}\breve{r}_a(\eta)}} \quad (80)$$

The two upper-most conditions in Eq. (78) deal with the active constraint case, in which $\breve{r}_a^T(\eta)\breve{r}_a(\eta)=1$. The two lower-most conditions cover the inactive constraint case, i.e., the case when $\breve{r}_a^T(\eta)\breve{r}_a(\eta)>1$.

The coefficient of function that multiplies $\breve{v}^2(\eta)$ in Eq. (76) is $$\zeta(\eta) = \frac{\breve{r}_a^T(\eta)[B^T B + \breve{\mu}(\eta)I]^{-1}B[B^T B + \breve{\mu}(\eta)I]^{-1}\breve{r}_a(\eta)}{\sqrt{\breve{r}_a^T(\eta)[B^T B + \breve{\mu}(\eta)I]^{-1}\breve{r}_a(\eta)}} \quad (81)$$

When $\breve{\mu}(\eta)=0$, i.e., in the inactive constraint case, this coefficient equals 1.

As for all preceding models of all preceding detection statistics, the model in Eq. (76) is dominated by the term $\breve{g}_{sp}^T(\eta)v$. Its variance is typically much larger than that of $$\frac{1}{2}v^T[H'_{sp}(\eta) - q_{R44}q_{R44}^T]v, \text{ of } -\frac{1}{2}\breve{v}^2(\eta)\zeta(\eta),$$

or of the neglected higher-order terms in v. Given that this dominant term is Gaussian, the following Gaussian distribution is a reasonable approximation of the detection statistic probability density function in the spoofed case:

$$p(\gamma|\eta,H_1) \cong N[\gamma;\bar{\gamma}'_{sp}(\eta),\sigma'_{\gamma sp}(\eta)] \quad (82)$$

with the mean and standard deviation:

$$\bar{\gamma}'_{sp}(\eta) = -\frac{1}{2}\breve{g}_{sp}^T(\eta)\breve{g}_{sp}(\eta) + \frac{1}{2}\text{trace}[H'_{sp}(\eta) - q_{R44}q_{R44}^T] - \frac{1}{2}\xi_{sp}(\eta) \quad (83a)$$

$$\sigma'_{\gamma sp}(\eta) = \sqrt{\breve{g}_{sp}^T(\eta)\breve{g}_{sp}(\eta) + \frac{1}{2}\text{trace}\left\{\begin{matrix}[H'_{sp}(\eta) - q_{R44}q_{R44}^T] \cdot \\ [H'_{sp}(\eta) - q_{R44}q_{R44}^T]\end{matrix}\right\} + \psi_{sp}(\eta)} \quad (83b)$$

where $$\xi_{sp}(\eta) = \zeta(\eta)E\{\breve{v}^2(\eta)\} \quad (84a)$$

$$\psi_{sp}(\eta) = -E\{[\breve{g}_{sp}^T(\eta)v][\breve{v}^2(\eta)\zeta(\eta) - \xi_{sp}(\eta)]\} - \frac{1}{2}E\{[v^T(H'_{sp}\{\eta\} - q_{R44}q_{R44}^T)v - \text{trace}(H'_{sp}\{\eta\} - q_{R44}q_{R44}^T)]$$
$$[\breve{v}^2(\eta)\zeta(\eta) - \xi_{sp}(\eta)]\} + \frac{1}{4}\zeta^2(\eta)E\{\breve{v}^4(\eta)\} - \frac{1}{4}\xi_{sp}^2(\eta) \quad (84b)$$

The calculations that determine the scalar quantities $\xi_{sp}(\eta)$ and $\psi_{sp}(\eta)$ differ depending on whether the constrained non-spoofed optimization applies, $\breve{r}_a^T(\eta)\breve{r}_a(\eta)=1$ and $\breve{\mu}(\eta)<0$, or the unconstrained optimization applies, $\breve{r}_a^T(\eta)\breve{r}_a(\eta)\geq 1$ and $\breve{\mu}(\eta)=0$. In the constrained case, these quantities are computed using the following formulas for various of their components:

$$E\{\breve{v}^2(\eta)\} = \quad (85a)$$
$$\frac{1}{\sqrt{2\pi}}\int_{-\infty}^{\breve{v}_{maxc}(\eta)} \breve{v}^2 e^{-\breve{v}^2/2}d\breve{v} + \frac{\breve{v}_{maxc}(\eta)}{\sqrt{2\pi}}\int_{\breve{v}_{maxc}(\eta)}^{\infty} e^{-\breve{v}^2/2}d\breve{v} =$$
$$\breve{v}_{maxc}(\eta) - \frac{\breve{v}_{maxc}(\eta)e^{-\breve{v}_{maxc}^2(\eta)/2}}{\sqrt{2\pi}} +$$
$$\frac{[1 - \breve{v}_{maxc}^2(\eta)]}{\sqrt{2\pi}}\int_{-\infty}^{\breve{v}_{maxc}(\eta)} e^{-\breve{v}^2/2}d\breve{v}$$

$$E\{[\breve{g}_{sp}^T(\eta)v][\breve{v}^2(\eta)\zeta(\eta) - \xi_{sp}(\eta)]\} = \quad (85b)$$
$$\breve{g}_{sp}^T(\eta)\breve{q}(\eta)E\{\breve{v}(\eta)[\breve{v}^2(\eta)\zeta(\eta) - \xi_{sp}(\eta)]\} = \breve{g}_{sp}^T(\eta)\breve{q}(\eta)$$
$$\left(\frac{1}{\sqrt{2\pi}}\int_{-\infty}^{\breve{v}_{maxc}(\eta)} \breve{v}^3 e^{-\breve{v}^2/2}d\breve{v} + \frac{\breve{v}_{maxc}(\eta)}{\sqrt{2\pi}}\int_{\breve{v}_{maxc}(\eta)}^{\infty} \breve{v} e^{-\breve{v}^2/2}d\breve{v}\right)$$
$$\zeta(\eta) = \breve{g}_{sp}^T(\eta)\breve{q}(\eta)\left(-\frac{2e^{-\breve{v}_{maxc}^2(\eta)/2}}{\sqrt{2\pi}}\right)\zeta(\eta)$$

$$E\{[v^T(H'_{sp}\{\eta\} - q_{R44}q_{R44}^T)v - \text{trace}(H'_{sp}\{\eta\} - q_{R44}q_{R44}^T)] \quad (85c)$$
$$[\breve{v}^2(\eta)\zeta(\eta) - \xi_{sp}(\eta)]\} =$$
$$\breve{q}^T(\eta)(H'_{sp}\{\eta\} - q_{R44}q_{R44}^T)\breve{q}(\eta)E\{\breve{v}^2(\eta)[\breve{v}^2(\eta)\zeta(\eta) - \xi_{sp}(\eta)]\} =$$
$$\breve{q}^T(\eta)(H'_{sp}\{\eta\} - q_{R44}q_{R44}^T)\breve{q}(\eta) \times$$
$$\left\{\left(\frac{1}{\sqrt{2\pi}}\int_{-\infty}^{\breve{v}_{maxc}(\eta)} \breve{v}^4 e^{-\breve{v}^2/2}d\breve{v} + \frac{\breve{v}_{maxc}^2(\eta)}{\sqrt{2\pi}}\int_{\breve{v}_{maxc}(\eta)}^{\infty} \breve{v}^2 e^{-\breve{v}^2/2}d\breve{v}\right)\zeta(\eta) - \xi_{sp}(\eta)\right\} =$$
$$\breve{q}^T(\eta)(H'_{sp}\{\eta\} - q_{R44}q_{R44}^T)\breve{q}(\eta)\left(-\frac{2\breve{v}_{maxc}(\eta)e^{-\breve{v}_{maxc}^2(\eta)/2}}{\sqrt{2\pi}} + \frac{2}{\sqrt{2\pi}}\int_{-\infty}^{\breve{v}_{maxc}(\eta)} \breve{v}^2 e^{-\breve{v}^2/2}d\breve{v}\right)\zeta(\eta)$$

$$E\{\breve{v}^4(\eta)\} = \quad (85d)$$
$$\frac{1}{\sqrt{2\pi}}\int_{-\infty}^{\breve{v}_{maxc}(\eta)} \breve{v}^4 e^{-\breve{v}^2/2}d\breve{v} + \frac{\breve{v}_{maxc}^4(\eta)}{\sqrt{2\pi}}\int_{\breve{v}_{maxc}(\eta)}^{\infty} e^{-\breve{v}^2/2}d\breve{v} =$$
$$\breve{v}_{maxc}^4(\eta) - \frac{[\breve{v}_{maxc}^3(\eta) + 3\breve{v}_{maxc}(\eta)]e^{-\breve{v}_{maxc}^2(\eta)/2}}{\sqrt{2\pi}} +$$
$$\frac{[3 - \breve{v}_{maxc}^4(\eta)]}{\sqrt{2\pi}}\int_{-\infty}^{\breve{v}_{maxc}(\eta)} e^{-\breve{v}^2/2}d\breve{v}$$

In the unconstrained case, on the other hand, the following alternate formulas apply for the needed components of $\xi_{sp}(\eta)$ and $\psi_{sp}(\eta)$:

$$E\{\breve{v}^2(\eta)\} = \frac{1}{\sqrt{2\pi}} \int_{-\infty}^{\breve{v}_{maxc}(\eta)} [\breve{v} - \breve{v}_{maxc}(\eta)]^2 e^{-\breve{v}^2/2} d\breve{v} = \quad (86a)$$

$$\frac{\breve{v}_{maxc}(\eta) e^{-\breve{v}_{maxc}^2(\eta)/2}}{\sqrt{2\pi}} + [1 + \breve{v}_{maxc}^2(\eta)] \frac{1}{\sqrt{2\pi}} \int_{-\infty}^{\breve{v}_{maxc}(\eta)} e^{-\breve{v}^2/2} e\breve{v}$$

$$E\{[\breve{g}_{sp}^T(\eta)v][\breve{v}^2(\eta)\zeta(\eta) - \xi_{sp}(\eta)]\} = \quad (86b)$$

$$\breve{g}_{sp}^T(\eta)\breve{q}(\eta) E\{\breve{v}(\eta)[\breve{v}^2(\eta)\zeta(\eta) - \xi_{sp}(\eta)]\} = \breve{g}_{sp}^T(\eta)\breve{q}(\eta)$$

$$\left(\frac{1}{\sqrt{2\pi}} \int_{-\infty}^{\breve{v}_{maxc}(\eta)} \breve{v}[\breve{v} - \breve{v}_{maxc}(\eta)]^2 e^{-\breve{v}^2/2} e\breve{v}\right) \zeta(\eta) = \breve{g}_{sp}^T(\eta)\breve{q}(\eta)$$

$$\left(\frac{-2e^{-\breve{v}_{maxc}^2(\eta)/2}}{\sqrt{2\pi}} - 2\breve{v}_{maxc}(\eta) \frac{1}{\sqrt{2\pi}} \int_{-\infty}^{\breve{v}_{maxc}(\eta)} e^{-\breve{v}^2/2} d\breve{v}\right) \zeta(\eta)$$

$$E\Big\{[v^T(H'_{sp}\{\eta\} - q_{R44}q_{R44}^T)v - \text{trace}(H'_{sp}\{\eta\} - q_{R44}q_{R44}^T)] \quad (86c)$$

$$[\breve{v}^2(\eta)\zeta(\eta) - \xi_{sp}(\eta)]\Big\} =$$

$$\breve{q}^T(\eta)(H'_{sp}\{\eta\} - q_{R44}q_{R44}^T)\breve{q}(\eta) E\{\breve{v}^2(\eta)[\breve{v}^2(\eta)\zeta(\eta) - \xi_{sp}(\eta)]\} =$$

$$\breve{q}^T(\eta)(H'_{sp}\{\eta\} - q_{R44}q_{R44}^T)\breve{q}(\eta) \times$$

$$\left\{\left(\frac{1}{\sqrt{2\pi}} \int_{-\infty}^{\breve{v}_{maxc}(\eta)} \breve{v}^2[\breve{v} - \breve{v}_{maxc}(\eta)]^2 e^{-\breve{v}^2/2} d\breve{v}\right) \zeta(\eta) - \right.$$

$$\left. \xi_{sp}(\eta)\right\} = \breve{q}^T(\eta)(H'_{sp}\{\eta\} - q_{R44}q_{R44}^T)$$

$$\breve{q}(\eta)\left(2 \frac{1}{\sqrt{2\pi}} \int_{-\infty}^{\breve{v}_{maxc}(\eta)} e^{-\breve{v}^2/2} d\breve{v}\right) \zeta(\eta)$$

$$E\{\breve{v}^4(\eta)\} = \frac{1}{\sqrt{2\pi}} \int_{-\infty}^{\breve{v}_{maxc}(\eta)} [\breve{v} - \breve{v}_{maxc}(\eta)]^4 e^{-\breve{v}^2/2} d\breve{v} = \quad (86d)$$

$$\frac{[\breve{v}_{maxc}^3(\eta) + 5\breve{v}_{maxc}(\eta)] e^{-\breve{v}_{maxc}^2(\eta)/2}}{\sqrt{2\pi}} +$$

$$[\breve{v}_{maxc}^4(\eta) + 6\breve{v}_{maxc}^2(\eta) + 3] \frac{1}{\sqrt{2\pi}} \int_{-\infty}^{\breve{v}_{maxc}(\eta)} e^{-\breve{v}^2/2} d\breve{v}$$

C. Design of Worst-Case Spoofing Detection Threshold and Analysis of Worst-Case Detection Probability, Unknown Attitude and Unknown Amplitude Scaling Given the Gaussian $p(\gamma|r_a, H_0)$ probability density function defined by Eqs. (72)-(75c), it is possible to compute a spoofing detection threshold value $\gamma_{th}$ that achieves a worst-case probability of missed detection $\alpha_{wc}$. The approach taken here is similar to what is done in Subsection V.C for the known-amplitude case.

The first step of the threshold calculation computes $\kappa_{wc}$ from $\alpha_{wc}$ using Eq. (58). The second step solves an optimization problem to find the worst-case product of the antenna articulation direction vector and scaling amplitude $r_a$ that produces the lowest threshold for the target false-alarm probability. This problem is find: $r_a$ (87a)

to minimize: $J'_{\gamma th}(r_a) = \overline{\gamma}'_{nonsp}(r_a) + \kappa_{wc} \sigma'_{\gamma nonsp}(r_a)$ (87b)

subject to: $r_a^T r_a \geq 1$ (87c)

The antenna articulation-direction/scaling product that minimizes the cost function in Eq. (87b) is $r_{awc}$. It yields the highest probability of false alarm for the given spoofing detection test. The corresponding worst-case spoofing detection threshold is equal to the value of the minimum cost: $\gamma_{th} = J'_{\gamma th}(r_{awc})$. As in Subsection V.C, it is easy to show that $\alpha(r_a) \leq \alpha_{wc}$, i.e., that the spoofing detection false-alarm probability for any actual true value of $r_a$ is no greater than $\alpha_{wc}$.

The optimization problem in Eqs. (87a)-(87c) can be solved using a numerical method. Newton's method will serve if it has been enhanced to ensure global convergence and enforce the inequality constraint in Eq. (87c). Such an approach has been used for the tests of Section IX. It is similar to the one used to solve the problem in Eqs. (59a)-(59c) for the known-amplitude case. In addition, it uses the same procedure to generate its first guess of $r_{awc}$ as is used to generate the first guess of the $\hat{r}_{awc}$ solution to the problem in Eqs. (59a)-(59c). Thus, the first guess obeys $r_{awc}^T r_{awc} = 1$. This makes sense because this is the lowest possible amplitude, and the lowest possible amplitude is likely to give the highest probability of generating a false alarm.

Also similar to the known-amplitude case, a worst-case probability of missed detection is calculated by computing the corresponding worst true value of $\eta = a(\hat{r}^{sp})^T \hat{r}_a = (\hat{r}^{sp})^T r_a$. The worst-case value is the solution to the following optimization problem:

find: $\eta$ (88a)

to minimize:

$$J'_{PMD}(\eta) = \frac{\gamma_{th} - \overline{\gamma}'_{sp}(\eta)}{\sigma'_{\gamma sp}(\eta)} \quad (88b)$$

This 1-dimensional nonlinear optimization problem is solved using a numerical technique similar to the one that is used to solve the corresponding problem for the known-amplitude worst-case probability of missed detection, the problem in Eqs. (61a)-(61c). The algorithm for solving the present problem is somewhat simpler due to the lack of any inequality constraints here. The similarity of the problems and cost functions in Eqs. (61a)-(61c) allows the same procedure to be used in order to generate the initial guess of $\eta_{wc}$, as per Eqs. (62) and (63). This guess produces a corresponding value of $\check{r}_a(\eta_{wc})$ that obeys $\check{r}_a^T(\eta_{wc}) \check{r}_a(\eta_{wc}) = 1$. This makes sense because the worst-case probability of missed detection would tend to correspond to the lowest possible amplitude of antenna articulation.

The optimal $\eta_{wc}$ that solves the problem in Eqs. (88a) and (88b) can be used to compute the worst-case probability of missed detection $$P_{MDwc} = \frac{1}{\sqrt{2\pi} \sigma'_{\gamma sp}(\eta_{wc})} \int_{\gamma_{nd}}^{\infty} e^{-[\gamma - \overline{\gamma}'_{sp}(\eta_{wc})]^2 / [2\{\sigma'_{\gamma sp}(\eta_{wc})\}^2]} d\gamma \quad (89)$$

$$= \frac{1}{\sqrt{2\pi}} \int_{f_{PMD}(\eta_{wc})}^{\infty} e^{-\gamma_{nd}^2/2} d\gamma_{nd}$$

By an analysis similar to that which produced Eq. (65) in the known-amplitude case, it is straightforward to show that the probability of missed detection for any other true value of $\eta$ will be no greater than this worst-case probability.

VII. Spoofing Detection Hypothesis Test for Moving-Base UE with Unknown Articulation Time Phasing A fourth version of the spoofing detection test with uni-axial antenna articulation allows for uncertainty in the time phasing of the $\rho_a(t)$ antenna articulation time history.

Such uncertainty can be present when a system like that shown in FIG. 3 is excited by an initial impulse of uncertain time of application. This type of uncertainty also can occur for an antenna mounted on a UAV if rapid controller-induced attitude maneuvers are used to induce the high-frequency antenna motion. Any uncertainty of the transfer-function lag between the control inputs and the attitude response will translate into a time phasing uncertainty. In such cases, it is necessary to estimate a time offset of the articulations, $\Delta t_0$, in addition to other quantities. This time offset is defined so that the nominal articulation time history $\rho_a(t)$ becomes $\rho_a(t-\Delta t_0)$ after correcting for the time phasing error.

A. Estimation of Time Phasing via Outer Optimization

There are various possible approaches to dealing with $\Delta t_0$ uncertainty. The approach adopted here is to estimate $\Delta t_0$ in an outer nonlinear optimization calculation that does not explicitly estimate other quantities needed to form a spoofing detection statistic. The outer numerical optimization problem is posed by exploiting the following fact of 1-dimensional antenna articulations: All of the articulation-induced carrier phase time histories for all channels are multiples of $\rho_a(t-\Delta t_0)$ regardless of whether or not a spoofing attack is in progress. Given this knowledge, one can solve the over-determined least-squares estimation problem in Eq. (16) for each GNSS satellite j=1, ..., L and then form a $\Delta t_0$ optimization cost function that is a weighted sum of the residuals from each of the least-squares problems. Each of these L solutions treats the value of the scalar $(\hat{r}^x)^T \hat{r}_a$ in Eq. (16) as a different independent unknown so that the value determined for the $j^{th}$ signal need not be related in any particular way to the values determined for the other L−1 signals.

The minimum costs of these L linear least-squares optimizations are combined with a cost that introduces a priori $\Delta t_0$ knowledge to yield a $\Delta t_0$ estimation cost function of the form:

$$J_{phs}(\Delta t_0) = \frac{1}{2}\left(\frac{\Delta t_0}{\sigma_{\Delta t_{0ap}}}\right)^2 + \frac{1}{2}\sum_{j=1}^{L}(f^j)^T\left\{I - \hat{d}^j(\Delta t_0)[\hat{d}^j(\Delta t_0)]^T\right\}f^j \quad (90)$$

where $$f^j = \frac{1}{\sigma^j} P^j \begin{bmatrix} \phi_1^j \\ \phi_2^j \\ \phi_3^j \\ \vdots \\ \phi_{N_j}^j \end{bmatrix} \quad (91a)$$

$$\hat{d}^j(\Delta t_0) = \frac{d^j(\Delta t_0)}{\sqrt{[d^j(\Delta t_0)]^T d^j(\Delta t_0)}} \quad (91b)$$

with $$P^j = I - D^j\left[(D^j)^T D^j\right]^{-1}(D^j)^T \quad (92a)$$

$$d^j(\Delta t_0) = P^j \begin{bmatrix} \rho_a(\tau_{mid1}^j - \Delta t_0) \\ \rho_a(\tau_{mid2}^j - \Delta t_0) \\ \rho_a(\tau_{mid3}^j - \Delta t_0) \\ \vdots \\ \rho_a(\tau_{midN_j}^j - \Delta t_0) \end{bmatrix} \quad (92b)$$

$$D^j = \begin{bmatrix} 1 & 0 & 0 \\ 1 & (\tau_{mid2}^j - \tau_{mid1}^j) & \frac{1}{2}(\tau_{mid2}^j - \tau_{mid1}^j)^2 \\ 1 & (\tau_{mid3}^j - \tau_{mid1}^j) & \frac{1}{2}(\tau_{mid3}^j - \tau_{mid1}^j)^2 \\ \vdots & \vdots & \vdots \\ 1 & (\tau_{midN_j}^j - \tau_{mid1}^j) & \frac{1}{2}(\tau_{midN_j}^j - \tau_{mid1}^j)^2 \end{bmatrix} \quad (92c)$$

The cost function $J_{phs}(\Delta t_0)$ in Eq. (90) is a negative log-likelihood cost function, and its $\sigma_{\Delta t_{0ap}}$ parameter is the standard deviation of the a priori uncertainty about how much $\Delta t_0$ might differ from 0. The $N_j$-by-1 vector $f^j$ contains the high-pass-filtered carrier phase time history for the $j^{th}$ GNSS signal normalized by its measurement error standard deviation. The $N_j$-by-1 vector $\hat{d}^j(\Delta t_0)$ is a unit-normalized version of the high-pass-filtered time history $\rho_a(t-\Delta t_0)$ sampled at the midpoints of the accumulation intervals of the $j^{th}$ signal. The $N_j$-by-$N_j$ matrix $P^j$ is a projection matrix that performs the high-pass filtering for the $j^{th}$ signal, as is evident by its definition in terms of the $N_j$-by-3 matrix $D^j$. $P^j$ projects signal time histories orthogonal to the constant, linear, and quadratic time histories in the columns of $D^j$.

The cost function in Eq. (90) can be optimized to determine $\Delta t_{0opt}$ by using standard numerical techniques, such as Newton's method. Given that this involves unconstrained optimization of a scalar, the implementation is straightforward.

A useful auxiliary quantity is the Cramer-Rao lower bound on the uncertainty in $\Delta t_{0opt}$. It takes the form:

$$\sigma_{\Delta t_{0opt}}^2 \cong \frac{1}{\left(\frac{\partial^2 J_{phs}}{\partial \Delta t_0^2}\bigg|_{\Delta t_{0opt}}\right)} \quad (93)$$

B. Spoofing Detection Statistic with Timing Uncertainty

Given the estimate $\Delta t_{0opt}$ that minimizes the cost function in Eq. (90), any of the three spoofing detection tests of Sections IV-VI can be implemented by replacing $\rho_a(t)$ in Eqs. (16) and (17) by $\rho_a(t-\Delta t_0)$. All of the subsequent spoofing detection calculations can then be carried out by using the resulting values of $R_{44}^j$ and $z_4^j$ for j=1, ..., L. The ensuing calculations will yield a spoofing detection statistic $\gamma$ that can be used to develop a powerful detection test.

C. Design of Spoofing Detection Threshold and Analysis of False-Alarm Probability One might try to use the corresponding pair of $p(\gamma|H_0)$ and $p(\gamma|H_1)$ probability density functions from Sections IV-VI directly in the design of the spoofing detection threshold and the analysis of the probability of missed detection for an uncertain $\Delta t_0$ case. One could substitute $\rho_a(t-\Delta t_0)$ for $\rho_a(t)$ in any given analysis. This approach, however, is not exactly right when working with an uncertain $\Delta t_0$ and its estimate $\Delta t_{0opt}$. Complications occur because an additional source of $\gamma$ variability arises from the impact of measurement noise on the $\Delta t_{0opt}$ estimate.

One could do an exact or approximate analysis of the impact of this $\Delta t_{0opt}$ variability on $p(\gamma|H_0)$ and $p(\gamma|H_1)$. Perhaps a reasonable analysis would use a linear approximation of the effect of the noise vector $v$ on the errors in $\Delta t_{0opt}$. Such an analysis might be rather complicated.

This case of uncertain $\Delta t_0$ is not considered to be a very important one because it is not a preferred mode of operation. This case is considered here mostly because it is helpful to the processing of experimental data from the initial prototype spoofing detection system, where timing uncertainty was present because the prototype articulation system lacked a $\rho_a(t)$ sensor.

In an operational system, the need to estimate $\Delta t_{0opt}$ opens up the possibility of a new type of spoofing attack, one that also simulates the expected non-spoofed carrier-phase effects of $\rho_a(t)$. The spoofer might have an idea about the types of $\rho_a(t)$ time histories, but knowledge of the exact timing could be made virtually inaccessible to a spoofer. Armed with the right $\rho_a(t)$ but the wrong $\Delta t_0$, however, a spoofer might avoid detection by fooling the detection system into choosing a value of $\Delta t_{0opt}$ that aligned with the spoofed version of $\rho_a(t)$. Therefore, a system that needs to estimate $\Delta t_0$ is undesirable and should be avoided.

Because this case is considered mostly in support of initial prototype experiments, it has not been deemed worthwhile to do a full analysis of the impacts of $\Delta t_{0opt}$ uncertainty. Instead, the threshold calculations of the relevant previous section have been carried out three different times using the following three different candidate antenna articulation time histories: $\rho_a(t-\Delta t_{0opt})$, $\rho_a(t-\Delta t_{0opt}+2\sigma_{\Delta t0opt})$, and $\rho_a(t-\Delta t_{0opt}+2\sigma_{\Delta t0opt})$. Let the corresponding three spoofing detection thresholds be called $\gamma_{tha}$, $\gamma_{thb}$, and $\gamma_{thc}$. The final detection threshold was then chosen to be $\gamma_{th}=\min(\gamma_{tha},\gamma_{thb},\gamma_{thc})$, which is consistent with the philosophy of taking a worst-case approach.

The worst-case probability of missed detection was calculated in a similar ad hoc manner. Suppose that the corresponding spoofed means and standard deviations for the above three time offsets have been calculated using the relevant equations from Section IV, V, or VI and suppose that the resulting values are, respectively, $\bar{\gamma}_{spa}$, $\bar{\gamma}_{spb}$, $\bar{\gamma}_{spc}$, $\sigma_{\gamma spa}$, $\sigma_{\gamma spb}$, and $\sigma_{\gamma spc}$. Then the worst-case probability of false alarm is approximated as:

$$P_{MDwc} = \frac{1}{\sqrt{2\pi}} \int_{J_{PMDwc}}^{\infty} e^{-\gamma_{nd}^2/2} d\gamma_{nd} \quad (94)$$

where $$J_{PMDwc} = \min\left[\left(\frac{\gamma_{th}-\bar{\gamma}_{spa}}{\sigma_{\gamma spa}}\right), \left(\frac{\gamma_{th}-\bar{\gamma}_{spb}}{\sigma_{\gamma spb}}\right), \left(\frac{\gamma_{th}-\bar{\gamma}_{spc}}{\sigma_{\gamma spc}}\right)\right] \quad (95)$$

VIII. Spoofing Detection with 2- and 3-Dimensional Antenna Articulations

The present section develops a spoofing hypothesis test in the case of general 2-D or 3-D articulation motion of the antenna. This differs from the tests in Sections IV-VI, which deal with the case of uni-axial motion defined in Eq. (2). The general case is more complicated, both in terms of hardware implementation of the articulations and in terms of the spoofing detection calculations and analyses. The general case offers benefits as well. One benefit is an improved ability to discern when only a subset of signals are being spoofed. Another benefit is an improved spoofing detection power with fewer signals. As useful by-product is a coarse 3-axis attitude solution. For these reasons, a designer might want to implement a 2-D or 3-D articulation system.

The present section develops the rudiments of a spoofing detection test for this situation in the case of an unknown attitude but a known articulation amplitude. Analysis strategies for statistical design of the detection threshold and computation of the missed-detection probability are suggested but not fully developed. Generalizations to other interesting cases are omitted, e.g., known attitude or unknown attitude plus unknown amplitude scaling.

A. High-Pass Filtering via Linear Least-Squares Estimation

A modified form of carrier-phase measurement high-pass filtering is needed to remove the low-frequency effects of unknown UE motion and clock drift. The high-pass filter calculations solve a modified version of the least-squares problem in Eq. (16). Instead of including the unknown vector dot product $(\hat{r}^x)^T \hat{r}_a$, the modified problem includes the unknown vector $\hat{b}^x = A\hat{r}^x$, where the unit direction vector $\hat{r}^x$ is $\hat{r}^j$ in the unspoofed case and $\hat{r}^{sp}$ in the spoofed case. Thus, $\hat{b}^x$ is the unit direction vector from the signal source to the receiver as measured in the same coordinate system that is used to define the antenna articulation time history $b_a(t)$.

Using the newly defined $\hat{b}^x$ direction vector in either Eq. (9) or Eq. (13), the carrier-phase time history model for the $j^{th}$ GNSS satellite becomes:

$$\begin{bmatrix} \phi_1^j \\ \phi_2^j \\ \phi_3^j \\ \vdots \\ \phi_{N_j}^j \end{bmatrix} = \begin{bmatrix} 1 & 0 & 0 & -\frac{2\pi}{\lambda}b_a^T(\tau_{mid1}^j) \\ 1 & (\tau_{mid2}^j - \tau_{mid1}^j) & \frac{1}{2}(\tau_{mid2}^j - \tau_{mid1}^j)^2 & -\frac{2\pi}{\lambda}b_a^T(\tau_{mid2}^j) \\ 1 & (\tau_{mid3}^j - \tau_{mid1}^j) & \frac{1}{2}(\tau_{mid3}^j - \tau_{mid1}^j)^2 & -\frac{2\pi}{\lambda}b_a^T(\tau_{mid3}^j) \\ \vdots & \vdots & \vdots & \vdots \\ 1 & (\tau_{midN_j}^j - \tau_{mid1}^j) & \frac{1}{2}(\tau_{midN_j}^j - \tau_{mid1}^j)^2 & -\frac{2\pi}{\lambda}b_a^T(\tau_{midN_j}^j) \end{bmatrix} \begin{bmatrix} \beta_0^j \\ \beta_1^j \\ \beta_2^j \\ \hat{b}^x \end{bmatrix} + \begin{bmatrix} n_{\phi 1}^j \\ n_{\phi 2}^j \\ n_{\phi 3}^j \\ \vdots \\ n_{\phi N_j}^j \end{bmatrix} \quad (96)$$

One such system of equations applies for each satellite $j=1, \ldots, L$.

As for the uni-axial case, high-pass filtering in this case starts with a QR factorization of a re-scaled version of the coefficient matrix on the right-hand side of Eq. (96):

$$Q^j \begin{bmatrix} R_{11}^j & R_{12}^j & R_{13}^j & R_{14}^j & R_{15}^j & R_{16}^j \\ 0 & R_{22}^j & R_{23}^j & R_{24}^j & R_{25}^j & R_{26}^j \\ 0 & 0 & R_{33}^j & R_{34}^j & R_{35}^j & R_{36}^j \\ 0 & 0 & 0 & R_{44}^j & R_{45}^j & R_{46}^j \\ 0 & 0 & 0 & 0 & R_{55}^j & R_{56}^j \\ 0 & 0 & 0 & 0 & 0 & R_{66}^j \\ \vdots & \vdots & \vdots & \vdots & \vdots & \vdots \end{bmatrix} = \quad (97)$$

$$\frac{1}{\sigma^j}\begin{bmatrix} 1 & 0 & 0 & -\frac{2\pi}{\lambda}b_a^T(\tau_{mid1}^j) \\ 1 & (\tau_{mid2}^j - \tau_{mid1}^j) & \frac{1}{2}(\tau_{mid2}^j - \tau_{mid1}^j)^2 & -\frac{2\pi}{\lambda}b_a^T(\tau_{mid2}^j) \\ 1 & (\tau_{mid3}^j - \tau_{mid1}^j) & \frac{1}{2}(\tau_{mid3}^j - \tau_{mid1}^j)^2 & -\frac{2\pi}{\lambda}b_a^T(\tau_{mid3}^j) \\ \vdots & \vdots & \vdots & \vdots \\ 1 & (\tau_{midN_j}^j - \tau_{mid1}^j) & \frac{1}{2}(\tau_{midN_j}^j - \tau_{mid1}^j)^2 & -\frac{2\pi}{\lambda}b_a^T(\tau_{midN_j}^j) \end{bmatrix}$$

where the $N_j$-by-6 matrix on the right-hand side of this equation is the input to the QR factorization. The $N_j$-by-$N_j$ orthonormal matrix $Q^j$ along with the $R_{11}^j$, $R_{12}^j$, $R_{13}^j$, ..., $R_{66}^j$ elements of the corresponding upper-triangular matrix are the factorization's outputs. The corresponding operations on the carrier-phase time history and the phase noise time history are still defined by Eq. (18), even though the actual $Q^j$ as computed in Eq. (97) will differ from what would have been computed had Eq. (17) been used for a uni-axial antenna articulation case. The actual values of some of the $R_{mn}^j$ coefficients will also differ, especially for $n \geq 4$.

It is helpful to collect the $R_{mn}^j$ and $z_m^j$ terms for all m and n in the range 4 to 6 into a single matrix vector pair:

$$R_{3D}^j = \begin{bmatrix} R_{44}^j & R_{45}^j & R_{46}^j \\ 0 & R_{55}^j & R_{56}^j \\ 0 & 0 & R_{66}^j \end{bmatrix} \text{ and} \quad (98)$$

$$z_{3D}^j = \begin{bmatrix} z_4^j \\ z_5^j \\ z_6^j \end{bmatrix}$$

These terms define the $4^{th}$-$6^{th}$ rows of the transformed version of Eq. (96), the version that results from multiplication of the equation on both sides by $(Q^j)^T/\sigma^j$. These 3 transformed equations are the only ones that are relevant to spoofing detection with general 3-D antenna articulation motion. The 1-$3^{rd}$ transformed equations serve only to determine the estimates of the auxiliary low-pass-filter parameters $\beta_0^j$, $\beta_1^j$, and $\beta_2^j$. They produce no effects on any sensible spoofing detection statistic, regardless of whether these three parameters are removed from the problem via optimization or via integration over all possibilities. All equations beyond the $6^{th}$ produce only residual errors that are the same for the unspoofed and spoofed cases. Therefore, they do not affect any sensible spoofing detection test either.

B. Calculation of a Spoofing Detection Statistic Based on Attitude Estimation

If one assumes that the attitude A is unknown, then a sensible spoofing detection test estimates the 3-by-3 orthonormal A matrix for the non-spoofed case, and it estimates $\hat{b}^{sp} = A\hat{r}^{sp}$ for the spoofed case. The non-spoofed optimal attitude estimation problem takes the form:

find: A  (99a)

to minimize:

$$J_{nonsp3D}(A) = \frac{1}{2}\sum_{j=1}^{L}[R_{3D}^j A\hat{r}^j - z_{3D}^j]^T[R_{3D}^j A\hat{r}^j - z_{3D}^j] \quad (99b)$$

subject to: $A^T A = I$  (99c)

The problem in Eqs. (99a)-(99c) constitutes a batch maximum likelihood attitude estimation problem because $J_{nonsp3D}(A)$ is the negative natural logarithm of the probability density $p(z_{3D}^1, \ldots, z_{3D}^L | A, H_0)/w$, where w is its normalization constant. The constraint in Eq. (99c) is a symmetric 3-by-3 matrix constraint. Thus, it has only 6 independent elements. The remaining unconstrained elements of A are its 3 independent attitude parameters, e.g., roll, pitch, and yaw.

A helpful tool for solving the problem in Eq. (99a)-(99c) is the attitude quaternion q. It is a unit-normalized 4-element vector that can parameterize the attitude. It can be used to compute the direction cosines matrix $A = A(q)$. Using this parameterization, the attitude estimation problem becomes find: q  (100a)

to minimize:

$$J'_{nonsp3D}(q) = \frac{1}{2}\sum_{j=1}^{L}[R_{3D}^j A(q)\hat{r}^j - z_{3D}^j]^T[R_{3D}^j A(q)\hat{r}^j - z_{3D}^j] \quad (100b)$$

subject to: $q^T q = 1$  (100c)

This transformation reduces the problem to one of nonlinear constrained optimization involving 4 unknowns and a single scalar equality constraint.

A constrained implementation of Newton's method could be used to solve the problem in Eqs. (100a)-(100c). It would be helpful to start the Newton procedure with a good first guess. A reasonable first guess could be determined by solving a related problem find: q  (101a)

to minimize:

$$J''_{nonsp3D}(q) = \frac{1}{2}\sum_{j=1}^{L} w^j[\hat{b}_{opt}^j - A(q)\hat{r}^j]^T[\hat{b}_{opt}^j - A(q)\hat{r}^j] \quad (101b)$$

subject to: $q^T q = 1$  (101c)

where each 3-by-1 unit-direction vector $\hat{b}_{opt}^j$ for j=1, ..., L is the solution to the following estimation problem:

find: $\hat{b}^j$  (102a)

to minimize:

$$J_{j3D}(\hat{b}^j) = \frac{1}{2}[R_{3D}^j \hat{b}^j - z_{3D}^j]^T [R_{3D}^j \hat{b}^j - z_{3D}^j]$$  (102b)

subject to: $(\hat{b}^j)^T \hat{b}^j = 1$  (102c)

Thus, the suggested first-guess procedure involves solving L problems of the type defined in Eqs. (102a)-(102c) followed by solution of the problem in Eqs. (101a)-(101c).

This multi-step approach to generating a first guess for the problem in Eqs. (100a)-(100c) may seem complicated, but the extra effort can be worthwhile. The L $\hat{b}_{opt}^j$ solutions each can be computed in closed form by using a singular value decomposition of the 3-by-3 $R_{3D}^j$ matrix followed by solution of a $6^{th}$-order polynomial for the Lagrange multiplier associated with the constraint in Eq. (102c). This is essentially the same set of operations that are implemented in Eqs. (41)-(47) in order to solve the $\hat{r}_a$ estimation problem in Eqs. (40a)-(40c). Of course, each of these problems must have a unique solution in order to be useful for setting up the problem in Eqs. (101a)-(101c).

The problem in Eqs. (101a)-(101c) also can be solved in closed form by computing the eigenvalues and associated eigenvectors of a 4-by-4 symmetric matrix. The problem in Eqs. (101a)-(101c) is the classic Wahba problem of attitude determination. The eigenvalue-based solution method is known as the q-method. The positive weights $w^j$ for j=1, ..., L in Eq. (101b) should be chosen to be roughly proportional to the inverse variance of the directional accuracy of the corresponding $\hat{b}_{opt}^j$ estimate from Eqs. (102a)-(102c). This can be computed from the inverse of the Hessian of the Lagrangian function associated with the optimal solution to Eqs. (102a)-(102c) after projection of that Hessian into the 2-dimensional tangent space of the normalization constraint.

Consider now the spoofed case with general $b_a(t)$ antenna articulation motion. In this situation, the full attitude is not observable because the signals all come from a single unknown direction. Therefore, the relevant free parameter in the model is $\hat{b}^{sp}$. A useful detection statistic can be developed if one estimates this quantity by solving the following problem find: $\hat{b}^{sp}$  (103a)

to minimize:

$$J_{sp3D}(\hat{b}^{sp}) = \frac{1}{2}\sum_{j=1}^{L}[R_{3D}^j \hat{b}^{sp} - z_{3D}^j]^T [R_{3D}^j \hat{b}^{sp} - z_{3D}^j]$$  (103b)

subject to: $(\hat{b}^{sp})^T \hat{b}^{sp} = 1$  (103c)

This problem can be solved in closed form using the following singular decomposition $$U_{3D}\begin{bmatrix} \sigma_{3Da} & 0 & 0 \\ 0 & \sigma_{3Db} & 0 \\ 0 & 0 & \sigma_{3Dc} \\ 0 & 0 & 0 \\ \vdots & \vdots & \vdots \\ 0 & 0 & 0 \end{bmatrix} V_{3D}^T = \begin{bmatrix} R_{3D}^1 \\ R_{3D}^2 \\ R_{3D}^3 \\ \vdots \\ R_{3D}^L \end{bmatrix}$$  (104)

and using the following transformation of non-homogeneous terms.

$$\begin{bmatrix} z_{3Da} \\ z_{3Db} \\ z_{3Dc} \\ z_{3Dr} \end{bmatrix} = U_{3D}^T \begin{bmatrix} z_{3D}^1 \\ z_{3D}^2 \\ z_{3D}^3 \\ \vdots \\ z_{3D}^L \end{bmatrix}$$  (105)

One performs analogous operations to those in Eqs. (43)-(47) that solve the similar problem in Eqs. (40a)-(40c). Suppose that the resulting solution is called $\hat{b}_{opt}^{sp}$.

Note: the case of planar articulation presents special challenges to these optimization problems. It is the case of purely 2-dimensional $b_a(t)$ motion. Its challenges are the possibility of there being two globally optimum solutions for the attitude A in Eqs. (99a)-(99c) and the certainty of there being two globally optimal solutions for the spoofing direction $\hat{b}^{sp}$ in Eqs. (103a)-(103c). The solution pairs will map to each other via reflections through the plane of the $b_a(t)$ motion. This happens because all of the 3-by-3 matrices $R_{3D}^j$ are rank 2. This condition causes each of the $\hat{b}^j$ optimization problems in Eqs. (102a)-(102c) to have 2 globally optimal solutions, and it causes $\sigma_{3Dc}$ in Eq. (104) to be 0, giving rise to the two $\hat{b}^{sp}$ solutions. If there are L=3 or more signals and if their $\hat{r}^j$ vectors are not all coplanar, which is the case for non-infinite Geometric Dilution of Precision (GDOP), then the ambiguities of the $\hat{b}_{opt}^j$ vectors should be resolvable by the following technique: One chooses the $\hat{b}_{opt}^j$ vectors that approximately match the dot products of all pairs of $\hat{b}_{opt}^j$ vectors with the corresponding $\hat{r}^j$ dot products and that approximately match the scalar triple products of all trios of $\hat{b}_{opt}^j$ vectors with corresponding $\hat{r}^j$ scalar triple products. These disambiguated $\hat{b}_{opt}^j$ vectors can be used in the approximate q optimization problem in Eqs. (101a)-(101c) in order to generate a first guess for the exact problem in Eqs. (100a)-(100c). The solution to this latter problem should be unique in this case.

Unfortunately, there is no similar method to resolve the $\hat{b}^{sp}$ ambiguity. Fortunately, the ambiguity likely does not need resolution because the global minimum Eq.-(103b) costs of the true and false $\hat{b}^{sp}$ values will be the same and will yield identical values for the spoofing detection statistic $\gamma$.

There is another possible way to resolve the ambiguities caused by 2-dimensional $b_a(t)$ articulations. It relies on a consideration of the gain pattern of the receiver's GPS antenna. Typical gain patterns are hemispherical or narrower. Normally, only one of the two global solutions for any given $\hat{b}_{opt}^j$ or for $\hat{b}^{sp}$ will correspond to a signal reception direction that lies in a reasonable region of the antenna's gain pattern. Note, however, that this may not be the case for a poor combination of $b_a(t)$ motion and gain pattern. Therefore, it may behoove the system designer to consider this issue when designing the articulation system.

Given the optimal solution $A_{opt}$ to the attitude determination problem in Eqs. (99a)-(99c), or equivalently, the $q_{opt}$ solution of Eqs. (100a)-(100c), and given the solution $\hat{b}_{opt}^{sp}$ to the spoofer direction determination problem in Eqs. (103a)-(103c), a sensible spoofing detection statistic is:

$$\gamma = J_{sp3D}(\hat{b}_{opt}^{sp}) - J_{nonsp3D}(A_{opt}) = J_{sp3D}(\hat{b}_{opt}^{sp}) - J'_{nonsp3D}(q_{opt}) \quad (106)$$

A sensible spoofing detection test selects a threshold value $\gamma_{th}$ and determines that no spoofing has occurred if $\gamma \geq \gamma_{th}$. A spoofing attack is declared, however, if $\gamma < \gamma_{th}$. As in all other tests defined herein, this test makes sense because $J_{sp3D}(\hat{b}_{opt}^{sp})$ will tend to be large in the non-spoofed case due to the poor fit of its underlying spoofed signal model to the non-spoofed data. The cost $J_{nonsp3D}(A_{opt})$, or the equivalent quantity $J'_{nonsp3D}(q_{opt})$, will tend to be small due to the reasonableness of its model. Therefore, $\gamma$ will tend to be a large positive number in the absence of spoofing. Under a spoofing attack, however, $J_{sp3D}(\hat{b}_{opt}^{sp})$ will be small due to a good fit between its model and the carrier-phase data, while $J_{nonsp3D}(A_{opt})$ and the equivalent $J'_{nonsp3D}(q_{opt})$ will tend to be large, and $\gamma$ will tend to be a negative number of large magnitude. A value of $\gamma_{th}$ in the vicinity of 0 should suffice to detect spoofing attacks with a low probability of false alarm and a low probability of missed detection. This test will not be an optimal Neyman-Pearson test due to its use of the optimized values $A_{opt}$ and $\hat{b}_{opt}^{sp}$ instead of integration over all possible values. This test is likely to be nearly as powerful as the optimal test, however, due to the efficacy of optimization as a proxy for integration.

Although the specifics of the detection statistic calculation change for 2D and 3D antenna motion, the basic spoofing detection principle remains the same. During a spoofing attack, there is no geometric diversity of the direction of arrival of the L signals. Therefore, to within measurement error, all of the carrier phase variations caused by the $b_a(t)$ motion will be identical for all L satellites. When there is no spoofing, however, the L different satellites will, in general, exhibit L distinct carrier-phase responses to the $b_a(t)$ motion. Successful spoofing detection is a matter of distinguishing between these two situations. The difference of carrier-phase-model fits between the spoofed and non-spoofed assumptions, as embodied in Eq. (106) and in similar equations herein, represents a good mechanization for comparing the relative sameness vs. diversity of the carrier phase responses to $b_a(t)$.

C. Design of Spoofing Detection Threshold and Analysis of Probabilities, Unknown Attitude and General 3D Articulation The spoofing detection test for the case of general 3D antenna articulations requires some design and analysis. The spoofing detection threshold $\gamma_{th}$ must be chosen to give a particular false-alarm probability, and the resulting probability of missed detection must be analyzed. For the sake of brevity, the required analyses are not carried out here. Instead, general approaches are defined that could be used to carry out the analyses.

The first step in the design and analysis is to characterize the non-spoofed and spoofed probability density functions for the detection statistic $\gamma$, $p(\gamma|A, H_0)$ and $p(\gamma|\hat{b}^{sp}, H_1)$. A good first step in deriving these functions is to express $\gamma$ as a function of the (3L)-by-1 dimensional noise vector $v_{3D} = [n_4^1; n_5^1; n_6^1; n_4^2; n_5^2; n_6^2; n_4^3; n_5^3; n_6^3; \ldots; n_4^L; n_5^L; n_6^L]$. The noise terms $n_4^j$, $n_5^j$, and $n_6^j$ are the ones calculated in the alternate version of Eq. (18) that is associated with the high-pass-filter QR factorization for the 3D problem given in Eq. (97). This first step will probably require approximation to yield a result that is valid only to second order in $v_{3D}$. The resulting equations will be 3D analogs of Eqs. (49) and (53) that look somewhat similar. The main differences will lie in the terms that are quadratic forms in $v_{3D}$. In Eqs. (49) and (53), the quadratic form in $v$ involves a symmetric weighting matrix that is the difference between a projection matrix onto a 2D subspace, or nearly so, and a projection matrix onto a 1D subspace. In the new equations, the matrix difference will be between a projection matrix onto a 3D subspace, or nearly so, and a projection matrix onto a 2D subspace, or nearly so.

The most important feature of the resulting $\gamma$ formulas in terms of $v_{3D}$ is that they will still be dominated by Gaussian terms. Therefore, Gaussian approximations can be developed for $p(\gamma|A, H_0)$ and $p(\gamma|\hat{b}^{sp}, H_1)$.

Given $p(\gamma|A, H_0)$, the design of $\gamma_{th}$ will proceed similarly to the design used in Subsection V.C. Given a worst-case probability of false alarm $\alpha_{wc}$, a corresponding worst-case attitude $A_{wc}$ will be estimated, and the corresponding threshold $\gamma_{th}$ will be determined using $\alpha_{wc}$ and $p(\gamma|A_{wc}, H_0)$ in a standard calculation. Note that the optimization problem used to determine $A_{wc}$ will be somewhat more complicated than the corresponding problems for the case of 1D antenna articulation motion. It may be advisable to solve for an equivalent worst-case true attitude quaternion $q_{wc}$ and then use that to compute $A_{wc} = A(q_{wc})$. Such an approach will reduce the dimensionality of the worst-case optimization problem from 9 to 4 while reducing the number of nonlinear equality constraints from 6 to 1.

Given $\gamma_{th}$ and $p(\gamma|\hat{b}^{sp}, H_1)$, a worst-case false-alarm probability will be computable, similar to what has been done in Subsection V.C for the unknown attitude case with 1D articulation motion. This will involve an optimization problem to determine the worst-case spoofing direction vector $\hat{b}_{wc}^{sp}$. It will be an equality-constrained optimization that enforces $(\hat{b}_{wc}^{sp})^T \hat{b}_{wc}^{sp} = 1$.

IX. Spoofing Detection Results using Data From Truth-Model Simulations And From Live-Signal Tests The spoofing detection techniques of Sections IV-VI have been tested using truth-model simulation data. The technique of Section VI, coupled with the time phasing estimation of Section VII, has also been tested using live-signal data. All of these tests involve simple 1-dimensional $b_a(t)$ articulation motion. No tests have yet been implement for general 3D antenna articulation. All of the tests have worked with the GPS L1 C/A-code signal, which has a nominal carrier frequency of $f_{L1} = 1575.42 \times 10^6$ Hz and a nominal wavelength of $\lambda_{L1} = c/f_{L1} = 0.190294$ m. All of these tests exhibit very good detection power and small probabilities of false alarm when using peak-to-peak antenna deflections in the range 4-6 cm and detection intervals in the range 0.125 to 0.5 sec. Representative test results are described in this section.

A. Design of Monte-Carlo Truth-Model Simulation Tests

Two truth-model simulations have been developed, one to simulate the non-spoofed beat carrier phase time histories, as modeled by Eq. (10), and another to simulate the spoofed beat carrier phase histories, as per Eq. (15). Each simulation has used truth values of the quadratic polynomial low-pass filter nuisance parameters $\beta_0^j$, $\beta_1^j$, and $\beta_2^j$ for GPS satellites $j=1, \ldots, L$. It also has used a truth articulation direction $\hat{r}_a$ and a truth articulation amplitude time history $\rho_a(t)$. The non-spoofed simulations have used truth directions from the satellites to the defended receiver $\hat{r}^j$ for $j=1, \ldots, L$, but the spoofed simulations have used only a truth value for the spoofer-to-receiver unit direction vector $\hat{r}^{sp}$. Each simulation has generated simulated carrier phase measurements $\phi_k^j$ at the truth sample times $\tau_{midk}^j$ for k=1, ..., $N_j$ and j=1, ..., L. Each such measurement has been corrupted by zero-mean Gaussian discrete-time white noise $n_{\phi k}^j$ sampled using a random number generator. The standard deviation $\sigma^j$ of the $j^{th}$ satellite signal's noise sequence has been dictated by its carrier-to-noise ratio $C/N_0$, as modeled in Eq. (11).

For each spoofing detection test, the test calculations have been supplied with the following data from the truth-model simulation: $\phi_k^j$ and $\tau_{midk}^j$ for k=1, ..., $N_j$ and j=1, ..., L, $\rho_{anom}(t)$, $\hat{r}^j$ for j=1, ..., L, and $\sigma^j$ for j=1, ..., L. In all non-spoofed cases, the supplied $\hat{r}^j$ direction vectors have equaled the truth vectors that have been used in the corresponding truth-model simulation. In all spoofed cases, the supplied $\hat{r}^j$ direction vectors are a reasonable fictitious set that the spoofer has led the victim receiver to believe as being the directions from actual satellites.

Additional data supplied to the spoofing detection test have varied with the test. In the case of the known-attitude/known-amplitude tests of Section IV, the articulation direction vector $\hat{r}_a$ also has been supplied to the detection test calculations, the same one as has been used in the truth-model simulation. For both the known-attitude/known-amplitude test of Section IV and the unknown-attitude/known-amplitude test of Section V, the supplied nominal articulation amplitude time history $\rho_{anom}(t)$ has equaled the truth $\rho_a(t)$ that has been used in the simulation. For the unknown-attitude/unknown-amplitude test of Section VI, however, the supplied value of $\rho_{anom}(t)$ has equaled $\rho_a(t)/a$, where $\rho_a(t)$ is the truth time history and the value a≥1 is the truth amplitude rescaling factor. In no spoofed case has the spoofer direction $\hat{r}^{sp}$ been supplied to the spoofing detection calculations.

In each test scenario, the truth-model simulation has been run in a Monte-Carlo mode: Thousands of trials have been run with the same input parameters but with different random number seeds to generate different white-noise sequences $n_{\phi k}^j$ for k=1, ..., $N_j$ and j=1, .... L. A spoofing detection statistic has been computed for each set of simulated data, and histograms of the statistic have been plotted. Also plotted have been the spoofing detection threshold and the predicted theoretical probability density functions of the spoofing detection statistic for the non-spoofed and spoofed conditions. These plots characterize the power of the test and the accuracy of the Gaussian approximations used to design and analyze the various detection scenarios.

The tests that have been run have concentrated on cases that use L=6 GPS satellite signals with a distribution of $\hat{r}^j$ direction vectors that yields a GDOP of 3.5. The modeled carrier-to-noise ratios range from 38.2 dB-Hz to 44.0 dB-Hz. These are somewhat conservative assumptions about the number of available satellites, their geometric dilution of precision, and their signal strengths. This conservatism translates into less detection power for a given false-alarm probability than would be available in spoofing detection tests that had more satellites, a better GDOP, or stronger signals.

Additional common features of the simulation cases have been the form of the $\rho_a(t)$ articulation time history, the duration of the detection data batch, and the sample rate. $\rho_a(t)$ is always an 8 Hz sine wave, and the detection covers one full period of its oscillation. Thus, the total detection interval is 0.125 sec. The accumulation period $\Delta\tau_{cavg}^j=0.001$ see has been used so that each satellite contributes $N_j=125$ carrier-phase measurements to each detection test.

The decision to use one full period of a sine wave, starting at zero phase and ending at a phase of $2\pi$, guarantees a significant residual signal component after the high-pass filtering associated with the QR factorization in Eq. (17). This is true because a full period of a sine wave cannot be fit well by the quadratic polynomial that is parameterized by its $\beta_0^j$, $\beta_1^j$, and $\beta_2^j$ coefficients. The presence of significant residual articulation signal after high-pass filtering is important to achieving a good detection power.

The peak-to-peak $\rho_a(t)$ deflections have been varied from 4.76 cm to 5.85 cm. The lower number is exactly a quarter of a carrier wavelength. The higher number is about 31% of a wavelength. As per Eq. (11), $C/N_0$=38.2 dB-Hz at a 1000 Hz accumulation frequency translates into a carrier phase measurement error standard deviation of $\sigma^j$=0.275 rad (0.0438 cycles). This standard deviation is no greater than 17.5% of the phase effect of the peak-to-peak antenna motion. Therefore, the articulation motion should be clearly discernable in the data.

Several truth values have been used for the articulation direction vector $\hat{r}_a$ and for the spoofer direction vector $\hat{r}^{sp}$. In some cases, random values have been chosen for these directions. In other cases, worst-case values have been chosen as the truth values, That is, the truth $\hat{r}_a$ sometimes has been chosen to equal the solution to the worst-case direction problem in Eqs. (59a)-(59c) for the situation of known amplitude and unknown attitude. Similarly, $\hat{r}^{sp}$ sometimes has been chosen so that $\eta=(\hat{r}^{sp})^T\hat{r}_a$ equals the solution to the worst-case dot product problem in Eqs. (61 a)-(61c).

B. Monte-Carlo Simulation Test Results

Figure 5:
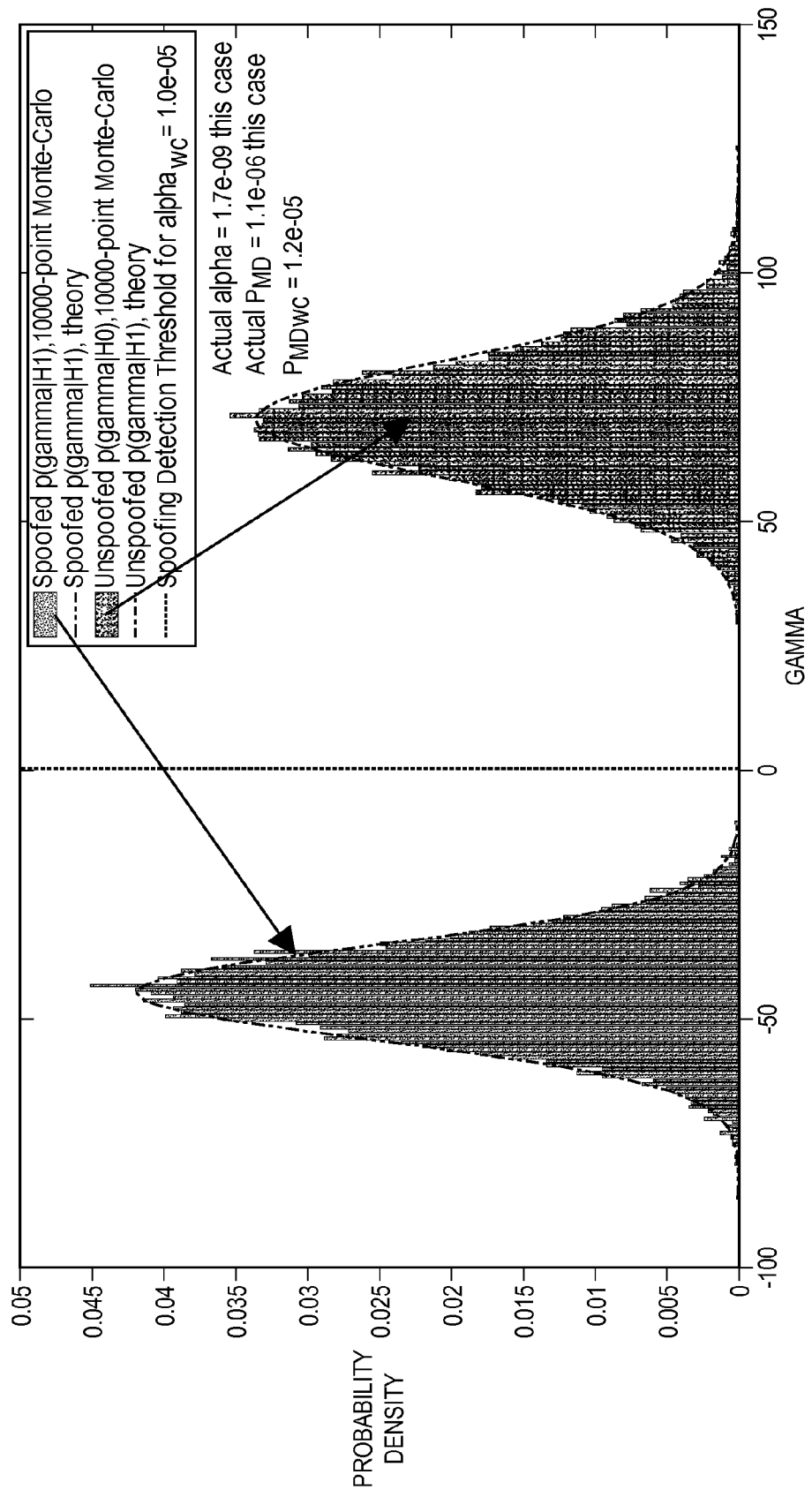
FIGS. 5-11 depict results of embodiments of the method and system of these teachings.

The Monte-Carlo simulation results for a typical spoofing detection test are shown in FIG. 5. It shows $\gamma$ detection statistic histograms for 10000 Monte-Carlo simulations of a non-spoofed case and 10000 other Monte-Carlo simulations of the corresponding spoofed case for an unknown-attitude/known-amplitude spoofing detection test. This is the test developed in Section V. Also shown are the spoofing detection threshold for a worst-case false alarm probability of $\alpha_{wc}=10^{-5}$ along with the theoretical non-spoofed and spoofed probability density functions for $\gamma$. Note that the non-spoofed and spoofed cases both use the same $\rho_a(t)$ articulation time history and the same values of $\hat{r}^j$ for j=1, ..., L for all of their tests. The peak-to-peak antenna deflections in $\rho_a(t)$ are 4.76 cm, i.e., exactly a quarter of the nominal L1 wavelength. All 10000 non-spoofed cases use the same truth value of $\hat{r}_a$, and all 10000 spoofed cases use the same truth value of $\eta=(\hat{r}^{sp})^T\hat{r}_a$.

It is clear from FIG. 5 that the spoofing detection test correctly classified all 10000 non-spoofed cases and all 10000 spoofed cases. It is also clear that the theoretical and Monte-Carlo probability density functions are in good agreement. This agreement confirms the reasonableness of the Gaussian approximations of $p(\gamma|\hat{r}_a,H_0)$ and $p(\gamma|\eta,H_1)$.

The truth values of $\hat{r}_a$ and $\eta$ that have been used to generate the data in FIG. 5 are not the worst-case values for the given situation. This is evidenced by two facts: The actual probability of false alarm is $\alpha=1.7\times10^{-9}<\alpha_{wc}=10^{-5}$, and the actual probability of missed detection is $P_{MD}=1.1\times10^{-6}<P_{MDwc}=1.2\times10^{-5}$. Even if $\hat{r}_a$ and $\eta$ had taken on their worst-case values, the resulting detection test still would have been very powerful.

Figure 6:
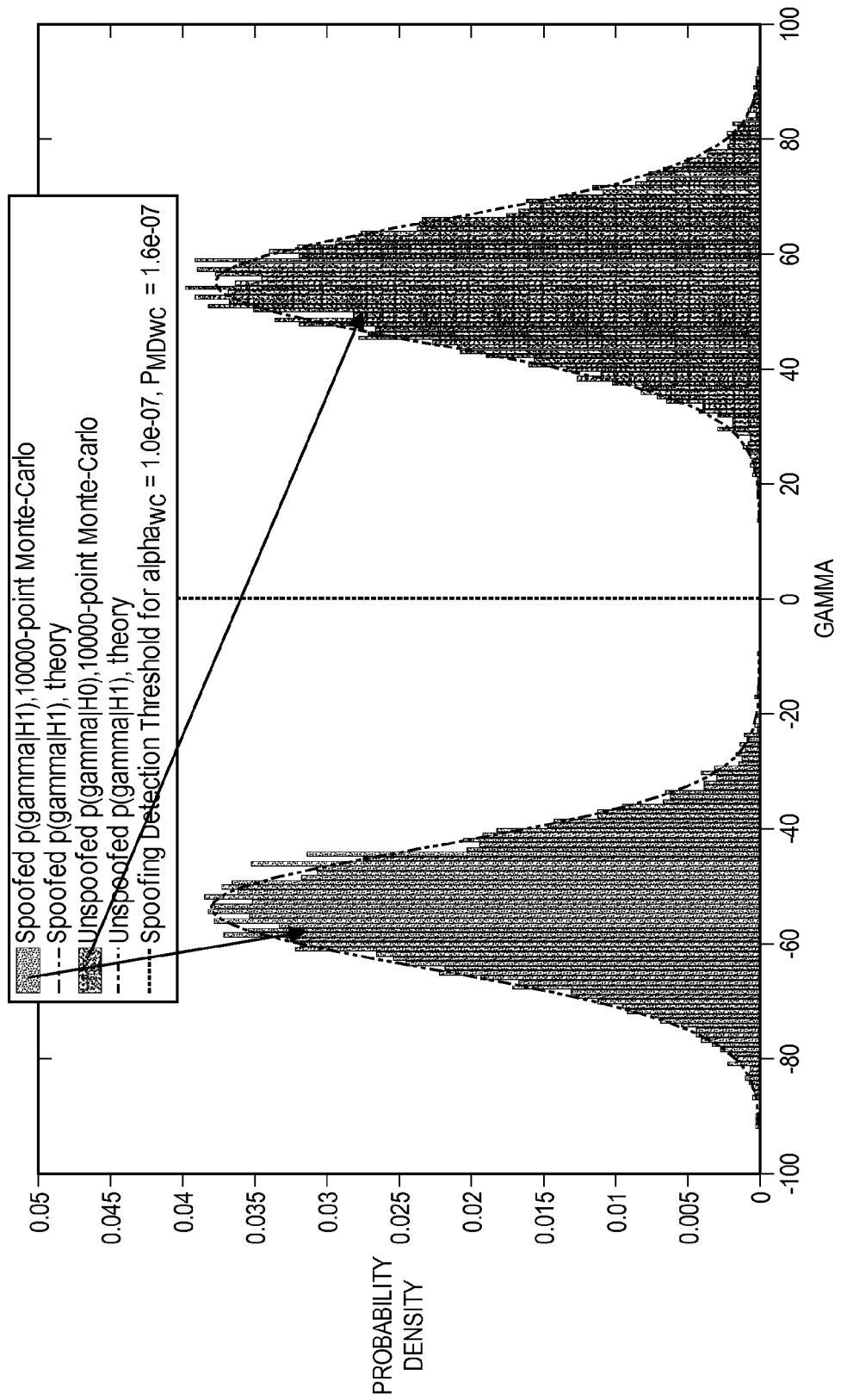

Another typical case is shown in FIG. 6. This case is similar in many respects to that of FIG. 5, except for three points: First, it is for the unknown-attitude/unknown-amplitude case. Second, its truth values of $r_a=a\hat{r}_a$ and of $\eta=a(\hat{r}^{sp})^T\hat{r}_a$ are the worst-case values for the given parameters of this problem. Third, the $\rho_a(t)$ articulation time history has a slightly larger peak-to-peak deflection, 5.77 cm, which is 30.3% of the nominal L1 carrier wavelength. Note that the worst-case value of a is 1, i.e., the smallest possible value, so that $r_a = \hat{r}_a$.

The results for the unknown-attitude/unknown-amplitude test in FIG. 6 are very good, and they are comparable to those in FIG. 5. The probability of false alarm is only $\alpha = \alpha_{wc} = 10^{-7}$, and the probability of missed detection is only $P_{MD} = P_{MDwc} = 1.6 \times 10^{-7}$. Note that the improved worst-case values for FIG. 6's results vs. those of FIG. 5 are likely due to the slightly larger amplitude of the antenna articulations.

All of the other Monte-Carlo tests have produced similar good results. The largest values of $\alpha_{wc}$ and $P_{MDwc}$ have been, respectively, $3.0 \times 10-5$ and $2.8 \times 10^{-5}$. These both occurred on the smallest-amplitude case, a case with unknown-attitude/unknown-amplitude and with a $\rho_{anom}(t)$ peak-to-peak articulation of only 4.52 cm. Even these largest probabilities are very small. They are characteristic of reliable tests. All of the tests used peak-to-peak antenna motion of less than 6 cm and a detection interval of 0.125 seconds. These are very powerful tests for a compact system, and they detect spoofing attacks quickly.

C. Test Scenarios that use Live Data

Three sets of test have been conducted using live data. All of these tests have been conducted using the prototype articulation system shown in FIG. 3. Therefore, it has been necessary to use the unknown-attitude/unknown-amplitude spoofing detection test of Section VI along with the $\Delta t_0$ time phasing estimation pre-processing calculations that are described in Section VII.

Two of the test sets included spoofing or spoofing-like signals. A spoofing-like signal has been generated for one set of tests by receiving GPS signals using an outdoor antenna, amplifying them, and re-radiating them indoors in an anechoic chamber. Although not true spoofing, this configuration has the same signal-in-space geometry that is exploited by the present spoofing detection techniques: All of the signals come from the common direction $\hat{r}^{sp}$. In this case, the direction points from the re-radiating antenna to the defended receiver's articulating antenna, which is also inside the anechoic chamber. The particular anechoic chamber that has been used is a NASA facility in Wallops Island, Va. This facility has permission to re-radiate GPS signals inside the chamber because it provides sufficient shielding to prevent RF energy from radiating outside of the chamber. The tests in this facility were conducted on Apr. 26, 2012.

A true spoofing signal has been generated using an advanced version of the spoofer described in Humphreys, T. E., Ledvina, B. M., Psiaki, M. L., O'Hanlon, B., and Kintner, P. M., Jr., "Assessing the Spoofing Threat: Development of a Portable GPS Civilian Spoofer," *Proc. ION GNSS* 2008, Sept. 16-19, 2008, Savannah, Ga. and in Humphreys, T. E., Kintner, P. M., Jr., Psiaki, M. L., Ledvina, B. M., and O'Hanlon, B. W., "Assessing the Spoofing Threat," GPS World, Vol. 20, No. 1, January 2009, pp. 28-38. It was authorized to broadcast live spoofing signals on the night of Jun. 19-20, 2012 at White Sands Missile Range, N. Mex. (WSMR). These broadcasts were conducted as part of a special series of GPS integrity tests that had been arranged by the Department of Homeland Security. The prototype spoofing detection system was brought to WSMR and tested against some of the spoofing attacks that were initiated that night. It was located in the region where the spoofer was targeting victims so that the spoofed signals would look realistic. The prototype system was also tested that same night during quite times when the spoofer was turned off.

The third set of tests were for a typical non-spoofed case in Ithaca, N.Y. This test was conducted on top of a tall building on the campus of Cornell University on May 3, 2012. Thus, there were two independent sets of data under spoofing or spoofing-like conditions and two other independent sets of data under non-spoofed conditions.

Purely for the sake of ease of implementation, the prototype system did all of its GPS signal processing and spoofing detection calculations in a post-processing mode. The antenna motion was activated by using an attached string to cause an initial deflection of the cantilevered-beam antenna mount. Prior to initiating motion, a GPS digital storage receiver started operation to record the entire L1 signal bandwidth. The stored RF data were later processed on a work station using a C-language software GPS receiver in order to produce the raw beat carrier phase observables $\phi_k^j$ for $k=1, \ldots, N_j$ and $j=1, \ldots, L$. The software receiver also produced raw signal accumulations, which were used in order to deduce each carrier-to-noise ratio $(C/N_0)^j$ for purposes of computing carrier-phase measurement standard deviation $\sigma^j$, as in Eq. (11). All of the beat carrier phase measurements used a nominal accumulation interval of $\Delta \tau_{cavg} = 0.01$ sec. That is, carrier phase was sampled at 100 Hz.

After generation by the software receiver, the raw $\phi_k^j$ measurements were input to the spoofing detection signal processing calculations. These calculations included the cycle-slip repair described in Subsection III.A, the high-pass filtering calculations in Eqs. (17) and (18) of Section IV.B, the $\Delta t_0$ estimation calculations of Subsection VII.A, and the spoofing detection calculations of Section VI.

An additional auxiliary estimation problem had to be solved prior to performing the spoofing detection calculations: The shape of the $\rho_{anom}(t)$ articulation profile had to be estimated. It was known a priori from the vibration theory of linear structures that a good approximation of this profile would be a decaying sinusoid of the form $$\rho_{anom}(t - \Delta t_0) = \rho_{a0} e^{-\xi \omega_n (t - \Delta t_0)} \sin[(t - \Delta t_0) \omega_n \sqrt{1 - \xi^2}] \quad (107)$$

where $\rho_{a0}$ is the initial amplitude, $\xi$ is the damping ratio, $\omega_n$ is the undamped natural frequency, and $\Delta t_0$ is the time phasing variable defined in Section VII. Unfortunately, these quantities were not known ahead of time. In order to do spoofing detection, it was necessary to have good estimates of $\xi$ and $\omega_n$ along with a coarse estimate of $\Delta t_0$ and a lower bound for $\rho_{a0}$.

Therefore, a pre-processing estimation problem has been solved to determine $\xi$, $\omega_n$ and $\Delta t_0$. It minimizes the following modified version of the $\Delta t_0$ estimation cost function from Eq. (90):

$$J_{shape}(\zeta, \omega_n, \Delta t_0) = \qquad (108)$$

$$\frac{1}{2} \left( \frac{\Delta t_0}{\sigma_{\Delta t 0 ap}} \right)^2 + \frac{1}{2} \sum_{j=1}^{L} (f^j)^T \left\{ I - \hat{d}^j(\Delta t_0; \zeta, \omega_n)[\hat{d}^j(\Delta t_0; \zeta, \omega_n)]^T \right\} f^j$$

where $\hat{d}^j(\Delta t_0; \xi, \omega_n)$ is the same function that is defined by Eqs. (91b) & (92b), but with $\rho_a(t - \Delta t_0)$ in Eq. (92b) replaced by $\rho_{anom}(t - \Delta t_0)$ from Eq. (107). Note that this cost function does not depend on the unknown articulation amplitude $\rho_{a0}$ because the $\hat{d}^j(\Delta t_0; \xi, \omega_n)$ normalization calculations in Eq. (91b) remove the dependence on $\rho_{a0}$. The corresponding $\hat{d}^j(\Delta t_0; \xi, \omega_n)[\hat{d}^j(\Delta t_0; \xi, \omega_n)]^T$ term in Eq. (108) effectively estimates the phase time history scaling quantities $$-\frac{2\pi}{\lambda}(\hat{r}^j)^T \hat{r}_a \rho_{a0}$$

for j=1, ..., L as independent unknowns and removes them from the problem. The minimization of $J_{shape}(\xi,\omega_n,\Delta t_0)$ starts with reasonable first guesses of $\xi$, $\omega_n$, and $\Delta t_0$ as determined by operator inspection of the corresponding $\phi_k^j$ vs. $\tau_{midk}^j$ time histories, and it iterates to compute improved estimates using Newton's method.

Figure 7:
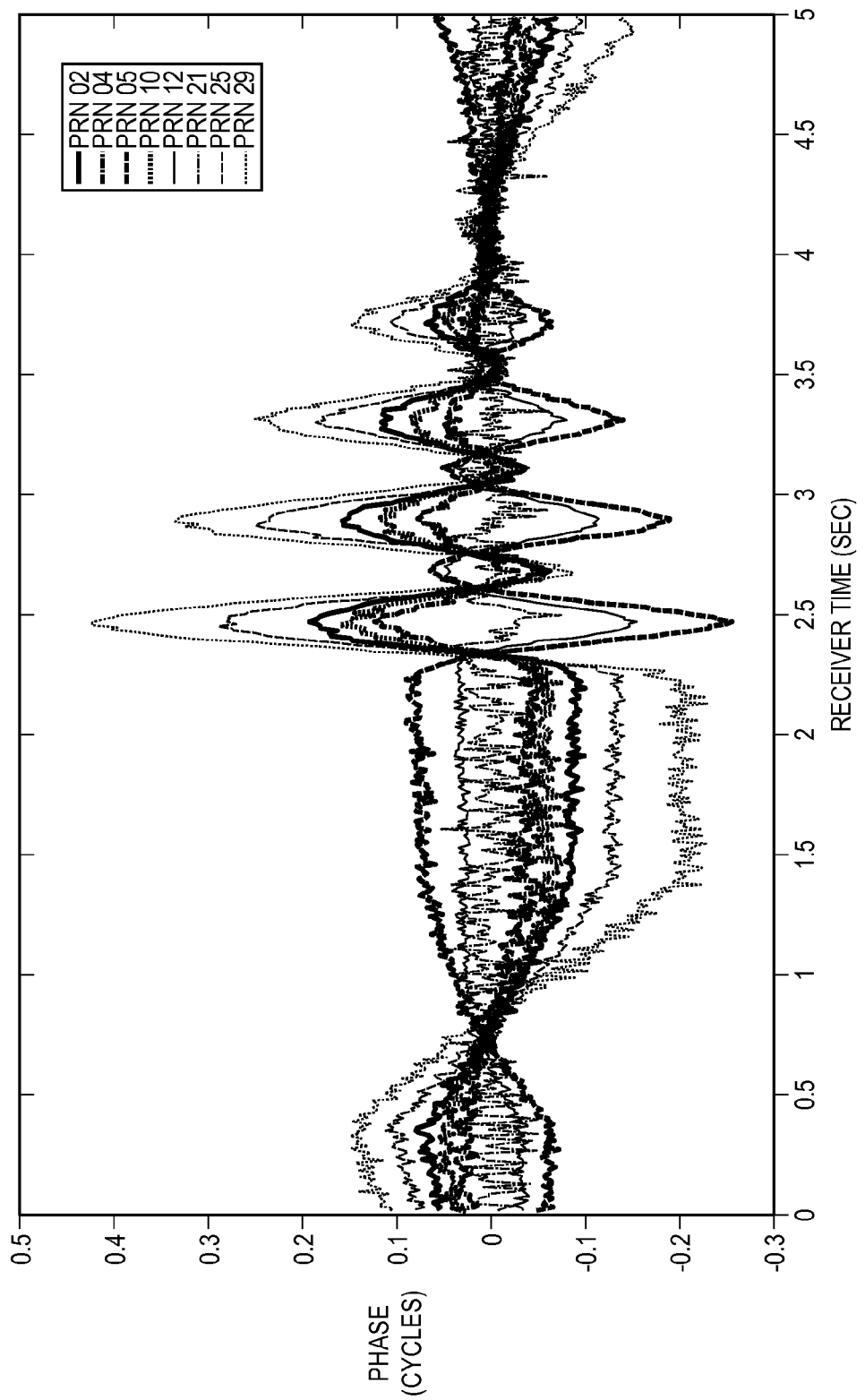

Typical detrended carrier-phase data used in the estimation of $\xi$, $\omega_n$, and $\Delta t_0$ appear in FIG. 7. These data come from one of the non-spoofed detection tests conducted at WSMR. The initial string pull starts at t=0.3 sec. The release of the string and the start of the damped oscillations occur as t=2.2 sec. It is obvious that the subsequent carrier phase oscillations during the interval from t=2.2 sec to t=4 sec are modeled reasonably well by the decaying sinusoid in Eq. (107). In one curve fitting scenario, all of the data from t=2.35 sec to i=3.63 sec were used, which constitutes 3 full cycles of the decaying oscillations. The resulting estimates of the damping ratio and the undamped natural frequency are $\xi$=0.0581 and $\omega_n$=14.8405 rad/sec. This gives a damped period of 0.4241 sec. The damping ratios and undamped natural frequencies estimated for all the various data sets of the prototype system span the ranges $\xi$=0.0137 to 0.1164 and $\omega_n$=10.9982 to 15.2119 rad/sec. The lower frequency cases in the range $\omega_n$=10.9982 to 11.9545 rad/sec occurred in the April and May tests in Wallops Island and Ithaca. The higher frequency cases in the range $\omega_n$=14.7732 to 15.2119 rad/sec all occurred at WSMR. This frequency jump was the result of a change in the cantilever beam conditions that caused a slight stiffening of its effective spring constant. The highest damping ratios, in the range $\xi$=0.0751 to 0.1164, correspond to WSMR cases that use only the last one or two oscillation periods before the oscillations stop altogether, e.g., between t=3 and t=3.85 sec in FIG. 7. The larger effective damping ratios for lower amplitude oscillations presumably are due to the presence of nonlinear static friction in the system. This indicates that spoofing detection tests conducted using the later oscillations of the prototype system might not perform exactly as modeled because the nonlinear friction effects become more important, and they are not modeled as well by the decaying sinusoidal time history in Eq. (107).

Figure 8:
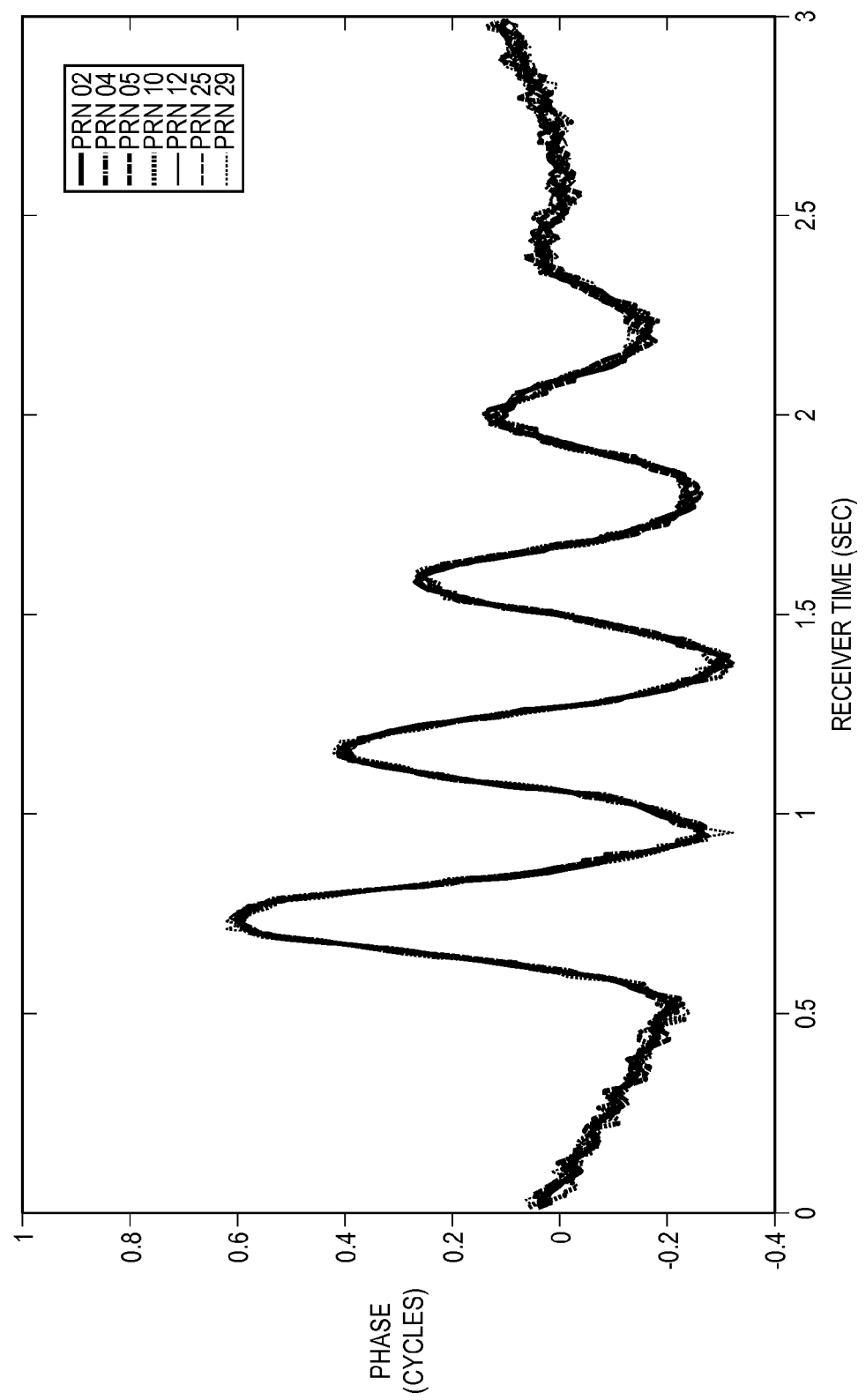

The carrier phase time histories in FIG. 7 serve to illustrate the present teachings' means of spoofing detection. It is obvious from this figure that all of the L=8 satellite signals exhibit similar decaying sinusoid time histories with the same phase, except for a possible sign change. This is exactly what is predicted by the 1-dimensional non-spoofed carrier phase model in Eq. (10). Presumably the differing signs and amplitudes of the signals are explainable in terms of the differing values of $(\hat{r}^j)^T \hat{r}_a$ for some reasonable estimate of $\hat{r}_a$. In all of the spoofed cases, however, the detrended decaying sinusoids for the different signals all have the same amplitude and sign because the $(\hat{r}^{sp})^T \hat{r}_a$ term in Eq. (15) is the same for all signals. This situation is shown in FIG. 8 for a spoofed case recorded at WSMR.

The task of the spoofing detection calculation is to test whether sameness is the best model or whether a better model is one of differences. The former explanation indicates spoofing, but the latter indicates no spoofing. In the latter case, however, these differences must be explainable in terms of differing $(\hat{r}^j)^T \hat{r}_a$ values for differing signal indices j and for some reasonable $\hat{r}_a$ estimate. The other carrier-phase-based spoofing detection tests that have been proposed give no indication that one can detect GNSS spoofing by exploiting the obvious difference between the diversity of carrier phase time histories in FIG. 7 and the uniformity in FIG. 8, especially if the diversity in FIG. 7 correlates well with the known antenna motions.

D. Results of Live-Data Tests

The live-data spoofing detection tests have all proved successful. A total of 4 non-spoofed cases and 4 spoofed cases have been analyzed, and the correct decision about the presence of spoofing has been reached in every case. All cases have used the worst-case probability of false alarm value $\alpha_{wc}=10^{-6}$, and the largest worst-case probability of missed detection has been $P_{MDwc}=1.6\times10^6$.

Peak-to-peak antenna deflections in the non-spoofed cases, where they could be directly estimated, have ranged from 4.01 cm (21% of $\lambda_{L1}$) to 13.55 cm (71% of $\lambda_{L1}$). The spoofed-case amplitudes have been appraised as having been commensurate based on the known consistency of the initial impulses, and the corresponding $\eta$ dot-product/amplitude estimates have been consistent with this range of peak-to-peak amplitudes. The tests with the largest peak-to-peak articulation amplitudes used data from the start of an articulation time history, e.g., the first till oscillation periods in FIGS. 7 and 8. The tests with the smallest amplitudes used one of the last full oscillations, e.g., the oscillation starting at t=3.43 sec in FIG. 7 and the one starting at t=2.11 sec in FIG. 8. A test using one of the later oscillations has been run for each of the 8 cases, and the non-spoofed later oscillation peak-to-peak amplitude estimates range from 4.01 cm 5.9 cm. The corresponding minimum peak-to-peak deflections, as determined by the a≥1 amplitude constraint and the $\rho_{anom}(t)$ time histories, ranged from 2.86 cm to 4.21 cm. Thus, the system can work effectively with small antenna deflections.

Each test used approximately one period of the decaying sinusoidal $\rho_{anom}(t)$, yielding detection intervals ranging from 0.39 sec to 0.57 sec. The simulation test results of Subsection IX.B imply that shorter intervals would have sufficed had the articulation system been designed to vibrate at a higher frequency.

The number of satellites available for the tests ranged from L=6 to 9, and the corresponding GDOP values ranged from 1.77 to 4.90. The carrier-to-noise ratios ranged from $C/N_0$=30.6 to 51.3 dB-Hz, with the mean values over all the satellites in a given test ranging from $(C/N_0)_{avg}$=39.3 to 47.3 dB-Hz. The power of the test is expected to increase with increasing L, with increasing $(C/N_0)_{avg}$, and with increasing minimum peak-to-peak antenna deflection, and to decrease with increasing GDOP. In fact, the weakest test, the one with $P_{MDwc}=1.6\times10^{-6}$, had the minimum number of satellites of any of the cases, L=6 satellites, and it had the second highest GDOP, 4.35. Its $(C/N_0)_{avg}$ was 44.3 dB-Hz. It also had almost the smallest minimum peak-to-peak deflection constraint as defined by its $\rho_{anom}(t)$. The other case with L=6 satellites had almost the same $(C/N_0)_{avg}$, 44.2 dB-Hz, a larger minimum peak-to-peak deflection, 3.99 cm, and a lower GDOP, 3.86. The larger minimum deflection and the lower GDOP explain its lower $P_{MDwc}$. The other case with slightly higher GDOP, 4.90, had a larger number of satellites, L=7, a larger $(C/N_0)_{avg}$, 47.3, and a larger minimum peak-to-peak deflection, 4.21 cm. These differences explain its decreased $P_{MDwc}$.

Figure 9:
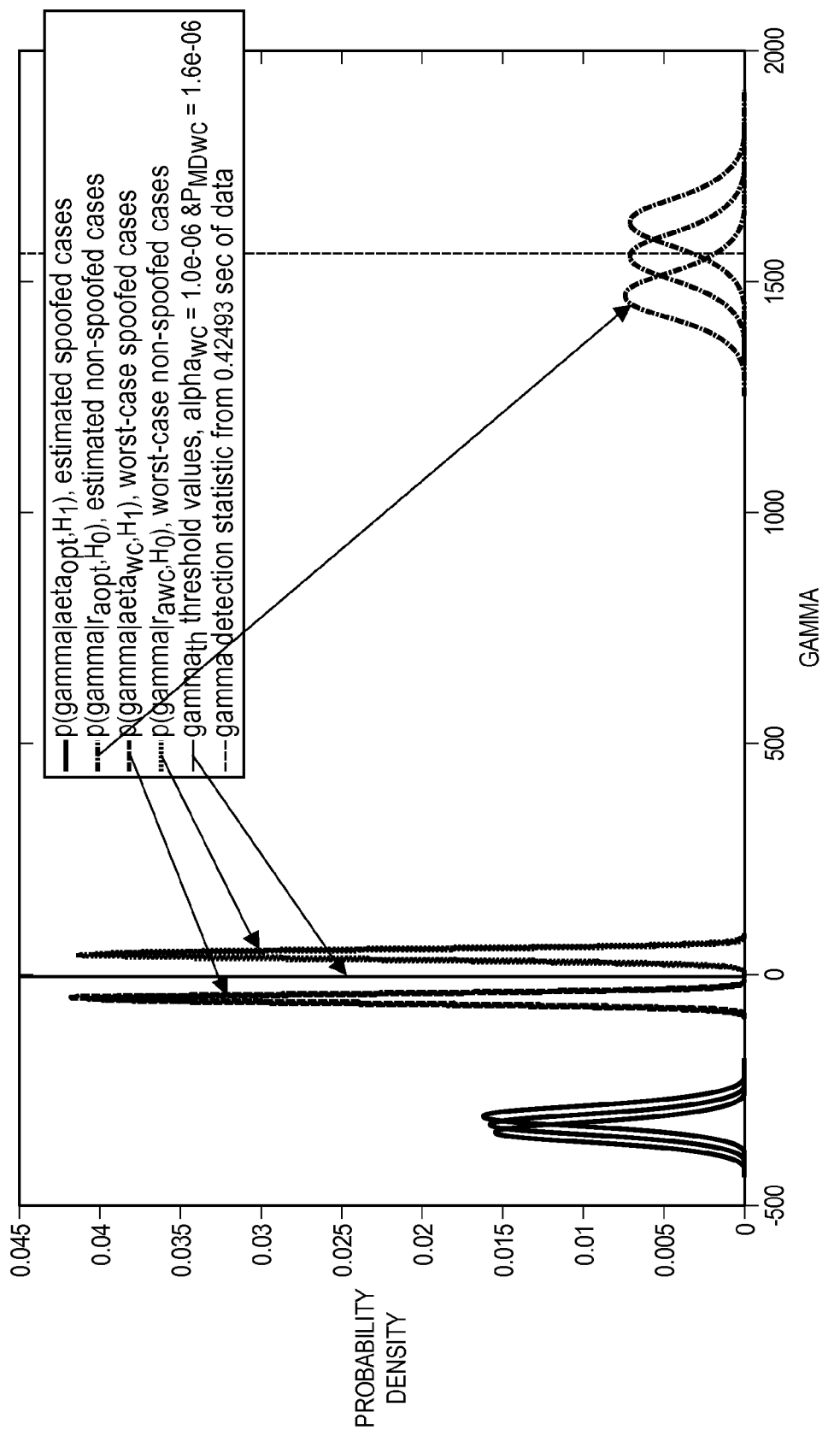

The detection results for a typical non-spoofed case are shown in FIG. 9. The test was made at WSMR when the spoofer was not broadcasting. This case corresponds to the weakest detection of all 8 cases, both spoofed and non-spoofed, the one that yielded $P_{MDwc}=1.6\times10^{-6}$. The spoofing detection statistic $\gamma$ is plotted along the horizontal axis. The vertical black dashed line shows the actual computed value of $\gamma$ from the GPS data. The vertical dash-dotted magenta lines show the worst-case threshold values $\gamma_{th}$ as computed for the following three different estimates of $\Delta t_0$: $t_{0opt}$, $\Delta t_{0opt}+2\sigma_{\Delta t0opt}$, and $\Delta t_{0opt}-2\sigma_{\Delta t0opt}$, as per the analysis described in Subsection VII.C. The left-most of these three vertical lines constitutes the detection threshold. Given that the three candidate thresholds lie virtually on top of each other, the choice of the lowest is somewhat immaterial. The vertical dashed black line lies very far to the right of the three vertical dash-dotted magenta lines. Therefore, this detection is clearly successful in ruling out a spoofing attack.

FIG. 9 also plots various relevant probability density functions. Consistent with the analysis of Subsection VII.C, these are plotted in triplets, one for each of the elements of the triplet of candidate $\Delta t_0$ estimates: $t_{0opt}$, $\Delta t_{0opt}+2\sigma_{\Delta t0opt}$, and $\Delta t_{0opt}-2\sigma_{\Delta t0opt}$. The three dotted cyan probability density functions represent the worst-case non-spoofed situation, and the three dash-dotted red probability functions represent the corresponding worst-case spoofed situations. Obviously, there is sufficient separation between these sets of probability density functions to yield a powerful detection test, as evidenced by the ability to draw the dash-dotted magenta detection thresholds in a way that clearly separates the red and cyan distributions. Further confirmation of good detection power is provided by the low worst-case probabilities of false alarm and missed-detection.

The three dashed green curves are the non-spoofed $p(\gamma|r_a, H_0)$ probability density functions using the estimated value of $r_a$ in place of the worst-case value. The solid blue curves are the spoofed $p(\gamma|\eta,H_1)$ probability density functions using the estimated value of $\eta$ in place of the worst-case value. Of course, the $r_a$ estimate used to generate the dashed green curves has much more meaning than does the $\eta$ estimate used to generate the solid blue curves because this is a non-spoofed case. The important point of these latter probability density plots is that the actual $\gamma$, the vertical dashed black line, is believable as a sample from all three of the dashed green probability density functions. This fact indicates that the signal models used to generate the hypothesis test calculations are reasonable.

Figure 10:
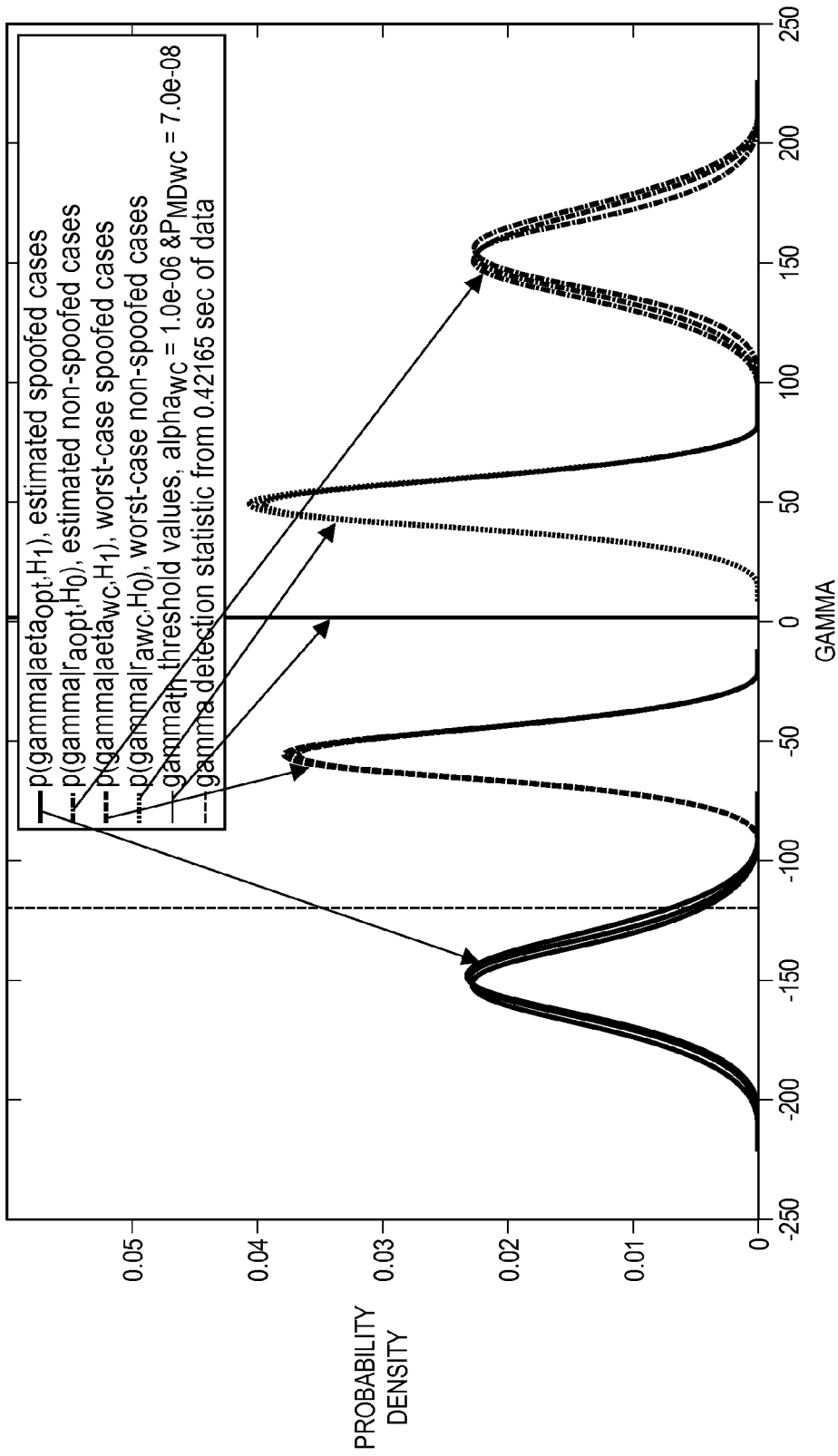

FIG. 10 plots detection results for a typical spoofed case. All of the definitions and line/curve colors are the same in FIG. 10 as in FIG. 9. The only major difference is that the vertical dashed black line plotted at the calculated detection value $\gamma$ now lies far to the left of the 3 dash-dotted magenta vertical lines, the three candidate $\gamma_{th}$ detection threshold values. The fact that $\gamma<\gamma_{th}$ by a wide margin indicates a very reliable detection of the spoofing attack. The worst-case spoofed and non-spoofed probability density functions are widely separated, allowing the selection of a $\gamma_{th}$ threshold value that yields both a low worst-case probability of false alarm and a low worst-case probability of missed detection. The overlap between the vertical dashed black detection statistic and the solid blue probability density functions indicates the reasonableness of the spoofed hypothesis that $\gamma$ is a sample from one of these 3 $p(\gamma|\eta_{opt},H_1)$ distributions. Note that this case has L=6 GPS signals, $(C/N_0)_{avg}$,=44.2 dB-Hz, GDOP=3.86, and a minimum peak-to-peak antenna articulation of 3.99 cm.

In summary, the live-data tests of this system indicate excellent performance. The correct situation of spoofing or non-spoofing has been identified unambiguously in all cases considered. Furthermore, small antenna motions, in the range 4-6 cm peak-to-peak, and short data batches, 0.57 sec or less, yield very powerful spoofing detection tests.

X. Discussion of System Properties, Potential Enhancements, and Merits Relative To IMU-Based Methods A. Non-Detectable Spoofing Cases There exist special cases in which some or all of the present teachings' spoofing detection methods would not work. The basic method relies on geometric diversity of the terms $$-\frac{2\pi}{\lambda}(\hat{r}^j)^T A_k^T b_a(\tau_{midk}^j)$$

in Eq. (8) for j=1, . . . , L for the non-spoofed case as compared to lack of diversity in the term $$-\frac{2\pi}{\lambda}(\hat{r}^{sp})^T A^T b_a(\tau_{midk}^j)$$

in the spoofed case, Eq. (13). In perverse situations, however, the vectors $\hat{r}^j$ may not have sufficient diversity. Of course, if L=1, if there is only one available signal, then there is no diversity, and this method fails. Even if L=2 GNSS satellites, however, the one-dimensional version of this system lacks sufficient diversity. Recall that $b_a(t)=\hat{b}_a\rho_a(t)$ when the articulations are 1-dimensional. In this case, it is possible to find a vector $\hat{r}_a=A^T\hat{b}_a$ that solves the non-spoofed estimation problem in Eqs. (40a)-(40c) to yield a low cost even during a spoofing attack. This solution will satisfy $(\hat{r}^1)^T\hat{r}_a=(\hat{r}^2)^T\hat{r}_a$ by lying in the plane exactly between $\hat{r}^1$ and $\hat{r}^2$. In fact, poor spoofing detection power will occur in any case where there exists the possibility of finding an $\hat{r}^a$ such that all values of $(\hat{r}^j)^T\hat{r}_a$ for j=1, . . . , L are equal or nearly so. It is easy to show, however, that any such case yields a very high GDOP, an infinite GDOP if $(\hat{r}^j)^T\hat{r}_a$ for j=1, . . . , L can be exactly equal for some choice of $\hat{r}_a$. A very large GDOP, however, would preclude the spoofer from fooling the victim into confidently computing a false position/time solution. Therefore, it is unlikely that a near-infinite GDOP case would occur in practice. Even if a spoofer were to mount such an attack, the present teachings' spoofing detection algorithm would realize that it was incapable of discerning whether or not an attack was occurring: It would not be able to achieve both a low false-alarm probability and a low probability of missed detection.

B. Advantages of 2D and 3D Antenna Articulations

There are a two important advantages to using a version of this spoofing detection method that employs 2D or full 3D antenna articulations $b_a(t)$. One advantage occurs in the case of a low number of signals. As mentioned in the preceding subsection, spoofing detection will be impossible using the present teachings' 1-dimensional techniques if L=2 available GNSS signals or if GDOP is infinite or very large. In the case of 2-dimensional or 3-dimensional antenna articulations, however, it becomes much easier to detect spoofing in these situations.

The enhanced spoofing detection occurs because the detection calculations can estimate individual $\hat{b}^j$ unit direction vectors by solving the problem in Eqs. (102a)-(102c). Without spoofing, the relative directions between the estimated $\hat{b}_{opt}^j$ vectors should be the same as the relative directions between the corresponding known $\hat{r}^j$ vectors, to within the estimation accuracies of the $\hat{b}_{opt}^j$ vectors. The sameness of the relative directions can be explored by comparing dot products between various pairs ($\hat{b}_{opt}^j$, $\hat{b}_{opt}^l$) the corresponding pairs ($\hat{r}^j$, $\hat{r}^l$) and by comparing scalar triple products between non-coplanar trios ($\hat{b}_{opt}^j$, $\hat{b}_{opt}^l$, $\hat{b}_{opt}^m$) and the corresponding trios ($\hat{r}^j$, $\hat{r}^l$, $\hat{r}^m$). These dot products and scalar triple products are directly comparable because they are independent of the unknown coordinate frame rotation that distinguishes $\hat{b}^j$ from its corresponding $\hat{r}^j$. Any significant difference in dot products or scalar triple products indicates a spoofing attack. Using this approach, an attack should be detectable even when L=2 vectors if $\hat{r}^1$ and $\hat{r}^2$ differ sufficiently in their directions.

The use of 2D and 3D $b_a(t)$ articulations also can help address the problem of partial spoofing, i.e., of spoofing only some signals. In that case, the spoofer would almost certainly have to broadcast its signal from an $\hat{r}^{sp}$ direction which differed from one or more of the spoofed $\hat{r}^j$ directions that the spoofer had implied to the victim. The victim's solution of Eqs. (102a)-(102c) would generate a corresponding $\hat{b}_{opt}^j$ that would equal $A\hat{r}^{sp}$ instead of $A\hat{r}^j$. This difference of directions would be detected in dot-product or scalar-triple-product comparisons that involved $\hat{b}_{opt}^j$ on one side of the calculations and $\hat{r}^j$ on the other side.

C. Impact of Multipath Errors

In theory, carrier-phase multipath has the potential to impact the present teachings' spoofing detection in a negative manner. It is a well known fact that carrier-phase multipath errors can be on the order of 0.5 cm or more and that they can negatively impact the closely related technology of GNSS-based attitude determination No explicit analysis has been made of the potential impact of multipath on this system. There is, however, strong experimental evidence that the impacts are manageable.

Figure 11:
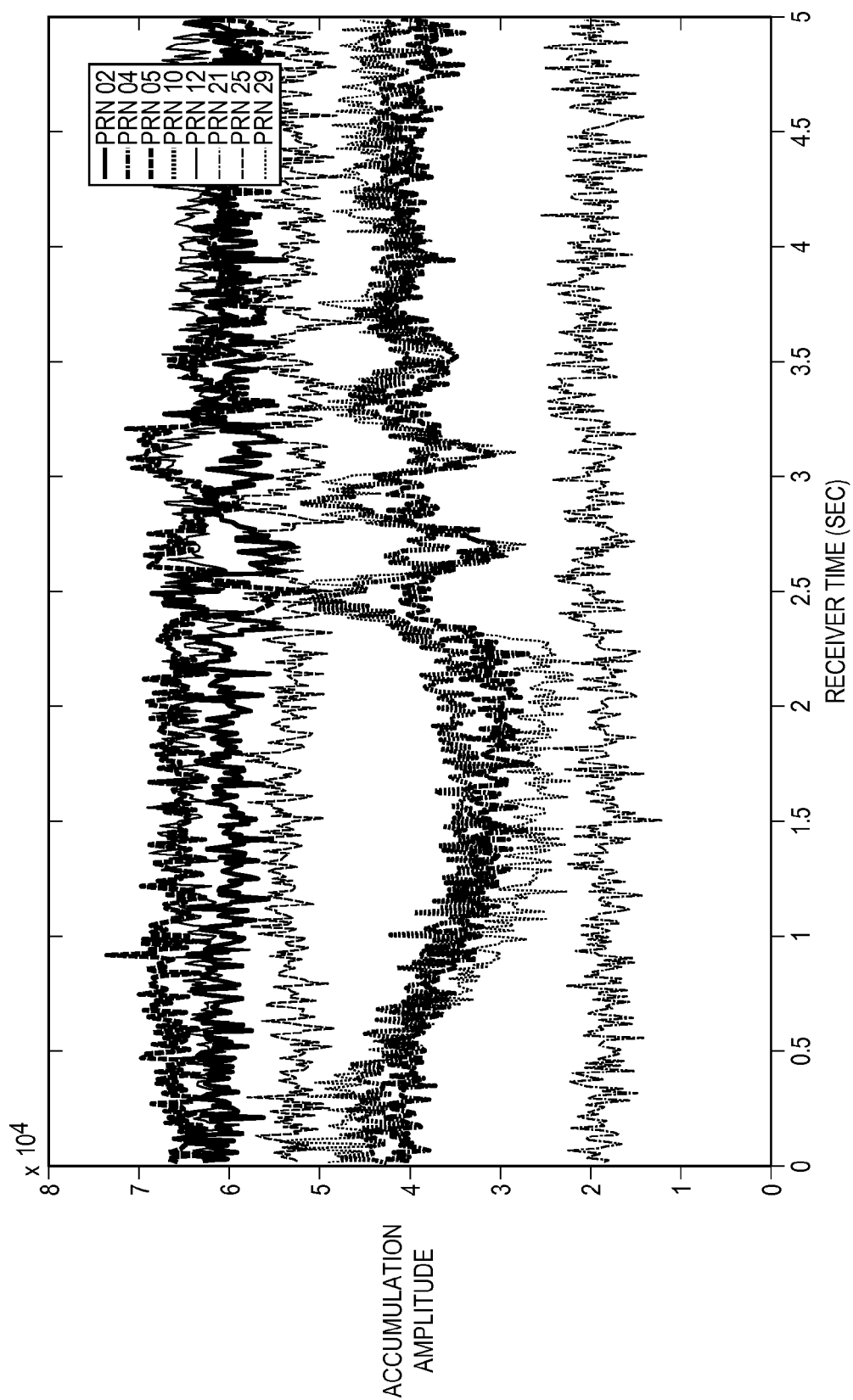

In two of the three live-data tests of this system, significant carrier-phase multipath effects have been evident. The two tests in question are the non-spoofed tests in Ithaca, N.Y. and the spoofed and non-spoofed tests at WSMR. The indications of strong carrier-phase multipath consisted of strong variations of the received signal power that were highly correlated with the decaying sinusoidal antenna articulation motions. Such variations are depicted in FIG. 11. This figure plots the amplitude time histories of the GPS receiver's [$I_{pk}$; $Q_{pk}$] prompt accumulation vectors that correspond to the detrended carrier phase time histories in FIG. 7. It is clear from the figure that PRNs 04, 10, and 29, the dash-dotted red curve, the dotted black curve, and the dotted magenta curve, all show significant exponential decays that correlate closely with the exponentially decaying carrier phase time histories of FIG. 7. The largest zero-to-peak amplitude variations of the dotted magenta curve equal 30% of its nominal level.

The most reasonable explanation for the amplitude variations in FIG. 11 is that of alternating constructive and destructive interference between the direct signal and a significant multipath signal. One might postulate that variations in antenna gain pattern could have caused these fluctuations. The actual rotations of the antenna gain pattern were small, however, and it is not believable that the resulting gain fluctuations along any fixed line-of-sight could have been large enough to cause that oscillations observed in FIG. 11.

The following fact further supports the multipath explanation for the oscillations in FIG. 11: The anechoic chamber data taken at NASA Wallops displayed no such amplitude oscillations. This is exactly what one would expect if the oscillations were caused by multipath because an anechoic chamber has very low multipath.

One would expect that the corresponding multipath-induced carrier-phase variations would be commensurate in a relative sense. Thus, the peak carrier phase multipath errors for the dotted magenta curve, PRN 29, might be as large as 0.3 rad=0.048 cycles at the start of the antenna oscillations. Fortunately, this level of multipath error is significantly smaller than the beat carrier phase variations that were caused by the antenna motion. As per FIG. 7, these were about 0.6 cycles peak-to-peak for PRN 29 at the outset of the antenna vibrations.

None of the spoofing detection tests suffered any discernible ill effects from the apparent presence of significant multipath error. All of them produced reasonable detection statistics, as evidenced in FIGS. 9 and 10 and in similar figures for other cases.

The only apparent effect of multipath was an error in estimated antenna articulation direction $\hat{r}_{aopt} = r_{aopt}/\|r_{aopt}\|$. For a non-spoofed test in Ithaca, N.Y. The prototype antenna articulation system of FIG. 3 had been set up to produce an $\hat{r}_a$ articulation direction that was horizontal. The estimated $\hat{r}_{aopt}$, however, was tilted about 8 deg away from horizontal. This apparent tilt may have been the result of carrier-phase multipath. Fortunately, it did not adversely impact the detection technique's ability to rule out the possibility of a spoofing attack. If the spoofing detection system placed an optically opaque radome over the entire antenna and articulation system, then the spoofer would be prevented from obtaining this information.

D. Merits in Comparison to Existing IMU-Aided Spoofing Detection Approaches

The system developed in the present teachings has some similarities to IMU-based methods, but it has several advantages over such methods. First, it can be implemented in a fixed-base installation by adding a device to create the required $b_a(t)$ motions and to sense them, e.g., a solenoid and a linear encoder.

A second improvement is a difference from IMU-based methods' presumption that some sort of navigation filter, perhaps an extended Kalman filter, is estimating the vehicle position and attitude. IMU-based spoofing detection methods rely on this navigation filter's estimated direction cosines matrix A. The present method forms its own independent estimate of A or of $\hat{r}_a = A^T \hat{b}_a$ in a globally convergent manner. There is no possibility that failure or inaccuracy of a full navigation filter could deteriorate its performance.

A third advantage of the new detection approach lies in the design of its test statistic. IMU-based approaches tend to rely on a general residuals test in the navigation filter. In the present context, this amounts to considering only whether a cost such as $J_{nonsp}(\hat{r}_a)$ in Eq. (40b) is small enough. The present method also seeks to exploit the fact of sameness in the $b_a(t)$-correlated parts of the carrier phase variations during a spoofing attack. Minimization of the cost function in Eq. (21) represents an example of this approach. By considering both $J_{nonsp}(\hat{r}_{aopt})$ from Eq. (40b) and $J_{sp}(\eta_{opt})$ from Eq. (21), the spoofing detection power of any given test can be increased relative to a test that considers only the residual errors relative to a non-spoofed signal model. Also, there appears to be little or no literature for the IMU-based approaches that discusses how to design a spoofing detection threshold for a given probability of false alarm, how to compute the corresponding probability of missed detection, or how much motion and time are needed to achieve reasonably low probabilities of false alarm and missed detection.

Another advantage of the present system is that it could be used on an UAV without the need for any inertial measurements. Rather than using an IMU to infer antenna motions $b_a(t)$, a system based on the new approach could use high-frequency dithering of one or more UAV control inputs in order to create a suitable $b_a(t)$. Given known control input dithering signals, $b_a(t)$ could be inferred from the transfer functions of a dynamic model of the UAV. This could be especially effective if the GNSS antenna were mounted near a wing tip and if the aileron input were the dithered control. Alternatively, the antenna could be mounted on the tail, and the elevator could be dithered. It is likely that an unknown scaling factor a would have to multiply a known nominal $b_{anom}(t)$ in order to model the true $b_a(t)$, but this type of re-scaling approach is already covered in Section VI.

Yet another advantage over IMU-based methods concerns the particular carrier phase measurement that gets used. A tightly coupled GPS/IMU system feeds the GPS observables, including pseudorange and possibly beat carrier phase, into the Kalman filter. Unfortunately, the beat carrier phase used is usually that produced by the carrier NCO. The special processing of $I_{pk}$ and $Q_{pk}$ accumulations associated with FIG. 4 and Eq. (3) is not used. Therefore, the finite bandwidth of the PLL can degrade the ability of this system to discern the high-frequency carrier-phase variations, the ones whose differences between the non-spoofed and spoofed cases are central to spoofing detection. In addition, the ability to detect and remove cycle slips, as outlined in Subsection III.A, can be important to the success of carrier-phase-based spoofing detection when high-frequency antenna motions are used. Thus, it is unclear that a tightly coupled GPS/IMU system could be relied on to produce the most useful beat carrier phase information for purposes of spoofing detection.

An ultra-tightly-coupled GPS/IMU system should have none of these difficulties due to its use of the raw $I_{pk}$ and $Q_{pk}$ accumulations as its Kalman filter observables. The processing suggested for conventional systems, however, does not envision using an ultra-tightly-coupled GPS/IMU system for spoofing detection.

One more advantage of the present method is its reduced susceptibility to a very sophisticated spoofing attack. In theory, a sophisticated spoofer could aim a high-bandwidth relative position sensor at a victim UAV's GNSS antenna. It could sense the high-frequency component of the actual antenna motions and use that data to synthesize the equivalent of the $\Delta\phi_{sp}{}^j(\tau_{midk}{}^j)$ spoofing signal given in Eq. (110). It would only need to synthesize the correct $\Delta\phi_{sp}{}^j(\tau_{midk}{}^j)$ in the bandwidth that was above the effective drift bandwidth of the IMU. Below that bandwidth, it could spoof the signal at will. Such an attack would go completely undetected by any IMU-based single-antenna system. If the present approach were used with concealed $b_a(t)$ motions, as under an optically opaque radome, then this new approach would not have the same vulnerability.

Of course, if an IMU were present on a UAV, its outputs could be used to aid in the determination of the high-frequency components of $b_a(t)$. Such an approach would not need to run the IMU data through a full navigation filter in order to do GNSS spoofing detection. The high-pass pre-filtering calculations of Eqs. (17) and (18) and the attitude estimation calculations in, for example, Eqs. (40a)-(40c) or (99a)-(99c) would obviate the need for data from a full navigation solution.

XI. Summary and Conclusions

The present teachings have developed, analyzed, and investigated methods to detect spoofing of GNSS signals. The methods of the present teachings rely on measurements of the beat carrier phase of multiple GNSS signals and on the impact on these measurements caused by intentional high-frequency receiving location (in one instance, antenna motion) motion. In one instance, dithering motion of a victim receiver's antenna could be implemented by a solenoid, a cantilevered beam, or dithering of the controls of a UAV. It should be noted that other methods of displacing the location at which the GNSS signal is received are also within the scope of these teachings. After detrending of the beat carrier phase variations and the receiving location motion using a high-pass filter, they can be matched to models of their expected dependence on the known receiving location (in one instance, antenna motion) motion. The model for the non-spoofed case shows differing effects of the antenna motion on the signals, but the spoofed case yields identical effects due to spoofing geometry in which all of the false signals originate from a single spoofer transmission antenna. Spoofing detection hypothesis tests have been developed by comparing the two models' ability to fit the measured data. Some of these tests involve auxiliary estimation of attitude or attitude-like parameters of the user system in lieu of a priori attitude information. Precise detection tests have been developed with spoofing detection thresholds that respect upper limits on probabilities of false alarm or on worst-case probabilities of false alarm. These tests also allow analysis to determine probabilities of missed detection or worst-case probabilities of missed detection.

The GNSS spoofing detection techniques of these teachings have been tested both with Monte-Carlo simulations and with live data. One set of live-data tests evaluated the new techniques against a new sophisticated type of receiver/spoofer, one that mimics all visible signals in a way which foils standard receiver autonomous integrity monitoring techniques. These tests were part of a specially authorized event run at the White Sands Missile Range in New Mexico under the auspices of the Department of Homeland Security. The new spoofing detection methods consistently yield false alarm probabilities and missed detection probabilities on the order of $10^{-5}$ or lower when working with typical numbers of GPS signals available at typical patch-antenna signal strengths. The needed antenna articulation peak-to-peak deflections are modest, on the order of 4-6 cm. The tests at White Sands Missile Range constitute the first known demonstration of practical detection of live-signal spoofing attacks mounted against a civilian GNSS receiver by a dangerous new generation of receiver/spoofers.

A method is developed that processes Global Navigation Satellite System (GNSS) beat carrier phase measurements from a single moving antenna in order to determine whether the GNSS signals are being spoofed. This technique allows a specially equipped GNSS receiver to detect sophisticated spoofing that cannot be detected using receiver autonomous integrity monitoring techniques. It works for both encrypted military signals and for unencrypted civilian signals. It does not require changes to the signal structure of unencrypted civilian GNSS signals. The method uses a short segment of beat carrier-phase time histories that are collected while the receiver's single antenna is undergoing a known, high-frequency motion profile, typically one pre-programmed into an antenna articulation system. The receiving location (in one instance, antenna motion) also can be moving in an unknown way at lower frequencies, as might be the case if it were mounted on a ground vehicle, a ship, an airplane, or a spacecraft. The spoofing detection algorithm correlates high-pass-filtered versions of the known motion component with high-pass-filtered versions of the carrier phase variations. True signals produce a specific correlation pattern, and spoofed signals produce a recognizably different correlation pattern if the spoofer transmits its false signals from a single antenna. The most pronounced difference is that non-spoofed signals display variations between the beat carrier phase responses of multiple signals, but all signals' responses are identical in the spoofed case. These differing correlation characteristics are used to develop a hypothesis test in order to detect a spoofing attack or the lack thereof. For moving-base receivers, there is no need for prior knowledge of the vehicle's attitude. Instead, the detection calculations also provide a rough attitude measurement. Several versions of this spoofing detection system have been designed and tested. Some have been tested only with truth-model data, but one has been tested with actual live-signal data from the Global Positioning System (GPS) C/A code on the L1 frequency. The live-data tests correctly identified spoofing attacks in the 4 cases out of 8 trials that had actual attacks. These detections used worst-case false-alarm probabilities of $10^{-6}$, and their worst-case probabilities of missed detection were no greater than $1.6 \times 10^{-6}$. The ranges of antenna motion used to detect spoofing in these trials were between 4 and 6 cm, i.e., on the order of a quarter-cycle of the GPS L1 carrier wavelength.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Herein, various functions, functionalities and/or operations may be described as being performed by or caused by software program code to simplify description or to provide an example. However, those skilled in the art will recognize what is meant by such expressions is that the functions result from execution of the program code/instructions by a computing device as described above, e.g., including a processor, such as a microprocessor, microcontroller, logic circuit or the like. Alternatively, or in combination, the functions and operations can be implemented using special purpose circuitry, with or without software instructions, such as using Application-Specific Integrated Circuit (ASIC) or Field-Programmable Gate Array (FPGA), which may be programmable, partly programmable or hard wired. The application specific integrated circuit ("ASIC") logic may be such as gate arrays or standard cells, or the like, implementing customized logic by metalization(s) interconnects of the base gate array ASIC architecture or selecting and providing metalization(s) interconnects between standard cell functional blocks included in a manufacturer(s) library of functional blocks, etc. Embodiments can thus be implemented using hardwired circuitry without program software code/instructions, or in combination with circuitry using programmed software code/instructions.

Control and data information can be electronically executed and stored on computer-readable medium. Common forms of computer-readable (also referred to as computer usable) media can include, but are not limited to including, for example, a floppy disk, a flexible disk, a hard disk, magnetic tape, or any other magnetic medium, a CDROM or any other optical medium, punched cards, paper tape, or any other physical or paper medium, a RAM, a PROM, and EPROM, a FLASH-EPROM, or any other non-transitory memory chip or cartridge, or any other non-transitory medium from which a computer can read. As stated in the USPTO 2005 Interim Guidelines for Examination of Patent Applications for Patent Subject Matter Eligibility, 1300 Off. Gaz. Pat. Office 142 (Nov. 22, 2005), on the other hand, from a technological standpoint, a signal encoded with functional descriptive material is similar to a computer-readable memory encoded with functional descriptive material, in that they both create a functional interrelationship with a computer. In other words, a computer is able to execute the encoded functions, regardless of whether the format is a disk or a signal.

Although the invention has been described with respect to various embodiments, it should be realized these teachings are also capable of a wide variety of further and other embodiments within the spirit and scope of the appended claims.

What is claimed is:

1. A method for determining whether a GNSS (Global Navigation Satellite System) receiver has been spoofed, the method comprising:
   moving, using an articulation subsystem and a location displacement component, a receiving location in a predetermined articulation pattern while receiving GNSS signals at the GNSS receiver;
   high pass filtering, using a spoofing detection hypothesis test component, carrier phase measurements of received GNSS signals and the predetermined articulation pattern; the high pass filtering resulting in estimation of coefficients in an expression for carrier phase measurement residuals;
   determining, using the spoofing detection hypothesis test component, a likelihood cost function minimum for a non-spoofed configuration; a likelihood cost function being obtained from a ratio of probability density functions;
   results of the high pass filtering being used in determining said likelihood cost function;
   determining, using the spoofing detection hypothesis test component, a minimum for another likelihood cost function for a spoofed configuration; a spoofing detection hypothesis test statistic being a difference of said another likelihood cost function minimum and said likelihood cost function minimum; results of the high pass filtering being used in determining said another likelihood cost function; and
   comparing, using the spoofing detection hypothesis test component, the spoofing detection hypothesis test statistic to a predetermined threshold; the GNSS signals deemed to be spoofed if the spoofing detection hypothesis test statistic is less than the predetermined threshold.

2. The method of claim 1 wherein frequencies of the predetermined articulation pattern are substantially higher than frequencies of motion of user equipment receiving the GNSS signals.

3. The method of claim 1 wherein said another likelihood cost function includes a dot product of a unit direction vector from spoofer signal source to user equipment and a unit vector for the predetermined-articulation pattern, vectors being expressed in a reference coordinate system; and wherein said likelihood cost function includes dot products of a unit direction vector from each GNSS signal source and the unit vector for the predetermined articulation pattern, vectors being expressed in a reference coordinate system.

4. The method of claim 1 wherein the predetermined threshold is obtained from a predetermined false alarm probability.

5. The method of claim 1 wherein the predetermined articulation pattern is uniaxial.

6. The method of claim 1 wherein attitude of user equipment receiving the GNSS signals is not known a priori.

7. The method of claim 1 wherein amplitude of the predetermined articulation pattern is not known a priori.

8. The method of claim 1 wherein time phasing of the predetermined articulation pattern is not known a priori.

9. The method of claim 1 wherein the predetermined articulation pattern is multidimensional.

10. The method of claim 9 further comprising determining whether a subset of the GNSS signals is being spoofed.

11. The method of claim 9 wherein said likelihood cost function is a function of a direction cosines matrix for a transformation from a reference coordinate system to a user equipment coordinate system; wherein said another likelihood function is a function of a unit direction vector from a spoofer signal source to user equipment.

12. The method of claim 11 wherein an optimized direction cosines matrix is expressed in terms of an optimized quaternion.

13. The method of claim 11:
wherein spoofing detection calculations involve minimization of said likelihood cost function and said another likelihood cost function, said likelihood cost function to determine an optimal direction cosines matrix and said another likelihood cost function to determine an optimal direction vector from the spooler; and
wherein the spoofing detection calculations involve calculating a difference between a minimum of said another likelihood cost function and a minimum of said likelihood cost- function and comparison of a result to a detection threshold to declare a spoofing attack if the difference is below the detection threshold.

14. A system for determining whether a GNSS (Global Navigation Satellite System) receiver has been spoofed, the system comprising:
a receiving location displacement component configured to move a receiving location with respect to a position at which the user equipment processes GNSS signals;
an articulation subsystem configured to provide driving signals to the receiving location displacement component and to determine receiving location articulation; the articulation subsystem moving a receiving location in a predetermined articulation pattern while receiving GNSS signals;
a number of midpoint sampler subsystems, each midpoint sampler subsystem receiving input from a component of one channel of a conventional GNSS receiver and providing a beat carrier phase measurement for that one channel; and
a spoofing detection hypothesis test component receiving:
location articulation, and
said beat carrier phase measurement for each one channel and a PLL phase error discriminator value for said each one channel, said beat carrier phase measurement and said PLL phase error discriminator value for said each one channel being used to obtain a wideband estimate of beat carrier phase for said each one channel, a number of accumulation mid point times, each accumulation mid point time being an accumulation mid point time for one channel, and a number of unit direction vectors, each unit direction vector pointing from a GNSS signal source for one channel;
said spoofing detection hypothesis test component configured to:
high pass filter the wideband estimate of beat carrier phase and the receiving location articulation for said each one channel; the high pass filtering resulting in estimation of coefficients in an expression for a wideband estimate of beat carrier phase residuals;
determine a likelihood cost function minimum for a non-spoofed configuration; a likelihood cost function being obtained from a ratio of probability density functions; results of the high pass filtering being used in determining said likelihood cost function;
determine a minimum for another likelihood cost function for a spoofed configuration; a spoofing detection hypothesis test statistic being a difference of said another likelihood cost function minimum and said likelihood cost function minimum; results of the high pass filtering being used in determining said another likelihood cost function minimum; and
compare the spoofing detection hypothesis test statistic to a predetermined threshold; the GNSS signals deemed to be spoofed if the spoofing detection hypothesis test statistic is less than the predetermined threshold.

15. The system of claim 14 wherein said receiving location displacement component is a receiver antenna mounting component configured to enable moving a phase center of a receiver antenna with respect to a mounting position at which the receiver antenna mounting component is attached to user equipment receiving the GNSS signals; and wherein said receiving location articulation is antenna articulation.

16. The system of claim 15 wherein the receiver antenna mounting component comprises a number of linking components, each linking components, except a last linking component, attached to a subsequent linking component with a joint component, a first linking component attached to user equipment by another joint component, a last linking component attached between one joint component and the receiver antenna, and a driving mechanism configured to drive each linking component.

17. The system of claim 15 wherein the receiver antenna mounting component comprises a drivable slidable component; said drivable slidable component enabling motion in one axis; said drivable slidable component disposed between user equipment and die receiver antenna.

18. The system of claim 17 wherein said drivable slidable component is a solenoid driver.

19. The system of claim 14 wherein the receiver antenna mounting component comprises a cantilever beam disposed between user equipment and the receiver antenna; a driving component producing vibratory motion along an axis substantially perpendicular to an axis of the cantilever beam.

20. The system of claim 14 wherein frequencies of the predetermined articulation pattern are substantially higher than frequencies of motion of user equipment receiving the GNSS signals.

21. The system of claim 14 wherein said likelihood cost function includes dot products of a unit direction vector from each GNSS signal source and the unit vector for the predetermined articulation pattern, vectors being expressed in a reference coordinate system; and wherein said another likelihood cost function includes, a dot product of a unit direction vector from a spoofer signal source to user equipment and a unit vector for the predetermined articulation pattern, vectors being expressed in a reference coordinate system.

22. The system of claim 14 wherein the predetermined threshold is obtained from a predetermined false alarm probability.

23. The system of claim 14 wherein the predetermined articulation pattern is uniaxial.

24. The system of claim 14 wherein attitude of user equipment receiving the GNSS signals is not known a priori.

25. The system of claim 14 wherein amplitude of the predetermined articulation pattern is not known a priori.

26. The system of claim 14 wherein time phasing of the predetermined articulation pattern is not known a priori.

27. The system of claim 14 wherein the predetermined articulation pattern is multidimensional.

28. The system of claim 27 wherein said spoofing detection hypothesis test component is also configured to determine whether a subset of the GNSS signals is being spoofed.

29. The system of claim 27 wherein said likelihood function is a function of a direction cosines matrix for a transformation from a reference coordinate system to a user equipment coordinate system; wherein said another likelihood function is a function of a unit direction vector from the spooler signal source to user equipment.

30. The system of claim 29 wherein the spoofing detection calculations compute an optimized value of said direction cosines matrix that minimizes said likelihood cost function; and wherein the spoofing detection calculations compute an optimized value of said unit direction vector that minimizes said another likelihood function.

31. The system of claim 29 wherein the optimized value of said direction cosines matrix is expressed in terms of an optimized quaternion.

* * * * *